United States Patent
Nakano et al.

(10) Patent No.: US 10,445,751 B2
(45) Date of Patent: Oct. 15, 2019

(54) INFORMATION OBTAINING METHOD, INFORMATION OBTAINING SYSTEM, AND INFORMATION APPLIANCE

(71) Applicant: Panasonic Intellectual Property Corporation of America, Torrance, CA (US)

(72) Inventors: Toshihisa Nakano, Osaka (JP); Masayuki Kozuka, Osaka (JP); Motoji Ohmori, Osaka (JP); Takako Hirose, Kyoto (JP); Tsuyoshi Sakata, Kanagawa (JP); Yoshiyuki Miyabe, Osaka (JP); Kazuo Okamura, Osaka (JP); Masayoshi Tojima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 950 days.

(21) Appl. No.: 14/400,148

(22) PCT Filed: Mar. 7, 2014

(86) PCT No.: PCT/JP2014/001305
§ 371 (c)(1),
(2) Date: Nov. 10, 2014

(87) PCT Pub. No.: WO2014/141665
PCT Pub. Date: Sep. 18, 2014

(65) Prior Publication Data
US 2015/0127421 A1    May 7, 2015

Related U.S. Application Data

(60) Provisional application No. 61/776,249, filed on Mar. 11, 2013.

(51) Int. Cl.
*G06Q 30/02* (2012.01)
*G06Q 30/00* (2012.01)

(52) U.S. Cl.
CPC ......... *G06Q 30/0201* (2013.01); *G06Q 30/01* (2013.01)

(58) Field of Classification Search
None
See application file for complete search history.

(56) References Cited

U.S. PATENT DOCUMENTS 7,204,259 B2 *   4/2007   Crisp, III ............. B67D 1/0057
                                                    134/113
2003/0078843 A1   4/2003   Sone
(Continued)

FOREIGN PATENT DOCUMENTS

CN     1470033     1/2004
CN     1914368     2/2007
(Continued)

OTHER PUBLICATIONS

International Search Report dated May 20, 2014 in International (PCT) Application No. PCT/JP2014/001305.

*Primary Examiner* — Deirdre D Hatcher
(74) *Attorney, Agent, or Firm* — Wenderoth, Lind & Ponack, L.L.P.

(57) ABSTRACT

Provided is a server device (101) including: a transmitting/receiving section (201) for receiving, from a household electric appliance (102), an identifier for identifying the household electric appliance (102) and an operation status of the household electric appliance (102); an updating section (207) for estimating a consumption status of a consumer good using the received operation status so as to update the consumption status of the consumer good stored in a utilization information accumulating section (205) based on the estimated consumption status of the consumer good; and a
(Continued)

determination section (206) for deciding whether or not to transmit a confirmation message for confirming the consumer good being used with the household electric appliance, based on the updated consumption status of the consumer good.

13 Claims, 37 Drawing Sheets

(56) References Cited

U.S. PATENT DOCUMENTS

| | | | |
|---|---|---|---|
| 2003/0172009 A1 | 9/2003 | Katou et al. | |
| 2006/0190266 A1 | 8/2006 | Tanigawa et al. | |
| 2008/0143489 A1* | 6/2008 | Castaldo | G06F 9/54 340/286.01 |
| 2011/0313849 A1* | 12/2011 | Brueck | G06O 30/0201 705/14.45 |
| 2014/0006131 A1* | 1/2014 | Causey | G06Q 10/0875 705/14.24 |
| 2015/0026007 A1* | 1/2015 | Mangalvedkar | G06Q 30/0633 705/26.8 |
| 2015/0149298 A1* | 5/2015 | Tapley | G06O 30/0633 705/14.66 |
| 2015/0363866 A1* | 12/2015 | Depew | G06Q 30/0633 705/26.8 |

FOREIGN PATENT DOCUMENTS

| | | |
|---|---|---|
| JP | 2002-73965 | 3/2002 |
| JP | 2002-117298 | 4/2002 |
| JP | 2003-19389 | 1/2003 |
| JP | 2003-132258 | 5/2003 |
| JP | 2004-70594 | 3/2004 |
| JP | 2006-164146 | 6/2006 |
| JP | 2006-172138 | 6/2006 |
| JP | 2009-195627 | 9/2009 |

* cited by examiner

FIG. 3

| MANUFACTURER NAME | APPLIANCE CATEGORY | APPLIANCE ID |
|---|---|---|
| COMPANY P | WASHING MACHINE | 0x123456 |

FIG. 4

IS DETERGENT YOU ARE USING "XXX"?

YES    NO

FIG. 6

ISN'T DETERGENT "XXX" YOU ARE USING RUNNING LOW?

| YES | NO |

NOW YOU CAN TRY DETERGENT "YYY" FOR FREE

| GET FREE SAMPLE | NOT NEEDED |

FIG. 7

| APPLIANCE CATEGORY | MANUFACTURER NAME | PRODUCT CATEGORY | PRODUCT ID | PRODUCT NAME | VOLUME |
|---|---|---|---|---|---|
| WASHING MACHINE | COMPANY A | CLOTHING DETERGENT | 5278 | ATN | 1.0kg |
| | | | 3568 | EMR | 500g |
| | | | 1109 | NBZ | 400g |
| | | | ... | ... | ... |
| | | FABRIC SOFTENER | 88293 | HMG | 700ml |
| | | | ... | ... | ... |
| | | CLOTHING BLEACH | 74839 | WHT | 500ml |
| | | | ... | ... | ... |
| | COMPANY B | ... | ... | ... | ... |
| | ... | ... | ... | ... | ... |

FIG. 8

| USER ID | FAMILY COMPOSITION | AGE | SEX |
|---|---|---|---|
| 324-5678 | USER | 35 YEARS OLD | MALE |
| | WIFE | 34 YEARS OLD | FEMALE |
| | CHILD | 10 YEARS OLD | FEMALE |
| | CHILD | 8 YEARS OLD | MALE |

| USER ID | APPLIANCE ID |
|---|---|
| 324-5678 | 0x123456 |
| | 0x987654 |
| | : |

| USER ID | INFORMATION APPLIANCE ID |
|---|---|
| 324-5678 | 0x000001 |

FIG. 9

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0kg | 2013/2/16 | 500g | 50% |
| | 88293 | HMG | 700ml | 2013/2/10 | 490ml | 30% |
| | 74839 | WHT | 500ml | 2013/1/29 | 100ml | 80% |
| 0x987654 | .. | .. | .. | .. | .. | .. |
| | .. | .. | .. | .. | .. | .. |
| 0x458673 | .. | .. | .. | .. | .. | .. |
| | .. | .. | .. | .. | .. | .. |

FIG. 10A

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0g | 2013/2/6 | 500g | 50% |
| | 88293 | HMG | 700ml | 2013/2/10 | 490ml | 30% |

FIG. 10B

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0g | 2013/2/6 | 500g | 0% |
| | 88293 | HMG | 700ml | 2013/2/10 | 490ml | 30% |
| | 74839 | WHT | 500ml | 2013/3/10 | 0ml | 100% |

FIG. 11A

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0kg | 2013/2/16 | 500g | 50% |
| | 88293 | HMG | 700ml | 2013/2/10 | 490ml | 30% |
| | 74839 | WHT | 500ml | 2013/1/29 | 100ml | 80% |

FIG. 11B

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0kg | 2013/2/16 | 500g | 50% |
| | 88293 | HMG | 700ml | 2013/3/10 | 0ml | 100% |
| | 74839 | WHT | 500ml | 2013/1/29 | 100ml | 80% |

FIG. 12A

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0kg | 2013/2/16 | 500g | 50% |
| | 88293 | HMG | 700ml | 2013/2/10 | 490ml | 30% |
| | 74839 | WHT | 500ml | 2013/1/29 | 100ml | 80% |

FIG. 12B

| APPLIANCE ID | CONSUMER GOOD BEING USED | | VOLUME | CONSUMPTION START DATE | AMOUNT OF CONSUMPTION | ESTIMATED REMAINING AMOUNT |
|---|---|---|---|---|---|---|
| | PRODUCT ID | PRODUCT NAME | | | | |
| 0x123456 | 5278 | ATN | 1.0kg | 2013/2/16 | 600g | 40% |
| | 88293 | HMG | 700ml | 2013/2/10 | 490ml | 30% |
| | 74839 | WHT | 500ml | 2013/1/29 | 100ml | 80% |

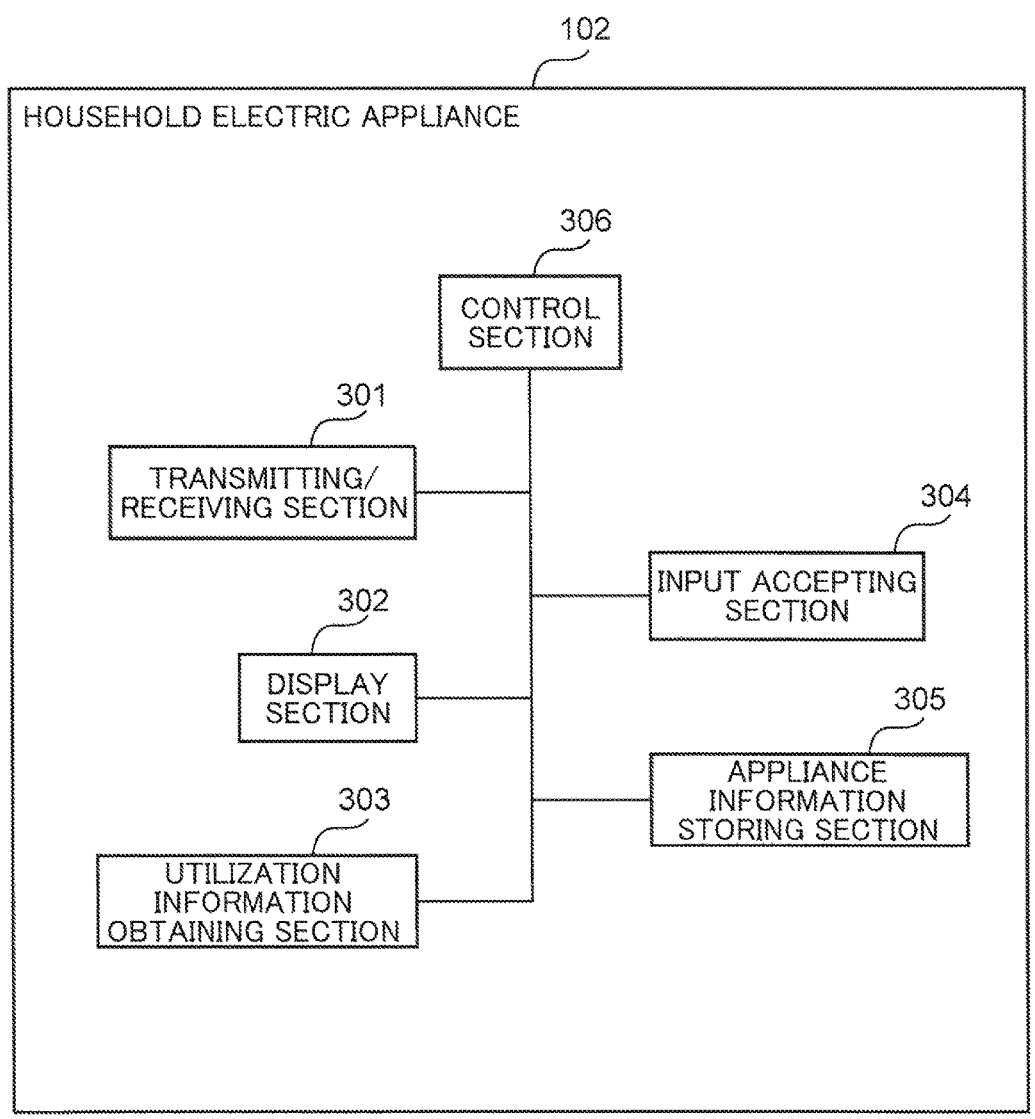

FIG. 20

| USER ID | PURCHASE DATE | PRODUCT ID | PRODUCT NAME | UNIT PRICE | NUMBER OF UNITS | ASSOCIATED APPLIANCE |
|---|---|---|---|---|---|---|
| 324-5678 | 2013/3/3 | 5278 | ATN | 300YEN | 2 | WASHING MACHINE |
| | | 11965 | TYA | 500YEN | 2 | MICROWAVE OVEN |
| | | 326 | JIK | 250YEN | 1 | OTHERS |
| ... | ... | ... | ... | ... | ... | ... |

FIG. 33

| MANUFACTURER NAME | PRODUCT ID | PRODUCT NAME | QUANTITY | SETTING INFORMATION | |
|---|---|---|---|---|---|
| | | | | 500W | 600W |
| COMPANY K | 5293 | GRU | 1PIECE(S) | 50SEC | 40SEC |
| | | | 2PIECE(S) | 1MIN30SEC | 1MIN20SEC |
| | | | 3PIECE(S) | 2MIN | 1MIN50SEC |
| | | | ... | ... | ... |
| | 2234 | TYA | 1/2BAG(S) | 4MIN10SEC | 3MIN30SEC |
| | | | 1BAG(S) | 8MIN | 6MIN40SEC |

INFORMATION OBTAINING METHOD, INFORMATION OBTAINING SYSTEM, AND INFORMATION APPLIANCE

TECHNICAL FIELD

The present invention relates to an information obtaining method, an information obtaining system and an information appliance for obtaining information regarding non-durable consumer goods (hereinafter referred to as "consumer goods"), such as laundry detergents or frozen foods, for use with household electric appliances installed in a house, such as washing machines or microwave ovens.

BACKGROUND ART

With a household electric appliance installed in a house having a network connection function and being connected to a server device outside the house, the server device can know the utilization status of the household electric appliance. For example, a server device can automatically obtain, from a refrigerator installed in a house, the number of times the door has been opened/closed and time information of the opening/closing of the door, without accepting an input operation from a user. A server device can automatically obtain, from a washing machine installed in a house, information such as the washing start time, without accepting an input operation from a user.

Such information obtained during use of household electric appliances is useful information, for manufacturers manufacturing household electric appliances, for knowing the utilization status of the users, and it has been known that it is helpful for future product improvements or marketing.

Patent Literature 1 discloses a technique whereby a washing machine determines the type of the detergent put in ("powder synthetic detergent", "soap powder", or "liquid detergent") so as to put in an amount of disinfectant that is suitable for the type of the detergent.

However, the household electric appliance (washing machine) of Patent Literature 1 performs the same process for detergents of the same type (e.g., "soap powders") even if the detergents are of different makers, and is not capable of determining the maker or the product name of a consumer good (e.g., a detergent) used.

CITATION LIST

Patent Literature

Patent Literature 1: Japanese Patent Application Publication No. 2003-19389

SUMMARY OF INVENTION

The present invention has been made to solve the problems set forth above, and an object thereof is to provide an information obtaining method, an information obtaining system and an information appliance capable of appropriately identifying a consumer good used by a user with a household electric appliance.

An information obtaining method according to one aspect of the present invention includes: receiving information regarding a consumer good which has been determined as a consumer good actually used by a user with a household electric appliance; storing, in a first memory section, a consumption status of the consumer good which has been determined as a consumer good actually used by the user, based on the received information regarding the consumer good; receiving, from the household electric appliance, an identifier for identifying the household electric appliance and an operation status of the household electric appliance; estimating the consumption status of the consumer good using the received operation status; updating the consumption status of the consumer good stored in the first memory section based on the estimated consumption status of the consumer good; deciding whether or not to transmit a confirmation message for confirming the consumer good being used with the household electric appliance, based on the updated consumption status of the consumer good; and transmitting the confirmation message when it is decided that the confirmation message is to be transmitted.

According to the present invention, the consumption status of a consumer good is estimated by using the received operation status; a confirmation message is transmitted at a timing when a decision is made based on the estimated consumption status of the consumer good; and information regarding a consumer good which has been determined as a consumer good actually used by the user is received as a response to the confirmation message. Therefore, it is possible to appropriately identify a consumer good which the user uses with a household electric appliance.

BRIEF DESCRIPTION OF DRAWINGS

FIG. 3 is a diagram showing an example of an appliance information according to Embodiment 1 of the present invention.

FIG. 4 is a diagram showing an example of a first confirmation message for confirming the consumer good being used.

FIG. 6 is a diagram showing an example of a third confirmation message for confirming the consumer good being used and providing a product sample of another consumer good different from the consumer good being currently used.

FIG. 7 is a diagram showing an example of consumer good information according to Embodiment 1 of the present invention.

FIG. 8 is a diagram showing an example of user information according to Embodiment 1 of the present invention.

FIG. 9 is a diagram showing an example of utilization information according to Embodiment 1 of the present invention.

FIG. 10A is a diagram showing an example of utilization information before being updated at the start of consumption of a new consumer good, and FIG. 10B is a diagram showing an example of utilization information after being updated at the start of consumption of a new consumer good.

FIG. 11A is a diagram showing an example of utilization information before being updated at the start of consumption of a new one of the same consumer good which has been used, and FIG. 11B is a diagram showing an example of utilization information after being updated at the start of consumption of a new one of the same consumer good which has been used.

FIG. 12A is a diagram showing an example of utilization information before being updated when updating the consumption status of a consumer good that is already being used, and FIG. 12B is a diagram showing an example of utilization information after being updated when updating the consumption status of a consumer good that is already being used.

FIG. 13 is a diagram showing a configuration of a household electric appliance according to Embodiment 1 of the present invention.

FIG. 20 is a diagram showing an example of sales information according to Embodiment 2 of the present invention.

FIG. 33 is a diagram showing an example of setting information according to Embodiment 5 of the present invention.

DESCRIPTION OF EMBODIMENTS

Embodiments of the present invention will now be described with reference to the drawings. Note that the following embodiments are examples of embodying the present invention and are not to restrict the technical scope of the present invention.

Embodiment 1

1.1 Configuration of Point-of-Use Information Obtaining System

Figure 1:
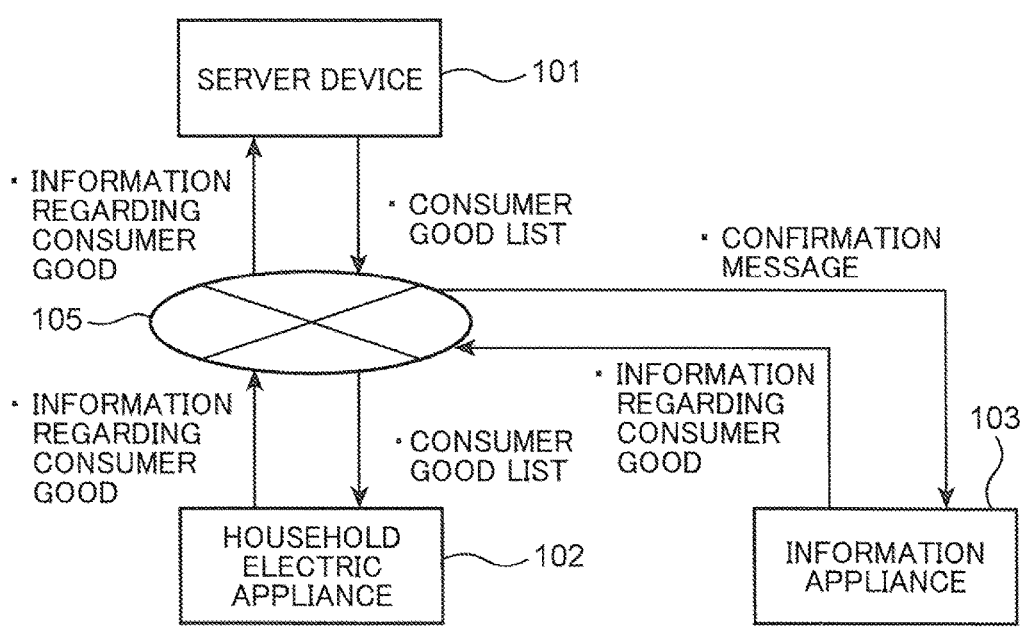
FIG. 1 is a diagram showing a configuration of a point-of-use information obtaining system according to Embodiment 1 of the present invention.

FIG. 1 is a diagram showing a configuration of a point-of-use information obtaining system according to Embodiment 1 of the present invention. The point-of-use information obtaining system according to Embodiment 1 of the present invention includes a server device 101, a household electric appliance 102 and an information appliance 103, as shown in FIG. 1.

The server device 101 is communicatively connected to the household electric appliance 102 via a network 105, and is communicatively connected to the information appliance 103 via the network 105. Note that the network 105 is the Internet, for example.

The server device 101 stores a consumer goods list representing a list of consumer goods, and the server device 101 transmits a consumer goods list in response to a request from the household electric appliance 102 and transmits a confirmation message for confirming the consumer good being currently used to the information appliance 103. In addition, the server device 101 receives, from the household electric appliance 102, and accumulates information regarding the consumer good being currently used by the household electric appliance 102.

The consumer good is consumed by the household electric appliance, and the quantity thereof at the start of consumption is determined in advance. The consumer good is, for example, a detergent, a fabric softener, a frozen food, or the like. Note that other examples of the consumer good will be given later.

The household electric appliance 102 is communicatively connected to the server device 101 via the network 105.

The household electric appliance 102 receives the consumer goods list from the server device 101, presents the received consumer goods list to the user, and accepts an input of information regarding a consumer good. The household electric appliance 102 transmits the accepted information regarding a consumer good to the server device 101.

The information appliance 103 is communicatively connected to the server device 101 via the network 105.

The information appliance 103 receives a confirmation message from the server device 101, presents the received confirmation message to the user, and accepts an input of information regarding a consumer good by the user. The information appliance 103 transmits the accepted information regarding a consumer good to the server device 101.

1.2 Configuration of Server Device 101

Next, a detailed configuration of the server device 101 will be described.

Figure 2:
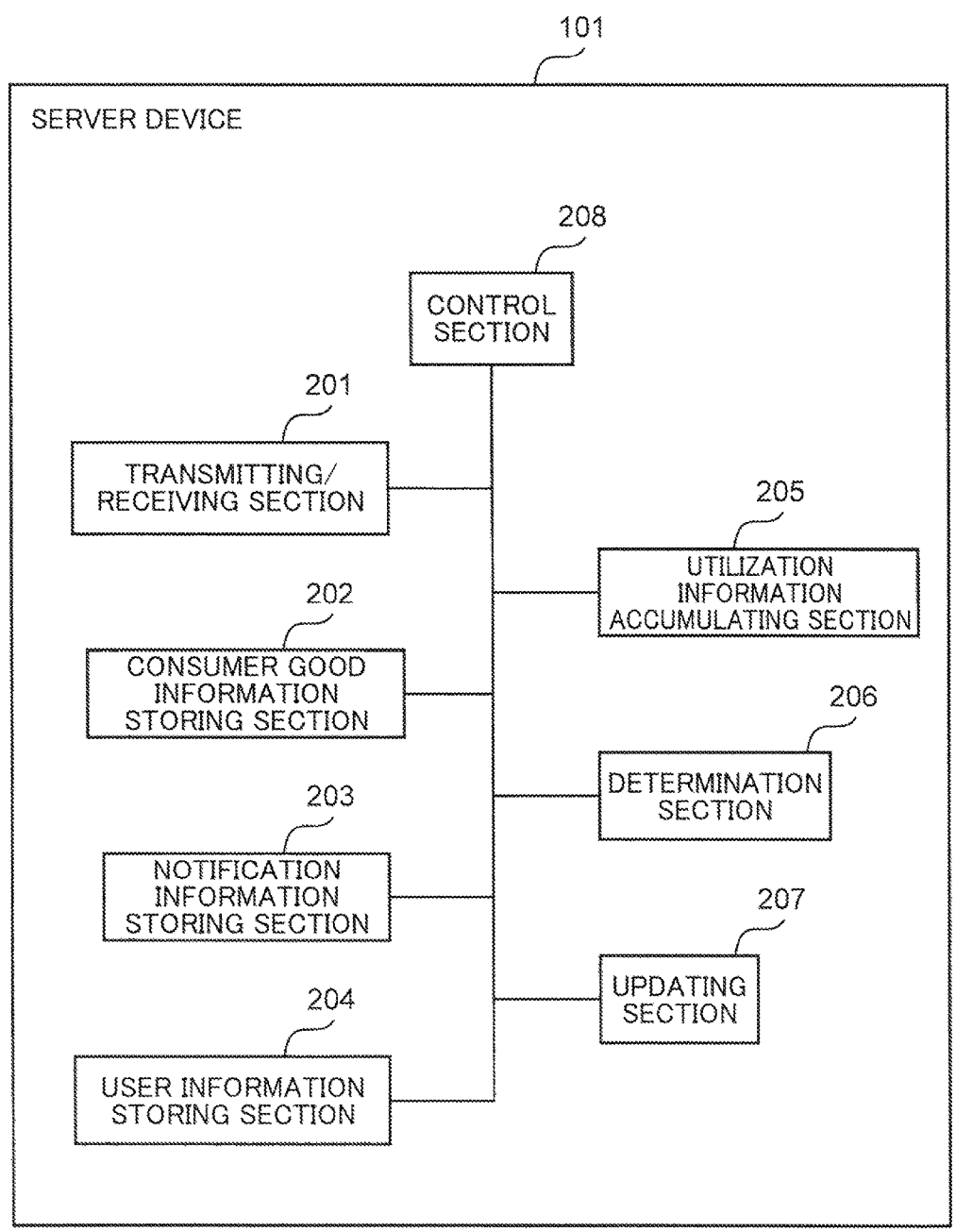
FIG. 2 is a diagram showing a configuration of a server device according to Embodiment 1 of the present invention.

FIG. 2 is a diagram showing a configuration of the server device according to Embodiment 1 of the present invention. As shown in FIG. 2, the server device 101 includes a transmitting/receiving section 201, a consumer good information storing section 202, a notification information storing section 203, a user information storing section 204, a utilization information accumulating section 205, a determination section 206, an updating section 207 and a control section 208.

The server device 101 is implemented by a microprocessor, a random access memory (RAM), a read only memory (ROM), a hard disk, and the like, which are not specifically shown in the figure. The RAM, the ROM or the hard disk stores computer programs, and the functions of the server device 101 are implemented by the microprocessor operating in accordance with the computer programs.

Note that the functional blocks of the server device 101, such as the transmitting/receiving section 201, the consumer good information storing section 202, the notification information storing section 203, the user information storing section 204, the utilization information accumulating section 205, the determination section 206, the updating section 207 and the control section 208, may be typically implemented as a large scale integration (LSI) which is an integrated circuit. The functional blocks may be individually provided in single chips, and a single chip may include one or more functional block or a part of a functional block.

Although it is described as an LSI, it may be referred to as an integrated circuit (IC), a system LSI, a super LSI or an ultra LSI, depending on the degree of integration.

The method of circuit integration is not limited to LSI, but it may be implemented by a dedicated circuit or a general-purpose processor. One may employ a field programmable gate array (FPGA) which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 201

The transmitting/receiving section 201 receives, from the household electric appliance 102, a request for a consumer goods list, and appliance information including an identifier (appliance ID) with which it is possible to uniquely identify the household electric appliance 102. The transmitting/receiving section 201 receives, from the household electric appliance 102, a request for information regarding a consumer good, and an identifier for identifying the household electric appliance 102. FIG. 3 is a diagram showing an example of appliance information according to Embodiment 1. The example of appliance information shown in FIG. 3 indicates that the manufacturer (maker) of the household electric appliance 102 is "Company P", the appliance category is "washing machine", and the appliance ID is "0x123456". The transmitting/receiving section 201 receives a part or whole of the appliance information.

The transmitting/receiving section 201 transmits, to the household electric appliance 102, one of the consumer goods lists stored in the consumer good information storing section 202 that is associated with the household electric appliance 102. The transmitting/receiving section 201 extracts information regarding a consumer good that can be used by the household electric appliance associated with the identifier from the consumer good information storing section 202, and transmits the extracted information regarding the consumer good to the household electric appliance 102. Alternatively, the transmitting/receiving section 201 extracts information regarding a plurality of consumer goods that can be used by the household electric appliance associated with the identifier from the consumer good information storing section 202, and transmits the extracted information regarding the plurality of consumer goods to the household electric appliance 102 as a consumer goods list. A consumer goods list associated with the household electric appliance 102 refers to, for example, a list of laundry detergents, fabric softeners, bleaches, and the like, if the household electric appliance 102 is a washing machine, and refers to a list of foods, frozen foods, and the like, if the household electric appliance 102 is a refrigerator.

The transmitting/receiving section 201 receives, from the household electric appliance 102, information regarding the consumer good selected or determined by the user based on the consumer goods list. The transmitting/receiving section 201 receives, from the household electric appliance 102, information regarding a consumer good which has been determined as a consumer good actually used by the user. The transmitting/receiving section 201 also receives information regarding a consumer good, from the consumer goods list, which has been determined as a consumer good actually used by the user. Information regarding a consumer good refers to, for example, the manufacturer name, the product category or the product name of the consumer good, or a product ID, or the like, with which it is possible to identify the product.

The transmitting/receiving section 201 receives, from the household electric appliance 102, utilization information, such as the amount of consumption of the consumer good used by the user. For example, where the household electric appliance 102 is a washing machine, the transmitting/receiving section 201 receives the amount of consumption of the consumer good (laundry detergent) which is measured by the washing machine itself. The transmitting/receiving section 201 also receives, from the household electric appliance 102, an identifier for identifying the household electric appliance 102, and the operation status of the household electric appliance 102. For example, where the household electric appliance 102 is a washing machine, the transmitting/receiving section 201 receives a utilization notification indicating that the washing machine has been used. The updating section 207 of the server device 101 to be described later calculates the amount of consumption of the consumer good based on the standard amount of consumption for a single use for the consumer good.

The transmitting/receiving section 201 transmits, to the information appliance 103, one of notification information (confirmation messages) stored in the notification information storing section 203 that is for confirming the consumer good being used by the household electric appliance 102.

Figure 4:
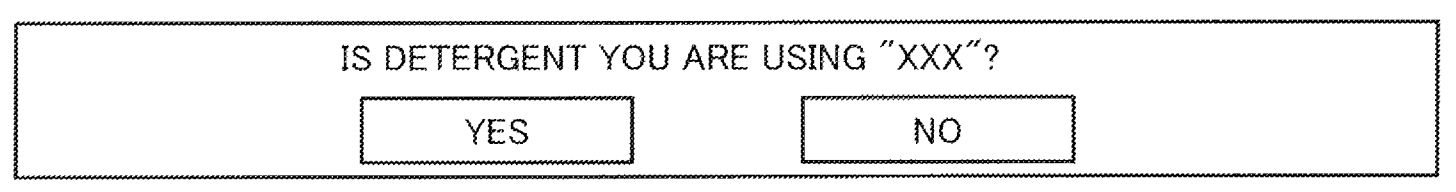
Figure 5:
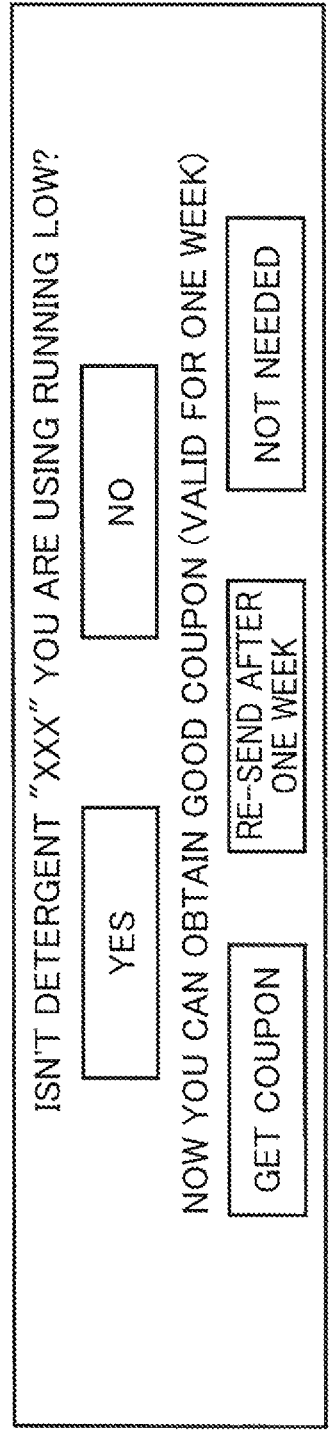
FIG. 5 is a diagram showing an example of a second confirmation message for confirming the consumer good being used and providing discount information (e.g., a coupon).

FIGS. 4 to 6 are diagrams showing examples of confirmation messages. FIG. 4 is a diagram showing an example of a first confirmation message for conforming the consumer good being used, FIG. 5 is a diagram showing an example of a second confirmation message for confirming the consumer good being used and providing discount information (e.g., a coupon), and FIG. 6 is a diagram showing an example of a third confirmation message for confirming the consumer good being used and providing a product sample of another consumer good different from the consumer good being currently used.

The transmitting/receiving section 201 receives, from the information appliance 103, user-input information (a response from the user) for the confirmation message.

Moreover, the transmitting/receiving section 201 may transmit, to the information appliance 103, one of the consumer goods lists stored in the consumer good information storing section 202 that is associated with the household electric appliance 102. The transmitting/receiving section 201 may transmit, to the information appliance 103, information regarding a consumer good that can be used by the household electric appliance associated with the identifier extracted from the consumer good information storing section 202. A consumer goods list associated with the household electric appliance 102 refers to, for example, a list of laundry detergents, fabric softeners, bleaches, and the like, if the household electric appliance 102 is a washing machine, and refers to a list of foods, frozen foods, and the like, if the household electric appliance 102 is a refrigerator.

The transmitting/receiving section 201 may receive, from the information appliance 103, information regarding the consumer good selected or determined by the user based on the consumer goods list. The transmitting/receiving section 201 may receive, from the information appliance 103, information regarding the consumer good which has been determined as a consumer good actually used by the user. Information regarding a consumer good refers to, for example, the manufacturer name, the product category or the product name of the consumer good, or a product ID, or the like, with which it is possible to identify the product.

(2) Consumer Good Information Storing Section 202

The consumer good information storing section 202 stores information regarding consumer goods. The consumer good information storing section 202 stores information regarding a consumer good used by a household electric appliance while the information is associated in advance with the type of the household electric appliance. The consumer good information storing section 202 also stores information regarding a plurality of consumer goods.

FIG. 7 is a diagram showing an example of consumer good information according to Embodiment 1. The consumer good information shown in FIG. 7 includes "appliance category" indicating the type of the appliance with which the consumer good is used, "manufacturer name" indicating the name of the company manufacturing the consumer good, "product category" indicating the type of the consumer good, "product ID" indicating the identifier with which it is possible to identify the consumer good, "product name" indicating the name of the consumer good, and "volume" indicating the size, or the like, of the consumer good. For example, a plurality of consumer goods are associated with washing machines. For example, the consumer good information shown in FIG. 7 indicates that the "clothing detergent" manufactured by "Company A" includes a product whose product ID is "5278" and whose product name is "ATN", and that the volume thereof is "1.0 kg".

(3) Notification Information Storing Section 203

The notification information storing section 203 stores messages to be notified to the user (e.g., a confirmation message). The notification information storing section 203 stores a first confirmation message, a second confirmation message and a third confirmation message shown in FIGS. 4 to 6, for example. The notification information storing section 203 stores a template of a confirmation message, for example. A confirmation message is created by inserting the product name of the consumer good into the template of the confirmation message.

(4) User Information Storing Section 204

The user information storing section 204 stores information (user information) regarding the user who uses the household electric appliance 102 or uses the point-of-use information obtaining system. FIG. 8 is a diagram showing an example of user information according to Embodiment 1. The user information shown in FIG. 8 includes "user ID" indicating the identifier with which it is possible to uniquely identify the user, "family composition" indicating the members of the family including the user, the age of each family member, and the sex of each family member. The user information also includes "appliance ID" for identifying household electric appliances owned by the user or the user's family. The user information further includes "information appliance ID" for identifying the information appliance owned by the user. For example, it can be seen that the family of the user associated with user ID "324-5678" includes four people, and the user owns a household electric appliance associated with appliance ID "0x123456".

(5) Utilization Information Accumulating Section 205

The utilization information accumulating section 205 accumulates information regarding the utilization of consumer goods for each household electric appliance. FIG. 9 is a diagram showing an example of utilization information according to Embodiment 1. The utilization information shown in FIG. 9 includes "appliance ID" indicating the identifier for identifying the household electric appliance, "product ID" indicating the identifier for identifying the consumer good being used, "product name" indicating the name of the consumer good being used, "volume" indicating the size, or the like, of the consumer good, "consumption start date" indicating the date of starting to use the consumer good, "amount of consumption" indicating the amount of the consumer good that has been consumed up to the present, and "estimated remaining amount" indicating the current remaining amount of the consumer good. For example, the utilization information shown in FIG. 9 indicates that the household electric appliance associated with appliance ID "0x123456" is using a consumer good associated with product ID "5278" and product name "ATN", a consumer good associated with product ID "88293" and product name "HMG", and a consumer good associated with product ID "74839" and product name "WHT", and that the estimated remaining amounts of the consumer goods are "50%", "30%" and "80%", respectively.

(6) Updating Section 207

The updating section 207 updates the utilization information accumulated by the utilization information accumulating section 205 based on information regarding a consumer good received by the transmitting/receiving section 201. The updating section 207 stores, in the utilization information accumulating section 205, the consumption status of the consumer good which has been determined as the consumer good actually used by the user, based on information regarding the consumer good received by the transmitting/receiving section 201. The updating section 207 may update the consumption status of the consumer good stored in the utilization information accumulating section 205 based on the amount of consumption of the consumer good received by the transmitting/receiving section 201.

The updating section 207 may estimate the consumption status of the consumer good by using the operation status received by the transmitting/receiving section 201 so as to update the consumption status of the consumer good stored in the utilization information accumulating section 205 based on the estimated consumption status of the consumer good. The operation status includes setting information regarding the operation of the household electric appliance 102, which is set by the user for the household electric appliance 102 when operating the household electric appliance 102. The updating section 207 calculates the amount of consumption of the consumer good from the setting information using a parameter determined in advance according to the operation of the household electric appliance 102.

The utilization information accumulating section 205 further stores the remaining amount of the consumer good. The updating section 207 may estimate, as the consumption status, the remaining amount of the consumer good using the operation status received by the transmitting/receiving section 201 so as to update the remaining amount of the consumer good stored in the utilization information accumulating section 205 based on the estimated remaining amount of the consumer good.

FIG. 10A is a diagram showing an example of utilization information before being updated at the start of consumption of a new consumer good, and FIG. 10B is a diagram showing an example of utilization information after being updated at the start of consumption of a new consumer good. For example, if the transmitting/receiving section 201 receives, as information regarding a consumer good, a manufacturer name "Company A", a product ID "74839" and a product name "WHT", the updating section 207 updates the utilization information stored in the utilization information accumulating section 205 as shown in FIG. 10. Now, the consumption start date is the date when the information regarding the consumer good is received, when the amount of consumption is 0 ml and the estimated remaining amount is 100%.

FIG. 11A is a diagram showing an example of utilization information before being updated at the start of consumption of a new one of the same consumer good which has been used, and FIG. 11B is a diagram showing an example of utilization information after being updated at the start of consumption of a new one of the same consumer good which has been used. If the transmitting/receiving section 201 receives information regarding a consumer good that already exists in the utilization information, the updating section 207 updates the utilization information stored in the utilization information accumulating section 205 as shown in FIG. 11B.

For example, at the start of consumption of a new one of the same fabric softener associated with the manufacturer name "Company A", the product ID "88293" and the product name "HMG" which has already been used, the updating section 207 updates the consumption start date, the amount of consumption and the estimated remaining amount already stored associated with the product ID "88293" and the product name "HMG". Now, the consumption start date is the date when the information regarding the consumer good is received, when the amount of consumption is 0 ml and the estimated remaining amount is 100%.

FIG. 12A is a diagram showing an example of utilization information before being updated when updating the consumption status of a consumer good that is already being used, and FIG. 12B is a diagram showing an example of utilization information after being updated when updating the consumption status of a consumer good that is already being used. The updating section 207 updates the utilization information accumulated in the utilization information accumulating section 205 based on the utilization information such as the amount of consumption of the consumer good received by the transmitting/receiving section 201. For example, if the transmitting/receiving section 201 receives utilization information, from the household electric appliance associated with the appliance ID "0x123456", indicating that 100 g of the clothing detergent associated with the product ID "5278" and the product name "ATN" has been used, the updating section 207 updates the utilization information stored in the utilization information accumulating section 205 as shown in FIG. 12B. Herein, the amount of consumption is updated to 600 g, and the estimated remaining amount is updated to 40%.

(7) Determination Section 206

The determination section 206 determines whether or not the estimated remaining amount included in the utilization information accumulated in the utilization information accumulating section 205 is less than or equal to a predetermined set value. When it is determined that the estimated remaining amount is not less than or equal to a predetermined set value, the determination section 206 does nothing. When it is determined that the estimated remaining amount is less than or equal to a predetermined set value, the determination section 206 transmits a notification information (confirmation message) via the transmitting/receiving section 201.

The determination section 206 determines whether or not to transmit a confirmation message for confirming the consumer good being used, based on the updated consumption status of the consumer good. The determination section 206 also determines whether or not the updated remaining amount of the consumer good is less than or equal to a predetermined value. When it is determined that the updated remaining amount of the consumer good is less than or equal to a predetermined value, the transmitting/receiving section 201 transmits a confirmation message for confirming the consumer good being used.

For example, with the utilization information of FIG. 9, if the set value is 30%, the determination section 206 determines that the estimated remaining amount of the consumer good associated with the product name "HMG" and the product "88293" is less than or equal to 30%. Then, the determination section 206 transmits the first confirmation message, the second confirmation message or the third confirmation message shown in FIG. 4, FIG. 5 or FIG. 6, for example, via the transmitting/receiving section 201. The first confirmation message is composed of a sentence "Is the fabric softener you are using "HMG"?", the second confirmation message is composed of a sentence "Isn't the fabric softener "HMG" you are using running low? Now you can obtain a good coupon", and the third confirmation message is composed of a sentence "Isn't the fabric softener "HMG" you are using running low? Now you can try a free sample of the fabric softener "SFN"".

The determination section 206 determines whether or not the user input (a response from the user for the confirmation message) received via the transmitting/receiving section 201 coincides with the utilization information accumulated in the utilization information accumulating section 205. That is, the determination section 206 determines whether or not the consumer good being currently used by the user coincides with the consumer good included in the utilization information accumulated in the utilization information accumulating section 205. When it is determined that the consumer good being currently used by the user coincides with the consumer good included in the utilization information, the determination section 206 does nothing. If the consumer good being currently used by the user does not coincide with the consumer good included in the utilization information, the determination section 206 transmits, via the transmitting/receiving section 201, one of the consumer goods lists stored in the consumer good information storing section 202 that is associated with the household electric appliance 102.

For example, if the first confirmation message "Is the fabric softener you are using "HMG"?" is transmitted based on the utilization information of FIG. 9, and a response from the user "Yes" is received, the determination section 206 does nothing. On the other hand, if the first confirmation message "Is the fabric softener you are using "HMG"?" is transmitted and a response from the user "No" is received, the determination section 206 transmits a consumer goods list via the transmitting/receiving section 201.

Note that the determination section 206 may determine whether or not the updated remaining amount of the consumer good is 0. When it is determined that the updated remaining amount of the consumer good is 0, the transmitting/receiving section 201 may transmit a confirmation message for confirming the consumer good being used.

(8) Control Section 208

The control section 208 implements the functions of the server device 101 by managing and controlling the transmitting/receiving section 201, the consumer good information storing section 202, the notification information storing section 203, the user information storing section 204, the utilization information accumulating section 205, the determination section 206 and the updating section 207 described above.

1.3 Configuration of Household Electric Appliance 102

Next, a detailed configuration of the household electric appliance 102 will be described.

FIG. 13 is a diagram showing a configuration of a household electric appliance according to Embodiment 1 of the present invention. As shown in FIG. 13, the household electric appliance 102 includes a transmitting/receiving section 301, a display section 302, a utilization information obtaining section 303, an input accepting section 304, an appliance information storing section 305 and a control section 306.

The household electric appliance 102 is implemented by a microprocessor, a RAM, a ROM, a hard disk, and the like, which are not specifically shown in the figure. The RAM, the ROM or the hard disk stores computer programs, and the functions of the household electric appliance 102 are implemented by the microprocessor operating in accordance with the computer programs.

Note that the functional blocks, such as the transmitting/receiving section 301, the display section 302, the utilization information obtaining section 303, the input accepting section 304, the appliance information storing section 305 and the control section 306, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 301

The transmitting/receiving section 301 transmits, to the server device 101, a request for a consumer goods list, and appliance information including an identifier (appliance ID) with which it is possible to uniquely identify the household electric appliance 102. The example of appliance information shown in FIG. 3 indicates that the manufacturer (maker) of the household electric appliance 102 is "Company P", the appliance category is "washing machine", and the appliance ID is "0x123456". The transmitting/receiving section 301 transmits a part or whole of the appliance information.

The transmitting/receiving section 301 receives a consumer goods list associated with the household electric appliance 102 from the server device 101.

The transmitting/receiving section 301 transmits, to the server device 101, user-input information accepted by the input accepting section 304 for the consumer goods list displayed by the display section 302, i.e., information regarding the consumer good selected or determined by the user based on the consumer goods list. Information regarding a consumer good refers to, for example, the manufacturer name, the product category or the product name of the consumer good, or a product ID, or the like, with which it is possible to identify the product.

The transmitting/receiving section 301 transmits, to the server device 101, utilization information, such as the amount of consumption of the consumer good obtained by the utilization information obtaining section 303. For example, where the household electric appliance 102 is a washing machine, the transmitting/receiving section 301 transmits the amount of consumption of the consumer good (laundry detergent) which is measured by the washing machine itself. The transmitting/receiving section 301 also transmits, to the server device 101, an identifier for identifying the household electric appliance 102, and the operation status of the household electric appliance 102. For example, where the household electric appliance 102 is a washing machine, the transmitting/receiving section 301 receives a utilization notification indicating that the washing machine has been used. The server device 101 calculates the amount of consumption of the consumer good based on the standard amount of consumption for a single use for the consumer good. With a washing machine, the amount of detergent is determined based on the washing course, the amount of clothing in the wash tub, etc. Thus, the amount of detergent consumed can be calculated once the setting information, such as the washing course and the amount of clothing in the wash tub, is known.

(2) Display Section 302

The display section 302 displays, and presents to the user, a consumer goods list received via the transmitting/receiving section 301. The display section 302 displays the information regarding a consumer good received by the transmitting/receiving section 301.

(3) Utilization Information Obtaining Section 303

The utilization information obtaining section 303 obtains utilization information such as the amount of consumption of the consumer good. For example, where the household electric appliance 102 is a washing machine, the household electric appliance 102 may include a tank for storing a laundry detergent in advance, and a sensor for measuring the actually amount of consumption of the laundry detergent which is put and stored in the tank in advance. The utilization information obtaining section 303 may obtain, as utilization information, information indicating that the washing machine has been used. That is, the utilization information obtaining section 303 may obtain the operation status of the household electric appliance 102.

(4) Input Accepting Section 304

The input accepting section 304 accepts user-input information for the consumer goods list displayed by the display section 302, i.e., information regarding the consumer good selected or determined by the user based on the consumer goods list. The input accepting section 304 accepts user's selection of a consumer good actually used from the consumer goods list displayed by the display section 302.

(5) Appliance Information Storing Section 305

The appliance information storing section 305 stores appliance information with which it is possible to uniquely identify the household electric appliance 102. The appliance information includes the manufacturer name of the manufacturer who manufactured the household electric appliance, the appliance category indicating the type of the household electric appliance, and the appliance ID for identifying the household electric appliance. The example of appliance information shown in FIG. 3 indicates that the manufacturer (maker) of the household electric appliance 102 is "Company P", the appliance category is "washing machine", and the appliance ID is "0x123456".

(6) Control Section 306

The control section 306 implements the functions of the household electric appliance 102 by managing and controlling the transmitting/receiving section 301, the display section 302, the utilization information obtaining section 303, the input accepting section 304 and the appliance information storing section 305 described above.

1.4 Configuration of Information Appliance 103

Next, a detailed configuration of the information appliance 103 will be described.

Figure 14:
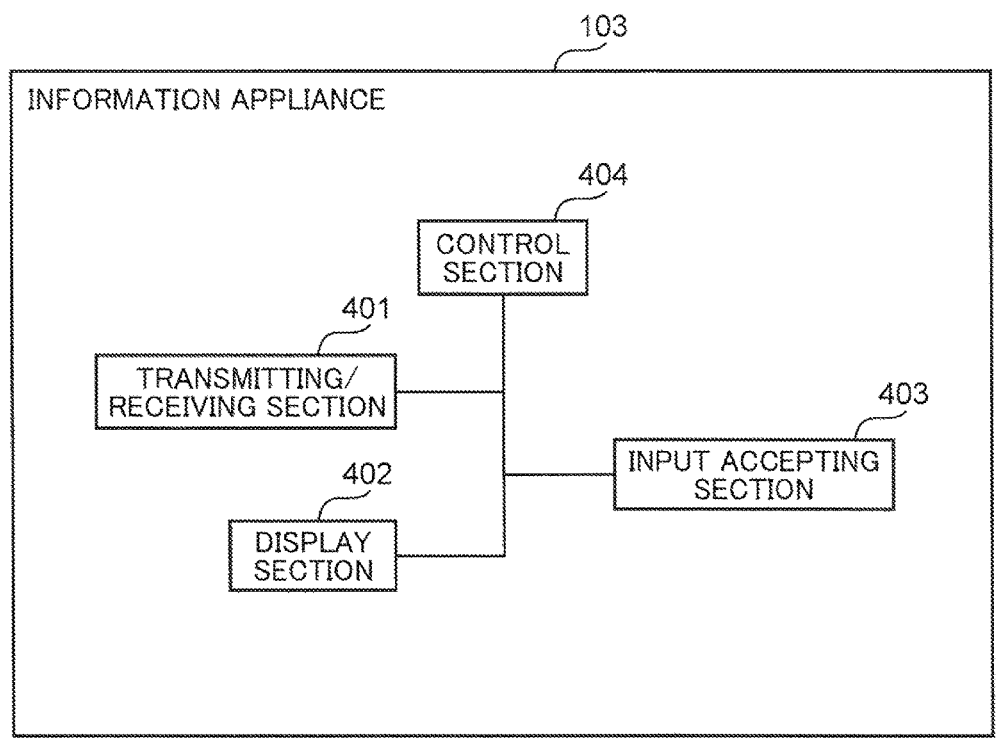
FIG. 14 is a diagram showing a configuration of an information appliance according to Embodiment 1 of the present invention.

FIG. 14 is a diagram showing a configuration of an information appliance according to Embodiment 1 of the present invention. As shown in FIG. 14, the information appliance 103 includes a transmitting/receiving section 401, a display section 402, an input accepting section 403 and a control section 404.

The information appliance 103 is implemented by a microprocessor, a RAM, a ROM, a hard disk, and the like, which are not specifically shown in the figure. The RAM, the ROM or the hard disk stores computer programs, and the functions of the information appliance 103 are implemented by the microprocessor operating in accordance with the computer programs.

Note that the functional blocks, such as the transmitting/receiving section 401, the display section 402, the input accepting section 403 and the control section 404, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 401

The transmitting/receiving section 401 receives, from the server device 101, a confirmation message with which the household electric appliance 102 confirms the consumer good being used.

The transmitting/receiving section 401 transmits, to the server device 101, user-input information accepted by the input accepting section 403 for the confirmation message displayed by the display section 402, i.e., a response from the user.

The transmitting/receiving section 401 receives, from the server device 101, a consumer goods list associated with the household electric appliance 102.

The transmitting/receiving section 401 transmits, to the server device 101, user-input information accepted by the input accepting section 403 for the consumer goods list displayed by the display section 402, i.e., information regarding the consumer good selected or determined by the user based on the consumer goods list. Information regarding a consumer good refers to, for example, the manufacturer name, the product category or the product name of the consumer good, or a product ID, or the like, with which it is possible to identify the product.

(2) Display Section 402

The display section 402 displays, and presents to the user, a confirmation message received via the transmitting/receiving section 401.

(3) Input Accepting Section 403

The input accepting section 403 accepts a user input (a response from the user) for the confirmation message displayed by the display section 402.

The input accepting section 403 accepts user-input information for the consumer goods list displayed by the display section 402, i.e., information regarding the consumer good selected or determined by the user based on the consumer goods list. The input accepting section 403 accepts user's selection of a consumer good actually used from the consumer goods list displayed by the display section 402.

(4) Control Section 404

The control section 404 implements the functions of the information appliance 103 by managing and controlling the transmitting/receiving section 401, the display section 402 and the input accepting section 403 described above.

1.5 Operation by which Server Device Obtains Utilization Information from Household Electric Appliance An example of an operation by which the server device 101 obtains utilization information from the household electric appliance 102 will be described with reference to FIGS. 15 to 17.

Figure 15:
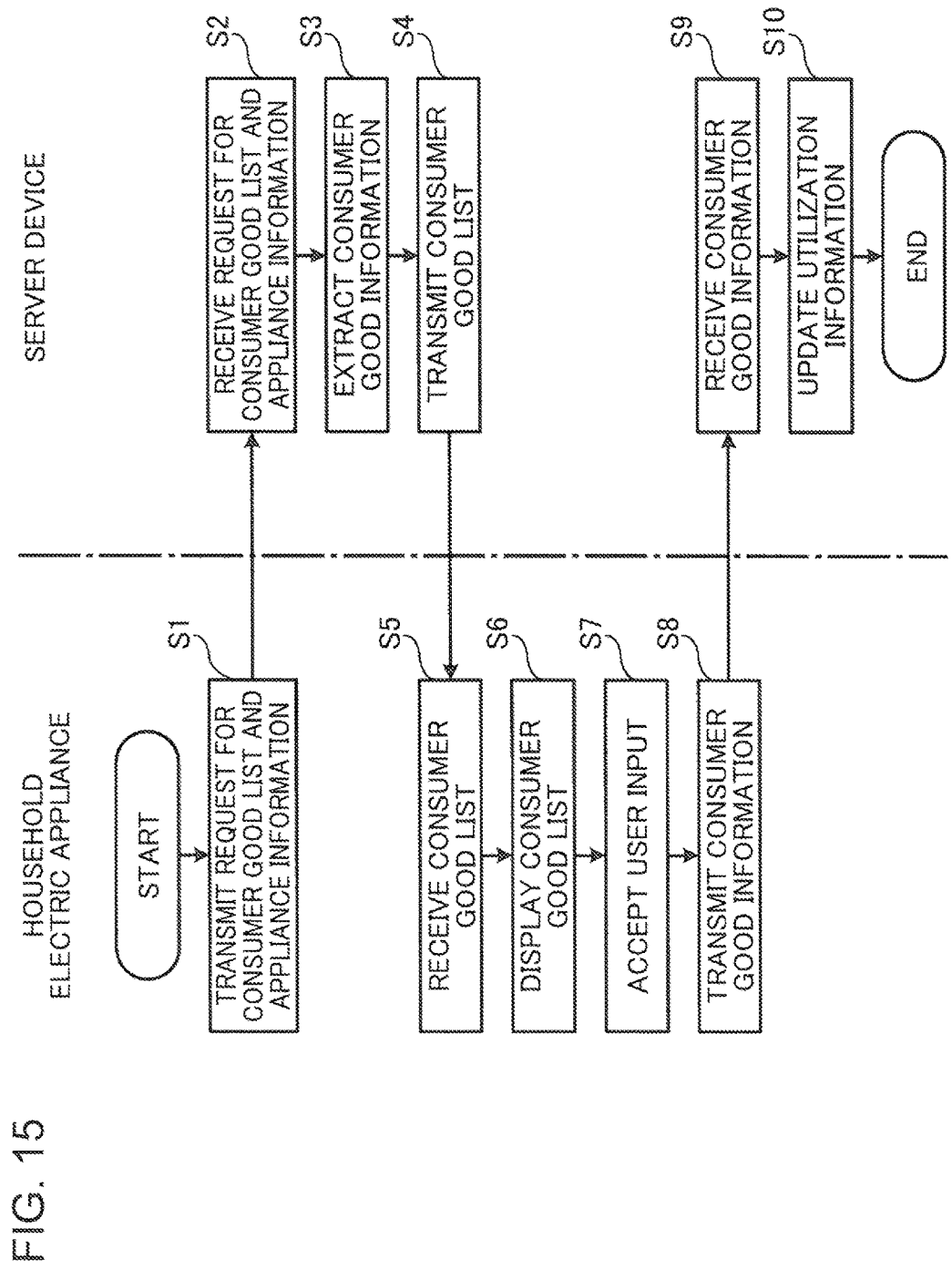
FIG. 15 is a flow chart showing an example of an operation by which the server device obtains utilization information from a household electric appliance for the first time according to Embodiment 1 of the present invention.

FIG. 15 is a flow chart showing an example of an operation by which the server device obtains utilization information from a household electric appliance for the first time according to Embodiment 1 of the present invention.

First, the transmitting/receiving section 301 of the household electric appliance 102 transmits, to the server device 101, a request for a consumer goods list, and appliance information stored in the appliance information storing section 305 (step S1). Note that the timing at which the transmitting/receiving section 301 transmits the request for a consumer goods list and the appliance information to the server device 101 is, for example, the timing at which the power of the household electric appliance 102 is turned ON for the first time, the timing at which a button for requesting a consumer goods list, which is provided on the household electric appliance 102, is pressed, the timing at which the household electric appliance 102 is connected to a network for the first time, or the like.

Then, the transmitting/receiving section 201 of the server device 101 receives the request for a consumer goods list and the appliance information transmitted by the household electric appliance 102 (step S2).

Then, the transmitting/receiving section 201 extracts, from the consumer good information storing section 202, a consumer good information associated with the appliance category included in the received appliance information (step S3). Note that the consumer good information includes the appliance category, the manufacturer name, the product category, the product ID, the product name and the volume. The consumer good information may also include an image of the consumer good.

Then, the transmitting/receiving section 201 transmits, to the household electric appliance 102, the extracted consumer good information as a consumer goods list (step S4).

Note that the consumer goods list includes at least one piece of consumer good information.

Then, the transmitting/receiving section 301 of the household electric appliance 102 receives the consumer goods list transmitted by the server device 101 (step S5).

Then, the display section 302 displays the consumer goods list received by the transmitting/receiving section 301 (step S6). In this process, the display section 302 does not need to display all of the consumer good information, but may display only some of the consumer good information (e.g., the product name) with which it is possible to identify the consumer good. The display section 302 may also display an image of the consumer good. Thus, the user can more easily select the consumer good being currently used.

Then, the input accepting section 304 accepts a user input (step S7). The input accepting section 304 accepts selection of a consumer good being currently used by the user from the consumer goods list being displayed. Where the input accepting section 304 is implemented by a touch panel, for example, the user touches the consumer good being currently used by the user from the consumer goods list displayed on the display section 302. Where the input accepting section 304 is implemented by a button, for example, the user presses a button so as to select the consumer good being currently used by the user from the consumer goods list being displayed on the display section 302.

Then, the transmitting/receiving section 301 transmits, to the server device 101, information regarding a consumer good (consumer good information) accepted by the input accepting section 304 (step S8).

Then, the transmitting/receiving section 201 of the server device 101 receives information regarding a consumer good (consumer good information) transmitted by the household electric appliance 102 (step S9).

Then, the updating section 207 updates the utilization information accumulated in the utilization information accumulating section 205 based on the consumer good information received by the transmitting/receiving section 201 (step S10). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Next, an operation by which the server device 101, which has utilization information already stored therein, obtains utilization information from the household electric appliance 102 will be described.

Figure 16:
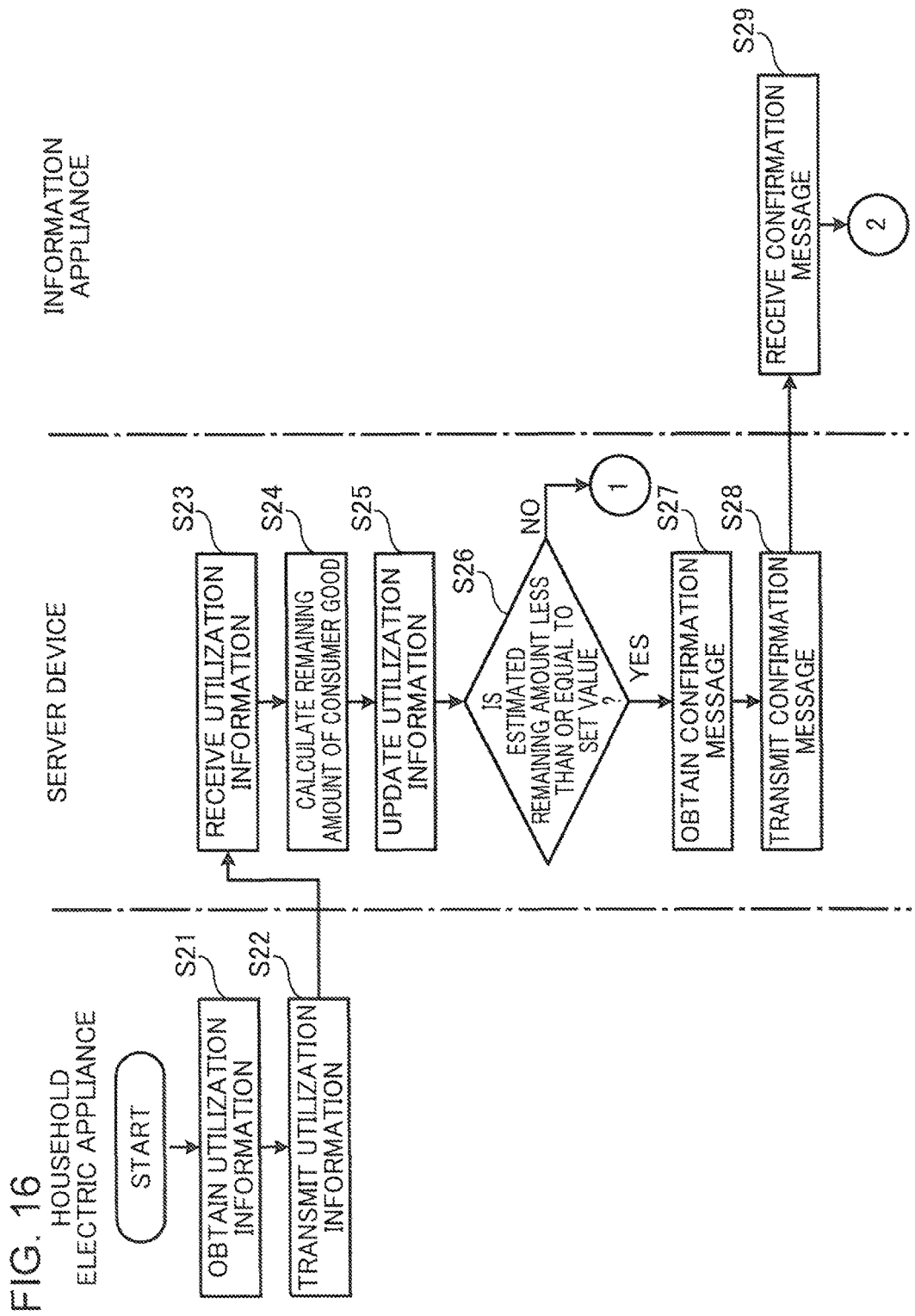
FIG. 16 is a first flow chart showing an example of an operation by which the server device, which has utilization information already stored therein, obtains utilization information from a household electric appliance according to Embodiment 1 of the present invention.
Figure 17:
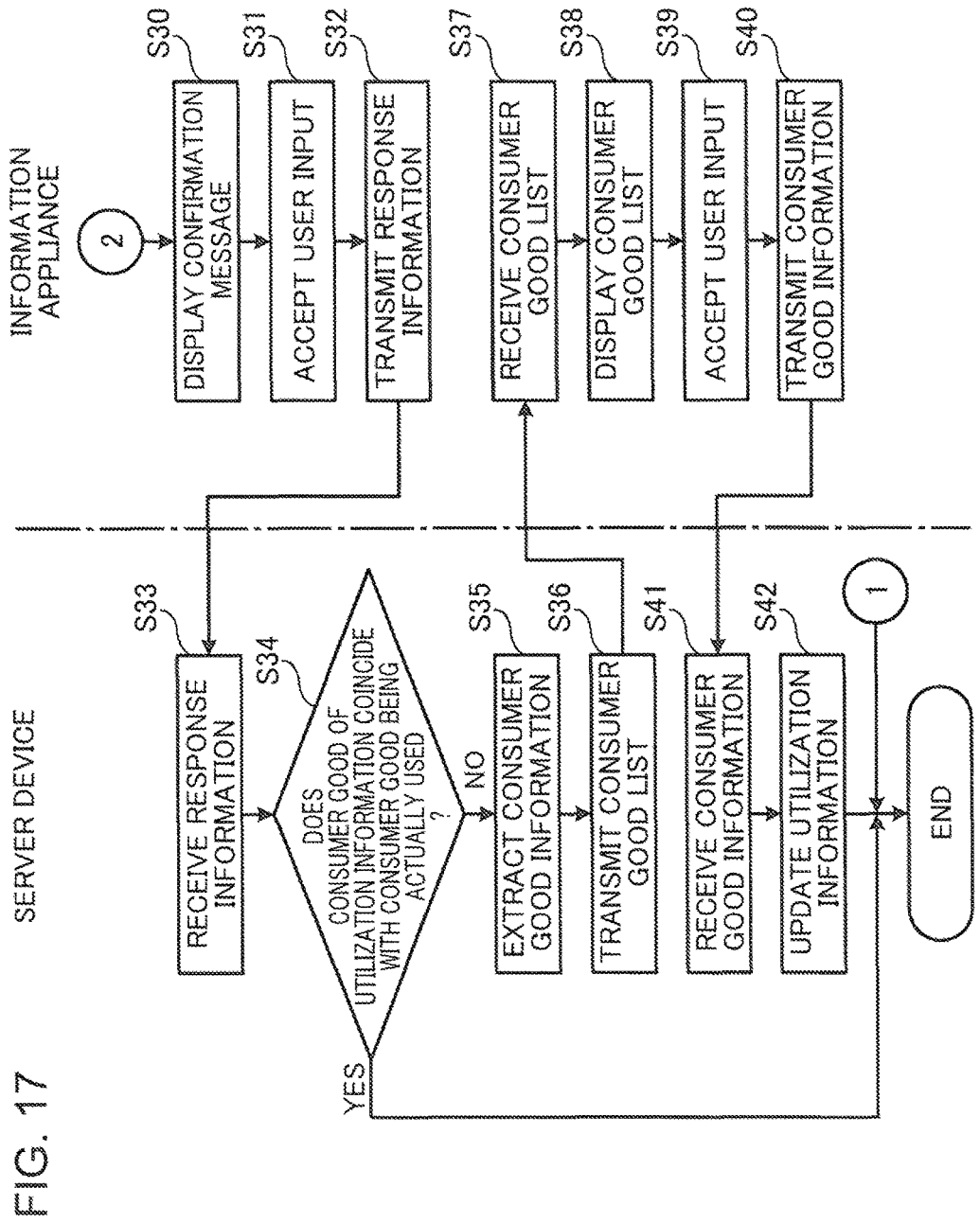
FIG. 17 is a second flow chart showing an example of an operation by which the server device, which has utilization information already stored therein, obtains utilization information from a household electric appliance according to Embodiment 1 of the present invention.

FIG. 16 is a first flow chart showing an example of an operation by which the server device, which has utilization information already stored therein, obtains utilization information from a household electric appliance according to Embodiment 1 of the present invention, and FIG. 17 is a second flow chart showing an example of an operation by which the server device, which has utilization information already stored therein, obtains utilization information from a household electric appliance according to Embodiment 1 of the present invention.

First, the utilization information obtaining section 303 of the household electric appliance 102 obtains utilization information (step S21).

Then, the transmitting/receiving section 301 transmits, to the server device 101, the utilization information obtained by the utilization information obtaining section 303 (step S22).

Then, the transmitting/receiving section 201 of the server device 101 receives the utilization information transmitted by the household electric appliance 102 (step S23).

Then, the updating section 207 calculates the remaining amount of the consumer good based on the utilization information received by the transmitting/receiving section 201 (step S24). If the utilization information includes the operation status of the household electric appliance 102, the updating section 207 calculates the remaining amount of the consumer good based on the operation status of the household electric appliance 102. Note that if the utilization information includes the amount of consumption of the consumer good, the updating section 207 calculates the remaining amount of the consumer good based on the volume of the consumer good and the amount of consumption of the consumer good. Although the remaining amount of a consumer good in Embodiment 1 is expressed as a percent, the present invention is not limited to this, and it may be expressed as a value obtained by subtracting the amount of consumption of the consumer good from the volume of the consumer good.

Then, the updating section 207 updates the utilization information accumulated in the utilization information accumulating section 205 based on the utilization information received by the transmitting/receiving section 201 and the remaining amount calculated (step S25). In this process, the utilization information associated with the consumer good identified by the utilization information received this time is already accumulated in the utilization information accumulating section 205. Therefore, the updating section 207 updates the amount of consumption included in the utilization information accumulated in the utilization information accumulating section 205 to the amount of consumption included in the received utilization information or the amount of consumption calculated from the utilization information. The updating section 207 also updates the remaining amount included in the utilization information accumulated in the utilization information accumulating section 205 to the remaining amount calculated from the received utilization information.

Then, the determination section 206 of the server device 101 determines whether or not the estimated remaining amount of the utilization information accumulated in the utilization information accumulating section 205 is less than or equal to a predetermined set value (step S26). When it is determined that the estimated remaining amount is not less than or equal to a set value (NO in step S26), the determination section 206 does nothing and the process ends.

On the other hand, when it is determined that the estimated remaining amount is less than or equal to a set value (YES in step S26), the determination section 206 obtains notification information stored in the notification information storing section 203 (step S27). The notification information is a confirmation message for confirming the consumer good being used. The determination section 206 creates a confirmation message by reading out a confirmation message stored in the notification information storing section 203, and inserting the product name included in the utilization information into the read-out confirmation message.

Then, the transmitting/receiving section 201 transmits the obtained notification information (confirmation message) to the information appliance 103 (step S28).

Then, the transmitting/receiving section 401 of the information appliance 103 receives the notification information (confirmation message) transmitted by the server device 101 (step S29).

Then, the display section 402 displays the notification information (confirmation message) received by the transmitting/receiving section 401 (step S30).

Then, the input accepting section 403 of the information appliance 103 accepts a user input, i.e., a response from the user for the confirmation message (step S31).

Then, the transmitting/receiving section 401 transmits, to the server device 101, response information for the confirmation message accepted by the input accepting section 403 (step S32).

Then, the transmitting/receiving section 201 of the server device 101 receives the response information transmitted by the information appliance 103 (step S33).

Then, the determination section 206 determines whether or not the consumer good identified by the utilization information accumulated in the utilization information accumulating section 205 coincides with the consumer good being currently actually used by the user based on the response information received by the transmitting/receiving section 201 (step S34).

That is, if affirmative response information is obtained for the confirmation message for confirming whether or not the consumer good identified by the utilization information accumulated in the utilization information accumulating section 205 coincides with the consumer good being currently actually used by the user, the determination section 206 determines that the consumer good identified by the utilization information accumulated in the utilization information accumulating section 205 coincides with the consumer good being currently actually used by the user. If negative response information is obtained for the confirmation message, the determination section 206 determines that the consumer good identified by the utilization information accumulated in the utilization information accumulating section 205 does not coincide with the consumer good being currently actually used by the user.

When it is determined that the consumer good identified by the utilization information coincides with the consumer good being currently actually used by the user (YES in step S34), the determination section 206 does nothing and the process ends.

On the other hand, when it is determined that the consumer good identified by the utilization information does not coincide with the consumer good being currently actually used by the user (NO in step S34), the transmitting/receiving section 201 of the server device 101 extracts the consumer good information associated with the appliance ID included in the utilization information from the consumer good information storing section 202 (step S35). Note that the consumer good information includes the appliance category, the manufacturer name, the product category, the product ID, the product name and the volume. The consumer good information may also include an image of the consumer good.

Then, the transmitting/receiving section 201 transmits, to the information appliance 103, the extracted consumer good information as a consumer goods list (step S36). Note that the consumer goods list includes at least one piece of consumer good information.

Then, the transmitting/receiving section 401 of the information appliance 103 receives the consumer goods list transmitted by the server device 101 (step S37).

Then, the display section 402 displays the consumer goods list received by the transmitting/receiving section 401 (step S38). In this process, the display section 402 does not need to display all of the consumer good information, but may display only some of the consumer good information (e.g., the product name) with which it is possible to identify the consumer good. The display section 402 may also display an image of the consumer good. Thus, the user can more easily select the consumer good being currently used.

Then, the input accepting section 403 accepts a user input (step S39). The input accepting section 403 accepts selection of a consumer good being currently used by the user from the consumer goods list being displayed. Where the input accepting section 403 is implemented by a touch panel, for example, the user touches the consumer good being currently used by the user from the consumer goods list displayed on the display section 402. Where the input accepting section 403 is implemented by a button, for example, the user presses a button so as to select the consumer good being currently used by the user from the consumer goods list being displayed on the display section 402.

Then, the transmitting/receiving section 401 transmits, to the server device 101, information regarding a consumer good (consumer good information) accepted by the input accepting section 403 (step S40).

Then, the transmitting/receiving section 201 of the server device 101 receives information regarding a consumer good (consumer good information) transmitted by the information appliance 103 (step S41).

Then, the updating section 207 updates the utilization information accumulated in the utilization information accumulating section 205 based on the consumer good information received by the transmitting/receiving section 201 (step S42). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Embodiment 2

2.1 Configuration of Point-of-Use Information Obtaining System

Figure 18:
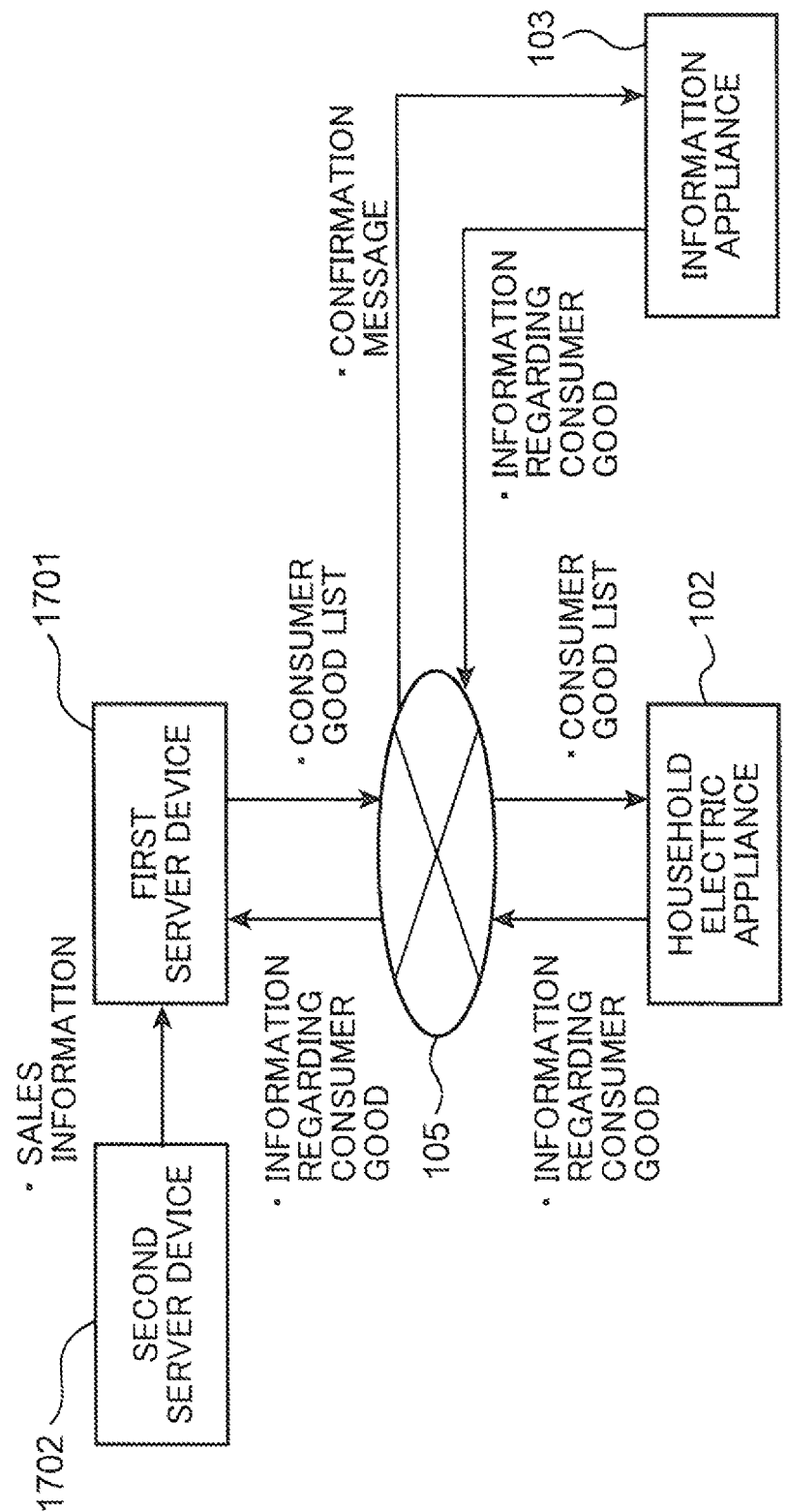
FIG. 18 is a diagram showing a configuration of a point-of-use information obtaining system according to Embodiment 2 of the present invention.

FIG. 18 is a diagram showing a configuration of a point-of-use information obtaining system according to Embodiment 2 of the present invention. The point-of-use information obtaining system according to Embodiment 2 of the present invention includes a first server device 1701, a second server device 1702, the household electric appliance 102 and the information appliance 103, as shown in FIG. 18.

The first server device 1701 is communicatively connected to the household electric appliance 102 via the network 105, and is communicatively connected to the information appliance 103 via the network 105. The first server device 1701 is also communicatively connected to the second server device 1702. Note that the network 105 is the Internet, for example. The first server device 1701 may be communicatively connected to the second server device 1702 via the network 105.

The first server device 1701 receives and stores sales information from the second server device 1702. The sales information is information regarding a consumer good purchased by the user. In response to a request from the household electric appliance 102, the first server device 1701 selects a consumer goods list associated with the household electric appliance 102 based on the sales information to transmit the consumer goods list, or transmits a confirmation message for confirming the consumer good being currently used to the information appliance 103. In addition, the first server device 1701 receives and accumulates, from the household electric appliance 102, information regarding the consumer good being currently used by the household electric appliance 102.

The second server device 1702 stores sales information, and transmits the stored sales information to the first server device 1701.

Note that the configurations of the household electric appliance 102 and the information appliance 103 of Embodiment 2 are similar to those of Embodiment 1 and will not be described below.

2.2 Configuration of First Server Device 1701

Next, a detailed configuration of the first server device 1701 will be described.

Figure 19:
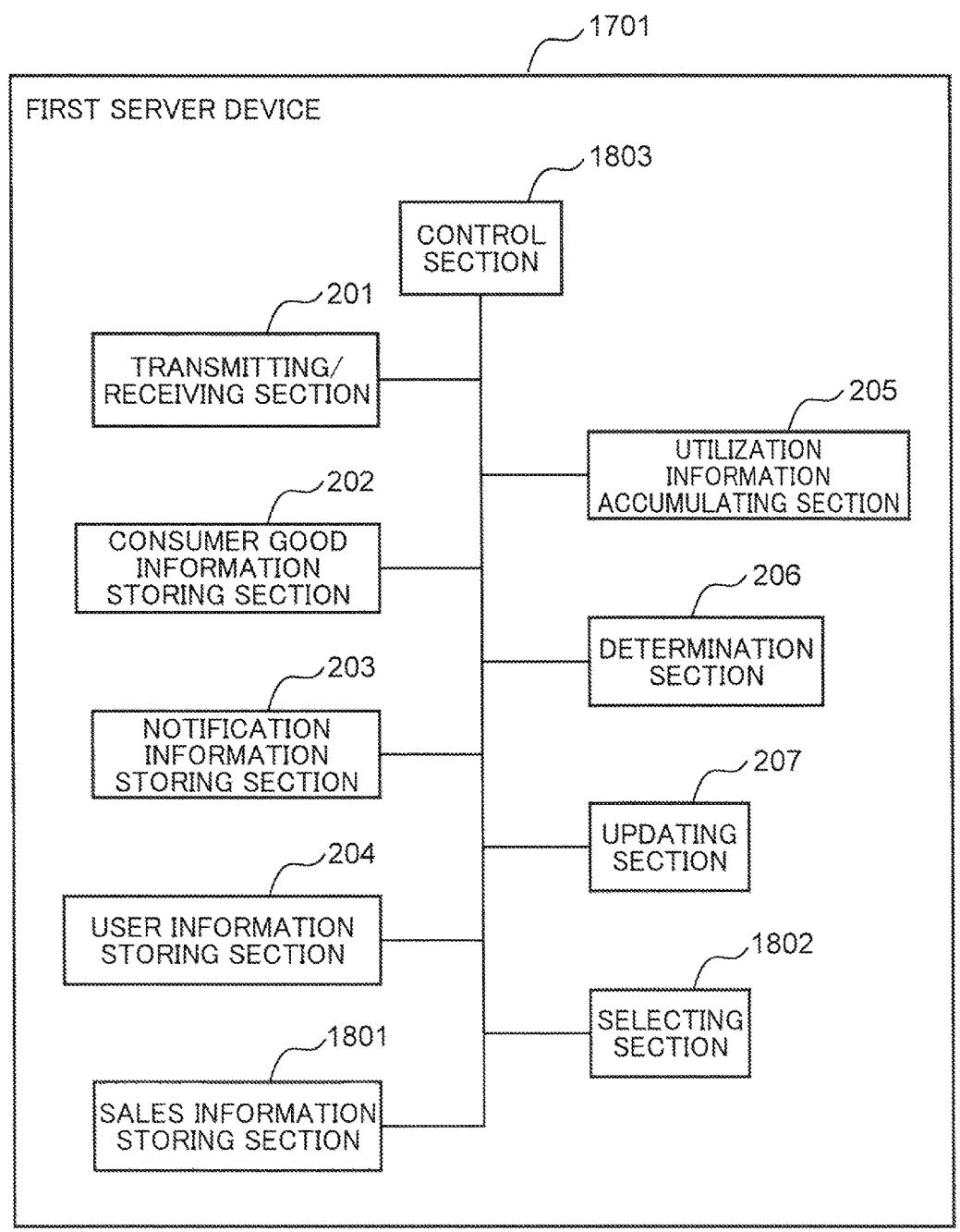
FIG. 19 is a diagram showing a configuration of a first server device according to Embodiment 2 of the present invention.

FIG. 19 is a diagram showing a configuration of a first server device according to Embodiment 2 of the present invention. As shown in FIG. 19, the first server device 1701 includes the transmitting/receiving section 201, the consumer good information storing section 202, the notification information storing section 203, the user information storing section 204, the utilization information accumulating section 205, the determination section 206, the updating section 207, a sales information storing section 1801, a selecting section 1802 and a control section 1803.

The first server device 1701 is implemented by a microprocessor, a RAM, a ROM, a hard disk, and the like, which are not specifically shown in the figure. The RAM, the ROM or the hard disk stores computer programs, and the functions of the first server device 1701 are implemented by the microprocessor operating in accordance with the computer programs.

Note that the functional blocks of the first server device 1701, such as the transmitting/receiving section 201, the consumer good information storing section 202, the notification information storing section 203, the user information storing section 204, the utilization information accumulating section 205, the determination section 206, the updating section 207, the sales information storing section 1801, the selecting section 1802 and the control section 1803, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 201 to Updating Section 207

The configurations of the transmitting/receiving section 201, the consumer good information storing section 202, the notification information storing section 203, the user information storing section 204, the utilization information accumulating section 205, the determination section 206 and the updating section 207 are similar to those of Embodiment 1 and will not be described below.

(2) Sales Information Storing Section 1801

The sales information storing section 1801 stores information regarding a consumer good that the user has purchased at a retail store, i.e., sales information regarding a consumer good that the retail store has sold to the user. The transmitting/receiving section 201 receives the sales information transmitted by the second server device 1702, and stores the sales information in the sales information storing section 1801. The sales information storing section 1801 stores sales information, in which information for identifying the consumer good sold to the user is associated with the type of the household electric appliance with which the consumer good is to be used.

FIG. 20 is a diagram showing an example of sales information according to Embodiment 2. The example of sales information shown in FIG. 20 includes, associated with one another, "user ID" indicating the identifier for identifying the purchasing user, "purchase date" indicating the date the consumer good was purchased, "product ID" indicating the identifier with which it is possible to identify the purchased consumer good, "product name" indicating the name of the purchased consumer good, "unit price" indicating the price per one unit of the purchased consumer good, the "number of units" indicating the number of units of the consumer good purchased, and "associated appliance" indicating the type of appliances with which the purchased consumer good is to be used.

The sales information shown in FIG. 20, for example, indicates that on Mar. 3, 2013, the user identified by the user ID "324-5678" purchased two units of the consumer good identified by the product ID "5278" and the product name "ATN", purchased two units of the consumer good identified by the product ID "11965" and the product name "TYA", and purchased one unit of the consumer good identified by the product ID "326" and the product name "JIK". It is also indicated that the associated appliance for the consumer good identified by the product ID "5278" and the product name "ATN" is a "washing machine", indicating that it is to be used with a washing machine. It is also indicated that the associated appliance for the consumer good identified by the product ID "11965" and the product name "TYA" is a "microwave oven", indicating that it is to be used with a microwave oven. It is also indicated that the associated appliance for the consumer good identified by the product ID "326" and the product name "JIK" is "others", indicating that it is not related to household electric appliances.

(3) Selecting Section 1802

Based on the appliance ID included in the appliance information received via the transmitting/receiving section 201, the selecting section 1802 identifies the user who uses the household electric appliance associated with that appliance ID from the user information stored in the user information storing section 204, and selects one of the consumer goods purchased by that user from the sales information stored in the sales information storing section 1801 that is associated with that household electric appliance.

The selecting section 1802 selects a consumer good sold to the user based on the sales information. The transmitting/receiving section 201 extracts, from the consumer good information storing section 202, consumer good information regarding the consumer good selected by the selecting section 1802.

(4) Control Section 1803

The control section 1803 implements the functions of the first server device 1701 by managing and controlling the transmitting/receiving section 201, the consumer good information storing section 202, the notification information storing section 203, the user information storing section 204, the utilization information accumulating section 205, the determination section 206, the updating section 207, the sales information storing section 1801 and the selecting section 1802 described above.

2.3 Configuration of Second Server Device 1702

Next, a detailed configuration of the second server device 1702 will be described.

Figure 21:
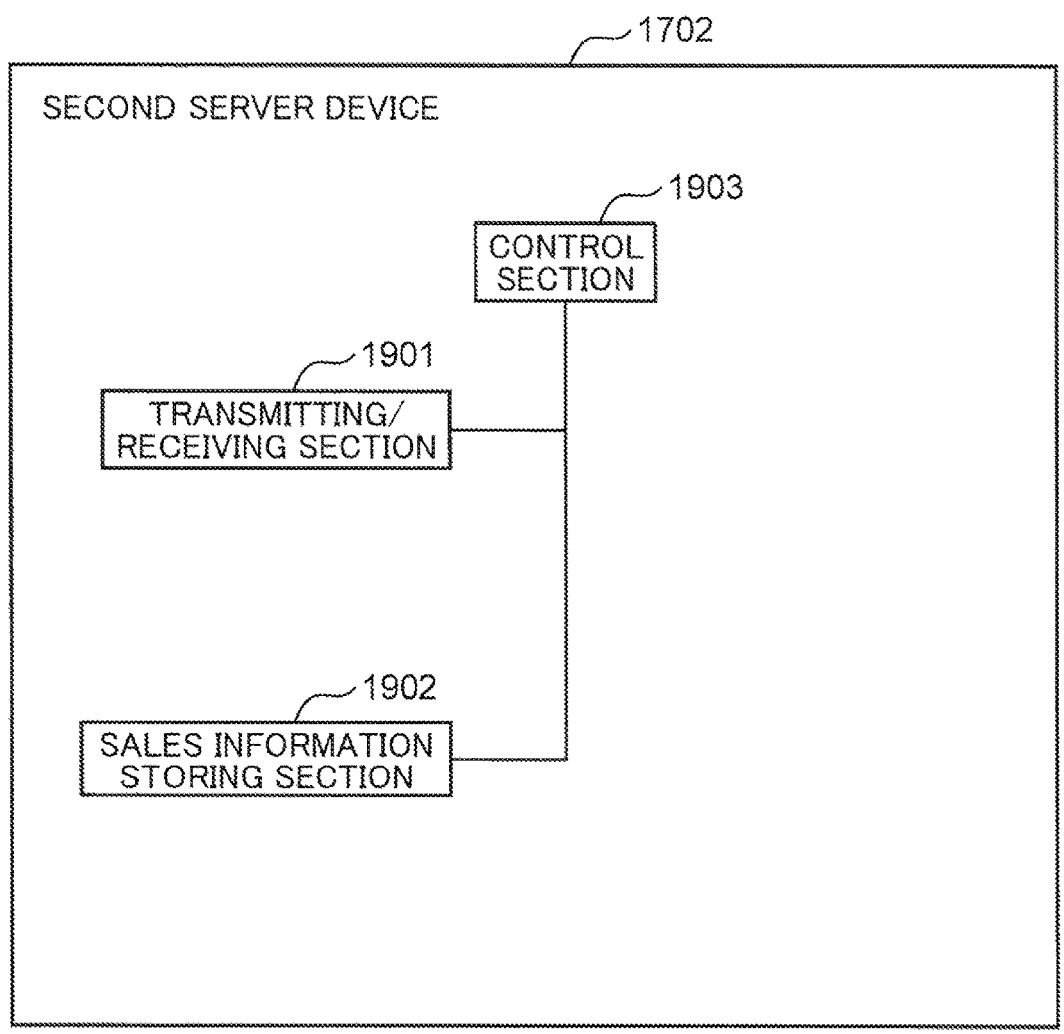
FIG. 21 is a diagram showing a configuration of a second server device according to Embodiment 2 of the present invention.

FIG. 21 is a diagram showing a configuration of a second server device according to Embodiment 2 of the present invention. As shown in FIG. 21, the second server device 1702 includes a transmitting/receiving section 1901, a sales information storing section 1902 and a control section 1903.

The second server device 1702 is implemented by a microprocessor, a RAM, a ROM, a hard disk, and the like, which are not specifically shown in the figure. The RAM, the ROM or the hard disk stores computer programs, and the functions of the second server device 1702 are implemented by the microprocessor operating in accordance with the computer programs.

Note that the functional blocks of the second server device 1702, such as the transmitting/receiving section 1901, the sales information storing section 1902 and the control section 1903, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 1901

The transmitting/receiving section 1901 receives information regarding a consumer good purchased by the user transmitted by a cash register terminal at a retail store, i.e., sales information regarding the consumer good sold to the user by the retail store, and receives totalized information (totalized data) obtained by totalizing the sales information. The transmitting/receiving section 1901 stores the received sales information in the sales information storing section 1902.

The transmitting/receiving section 1901 transmits, to the first server device 1701, sales information stored in the sales information storing section 1902.

(2) Sales Information Storing Section 1902

The sales information storing section 1902 stores information regarding a consumer good purchased by the user, i.e., sales information regarding the consumer good sold to the user by the retail store. The example of sales information shown in FIG. 20 includes, associated with one another, "user ID" indicating the identifier for identifying the purchasing user, "purchase date" indicating the date the consumer good was purchased, "product ID" indicating the identifier with which it is possible to identify the purchased consumer good, "product name" indicating the name of the purchased consumer good, "unit price" indicating the price per one unit of the purchased consumer good, the "number of units" indicating the number of units of the consumer good purchased, and "associated appliance" indicating the type of appliances with which the purchased consumer good is to be used. The sales information shown in FIG. 20, for example, indicates that on Mar. 3, 2013, the user identified by the user ID "324-5678" purchased two units of the consumer good identified by the product ID "5278" and the product name "ATN", purchased two units of the consumer good identified by the product ID "11965" and the product name "TYA", and purchased one unit of the consumer good identified by the product ID "326" and the product name "JIK". It is also indicated that the associated appliance for the consumer good identified by the product ID "5278" and the product name "ATN" is a "washing machine", indicating that it is to be used with a washing machine. It is also indicated that the associated appliance for the consumer good identified by the product ID "11965" and the product name "TYA" is a "microwave oven", indicating that it is to be used with a microwave oven. It is also indicated that the associated appliance for the consumer good identified by the product ID "326" and the product name "JIK" is "others", indicating that it is not related to household electric appliances.

(3) Control Section 1903

The control section 1803 implements the functions of the second server device 1702 by managing and controlling the transmitting/receiving section 1901 and the sales information storing section 1902 described above.

2.4 Configuration of Household Electric Appliance 102 and Information Appliance 103

The configurations of the household electric appliance 102 and the information appliance 103 of Embodiment 2 are similar to those of Embodiment 1 and will not be described below.

2.5 Operation by which First Server Device Obtains Utilization Information from Household Electric Appliance An example of an operation by which the first server device 1701 obtains utilization information from the household electric appliance 102 will be described with reference to FIGS. 22 to 24.

Figure 22:
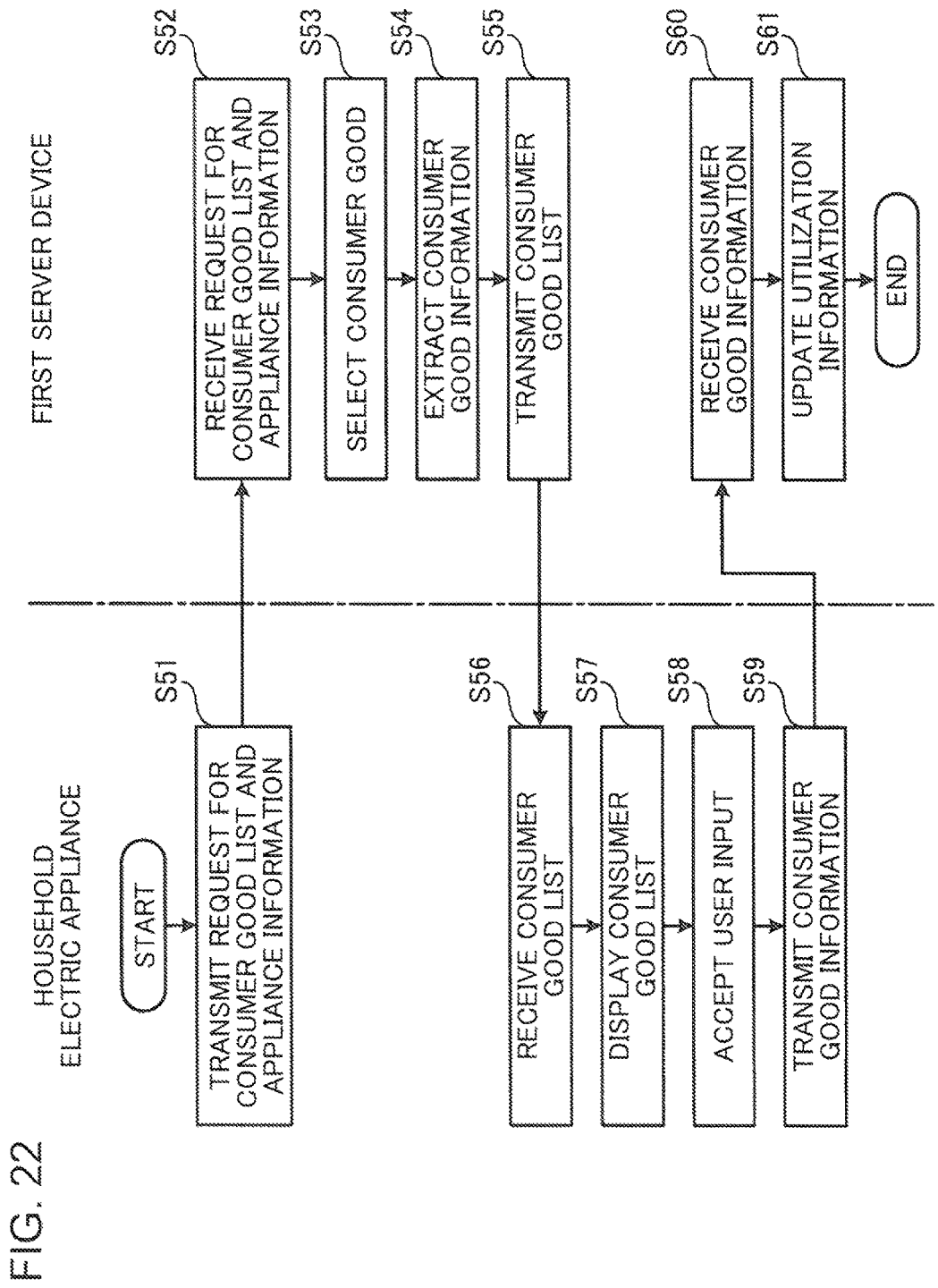
FIG. 22 is a flow chart showing an example of an operation by which the first server device obtains utilization information from a household electric appliance for the first time according to Embodiment 2 of the present invention.

FIG. 22 is a flow chart showing an example of an operation by which the first server device obtains utilization information from a household electric appliance for the first time according to Embodiment 2 of the present invention.

First, the transmitting/receiving section 301 of the household electric appliance 102 transmits, to the first server device 1701, a request for a consumer goods list and appliance information stored in the appliance information storing section 305 (step S51).

Then, the transmitting/receiving section 201 of the first server device 1701 receives the request for a consumer goods list and the appliance information transmitted by the household electric appliance 102 (step S52).

Then, the selecting section 1802 identifies the user ID based on the user information stored in the user information storing section 204 and the appliance ID included in the received appliance information, and selects one of the consumer goods purchased by the user that can be used with the household electric appliance 102 from the sales information stored in the sales information storing section 1801 based on the identified user ID and the appliance category included in the received appliance information (step S53).

Note that the first server device 1701 obtains the sales information from the second server device 1702 at a predetermined timing. The second server device 1702 transmits the sales information to the first server device 1701 at 12 am everyday, for example. In this process, the second server device 1702 transmits un-transmitted sales information to the first server device 1701.

The first server device 1701 may transmit, to the second server device 1702, request information for requesting sales information at the timing the request for a consumer goods list is received from the household electric appliance 102, and the second server device 1702 may transmit sales information to the first server device 1701 in response to the request information.

Moreover, at the timing new sales information is obtained, the second server device 1702 may transmit the obtained new sales information to the first server device 1701.

Then, the transmitting/receiving section 201 extracts, from the consumer good information storing section 202, consumer good information associated with the consumer good selected by the selecting section 1802 (step S54). Note that the consumer good information includes the appliance category, the manufacturer name, the product category, the product ID, the product name and the volume. The consumer good information may also include an image of the consumer good.

Then, the transmitting/receiving section 201 transmits, to the household electric appliance 102, the extracted consumer good information as a consumer goods list (step S55).

Then, the transmitting/receiving section 301 of the household electric appliance 102 receives the consumer goods list transmitted by the first server device 1701 (step S56).

Then, the display section 302 displays the consumer goods list received by the transmitting/receiving section 301 (step S57). In this process, the display section 302 does not need to display all of the consumer good information, but may display only some of the consumer good information (e.g., the product name) with which it is possible to identify the consumer good. The display section 302 may also display an image of the consumer good. Thus, the user can more easily select the consumer good being currently used.

Then, the input accepting section 304 accepts a user input (step S58). The input accepting section 304 accepts selection of a consumer good being currently used by the user from the consumer goods list being displayed. Where the input accepting section 304 is implemented by a touch panel, for example, the user touches the consumer good being currently used by the user from the consumer goods list displayed on the display section 302. Where the input accepting section 304 is implemented by a button, for example, the user presses a button so as to select the consumer good being currently used by the user from the consumer goods list being displayed on the display section 302.

Then, the transmitting/receiving section 301 transmits, to the first server device 1701, information regarding a consumer good (consumer good information) accepted by the input accepting section 304 (step S59).

Then, the transmitting/receiving section 201 of the first server device 1701 receives information regarding a consumer good (consumer good information) transmitted by the household electric appliance 102 (step S60).

Then, the updating section 207 updates the utilization information accumulated in the utilization information accumulating section 205 based on the consumer good information received by the transmitting/receiving section 201 (step S61). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Since only consumer goods purchased by the user are presented to the user, the user can easily select a consumer good to be used from among the consumer goods the user actually owns.

Next, an operation by which the first server device 1701, which has utilization information already stored therein, obtains utilization information from the household electric appliance 102 will be described.

Figure 23:
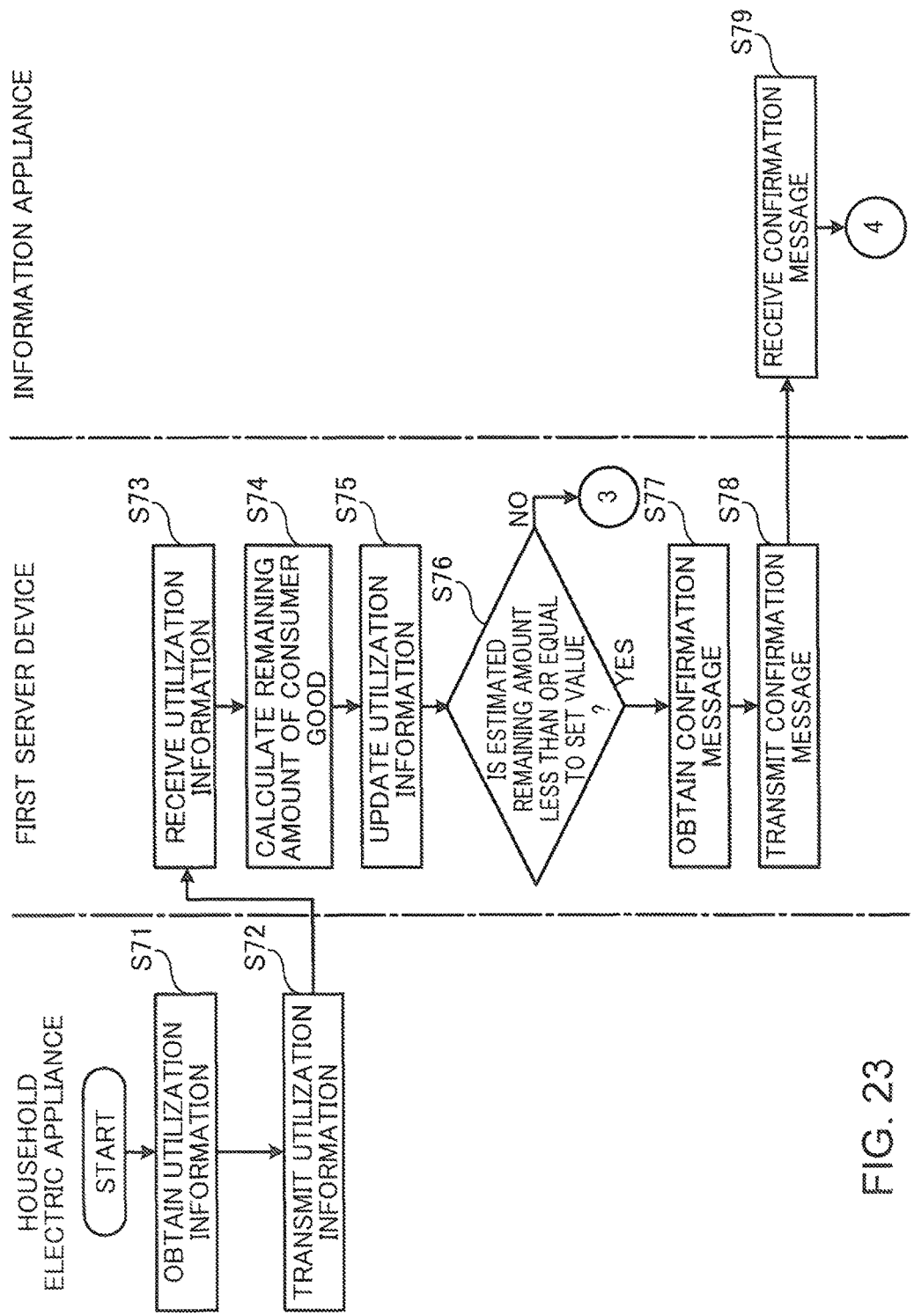
FIG. 23 is a first flow chart showing an example of an operation by which the first server device, which has utilization information already stored therein, obtains utilization information from a household electric appliance according to Embodiment 2 of the present invention.
Figure 24:
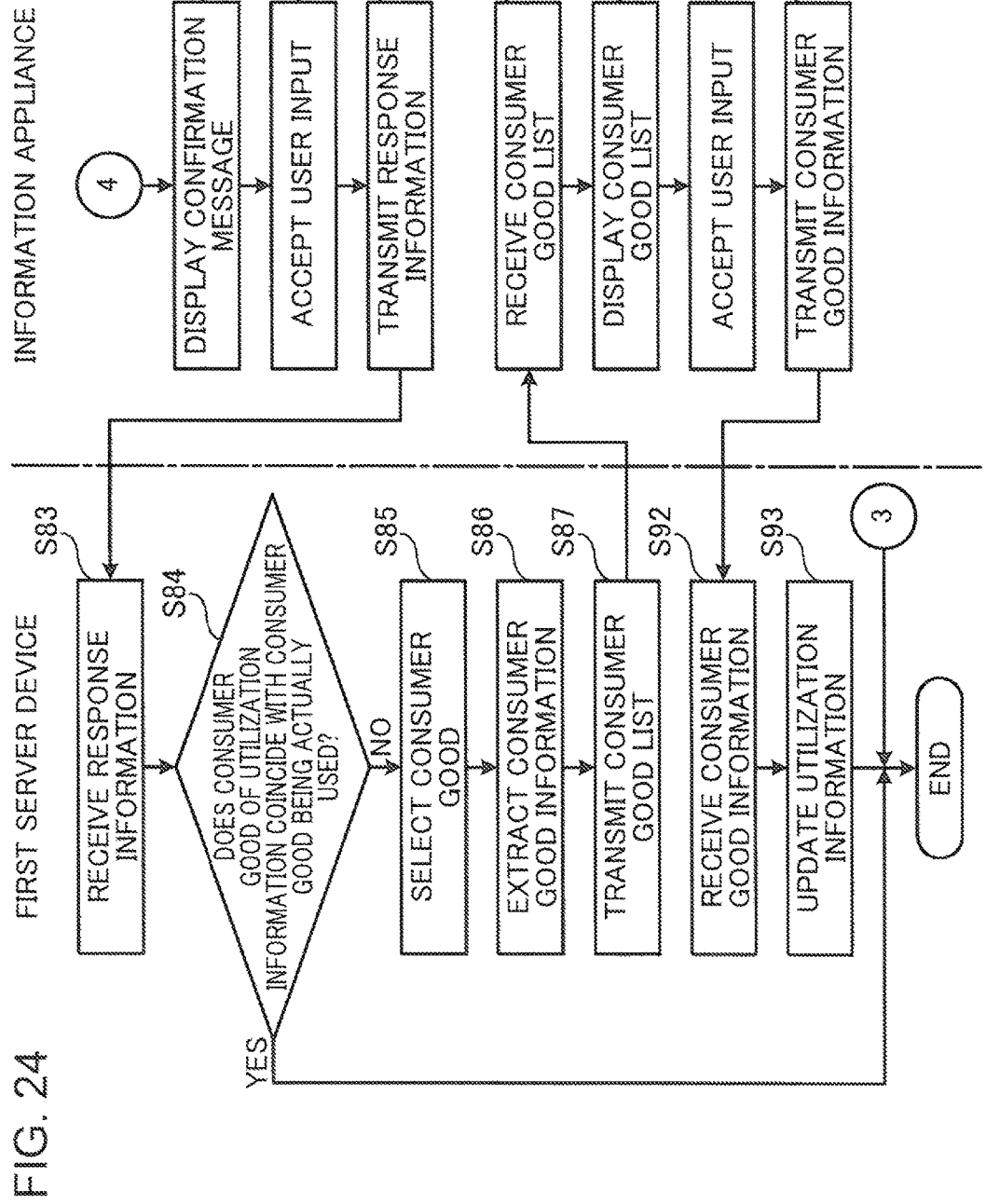
FIG. 24 is a second flow chart showing an example of an operation by which the first server device, which has utilization information already stored therein, obtains utilization information from a household electric appliance according to Embodiment 2 of the present invention.

FIG. 23 is a first flow chart showing an example of an operation by which the first server device, which has utilization information already stored therein, obtains utilization information from a household electric appliance according to Embodiment 2 of the present invention, and FIG. 24 is a second flow chart showing an example of an operation by which the first server device, which has utilization information already stored therein, obtains utilization information from a household electric appliance according to Embodiment 2 of the present invention.

First, the utilization information obtaining section 303 of the household electric appliance 102 obtains utilization information (step S71). The utilization information may include the appliance category indicating the type of the household electric appliance 102, the appliance ID for identifying the household electric appliance 102, the product ID for identifying the consumer good, the product name of the consumer good, and the amount of consumption of the consumer good. Note that the utilization information may include the appliance category, the appliance ID, the product ID, the product name, and the operation status of the household electric appliance 102.

Then, the transmitting/receiving section 301 transmits, to the first server device 1701, the utilization information obtained by the utilization information obtaining section 303 (step S72).

Then, the transmitting/receiving section 201 of the first server device 1701 receives the utilization information transmitted by the household electric appliance 102 (step S73).

Then, the updating section 207 calculates the remaining amount of the consumer good based on the utilization information received by the transmitting/receiving section 201 (step S74). If the utilization information includes the operation status of the household electric appliance 102, the updating section 207 calculates the remaining amount of the consumer good based on the operation status of the household electric appliance 102. Note that if the utilization information includes the amount of consumption of the consumer good, the updating section 207 calculates the remaining amount of the consumer good based on the volume of the consumer good and the amount of consumption of the consumer good. Although the remaining amount of a consumer good in Embodiment 2 is expressed as a percent, the present invention is not limited to this, and it may be expressed as a value obtained by subtracting the amount of consumption of the consumer good from the volume of the consumer good.

Then, the updating section 207 updates the utilization information accumulated in the utilization information accumulating section 205 based on the utilization information received by the transmitting/receiving section 201 and the remaining amount calculated (step S75). In this process, the utilization information associated with the consumer good identified by the utilization information received this time is already accumulated in the utilization information accumulating section 205. Therefore, the updating section 207 updates the amount of consumption included in the utilization information accumulated in the utilization information accumulating section 205 to the amount of consumption included in the received utilization information or the amount of consumption calculated from the utilization information. The updating section 207 also updates the remaining amount included in the utilization information accumulated in the utilization information accumulating section 205 to the remaining amount calculated from the received utilization information.

Then, the determination section 206 of the first server device 1701 determines whether or not the estimated remaining amount of the utilization information accumulated in the utilization information accumulating section 205 is less than or equal to a predetermined set value (step S76). When it is determined that the estimated remaining amount is not less than or equal to a set value (NO in step S76), the determination section 206 does nothing and the process ends.

On the other hand, when it is determined that the estimated remaining amount is less than or equal to a set value (YES in step S76), the determination section 206 obtains notification information stored in the notification information storing section 203 (step S77). The notification information is a confirmation message for confirming the consumer good being used. The determination section 206 creates a confirmation message by reading out a confirmation message stored in the notification information storing section 203, and inserting the product name included in the utilization information into the read-out confirmation message.

Then, the transmitting/receiving section 201 transmits the obtained notification information (confirmation message) to the information appliance 103 (step S78).

Then, the transmitting/receiving section 401 of the information appliance 103 receives the notification information (confirmation message) transmitted by the first server device 1701 (step S79).

Then, the display section 402 displays the notification information (confirmation message) received by the transmitting/receiving section 401 (step S80).

Then, the input accepting section 403 of the information appliance 103 accepts a user input, i.e., a response from the user for the confirmation message (step S81).

Then, the transmitting/receiving section 401 transmits, to the first server device 1701, response information for the confirmation message accepted by the input accepting section 403 (step S82).

Then, the transmitting/receiving section 201 of the first server device 1701 receives the response information transmitted by the information appliance 103 (step S83).

Then, the determination section 206 determines whether or not the consumer good identified by the utilization information accumulated in the utilization information accumulating section 205 coincides with the consumer good being currently actually used by the user based on the response information received by the transmitting/receiving section 201 (step S84).

That is, if affirmative response information is obtained for the confirmation message for confirming whether or not the consumer good identified by the utilization information accumulated in the utilization information accumulating section 205 coincides with the consumer good being currently actually used by the user, the determination section 206 determines that the consumer good identified by the utilization information accumulated in the utilization information accumulating section 205 coincides with the consumer good being currently actually used by the user. If negative response information is obtained for the confirmation message, the determination section 206 determines that the consumer good identified by the utilization information accumulated in the utilization information accumulating section 205 does not coincide with the consumer good being currently actually used by the user.

When it is determined that the consumer good identified by the utilization information coincides with the consumer good being currently actually used by the user (YES in step S84), the determination section 206 does nothing and the process ends.

On the other hand, when it is determined that the consumer good identified by the utilization information does not coincide with the consumer good being currently actually used by the user (NO in step S84), the selecting section 1802 identifies the user ID based on the user information stored in the user information storing section 204 and the appliance ID included in the received utilization information, and selects one of the consumer goods purchased by the user that can be used with the household electric appliance 102 from the sales information stored in the sales information storing section 1801 based on the identified user ID and the appliance category included in the received utilization information (step S85).

Then, the transmitting/receiving section 201 extracts, from the consumer good information storing section 202, consumer good information associated with the consumer good selected by the selecting section 1802 (step S86). Note that the consumer good information includes the appliance category, the manufacturer name, the product category, the product ID, the product name and the volume. The consumer good information may also include an image of the consumer good.

Then, the transmitting/receiving section 201 transmits, to the information appliance 103, the extracted consumer good information as a consumer goods list (step S87).

Then, the transmitting/receiving section 401 of the information appliance 103 receives the consumer goods list transmitted by the first server device 1701 (step S88).

Then, the display section 402 displays the consumer goods list received by the transmitting/receiving section 401 (step S89). In this process, the display section 402 does not need to display all of the consumer good information, but may display only some of the consumer good information (e.g., the product name) with which it is possible to identify the consumer good. The display section 402 may also display an image of the consumer good. Thus, the user can more easily select the consumer good being currently used.

Then, the input accepting section 403 accepts a user input (step S90). The input accepting section 403 accepts selection of a consumer good being currently used by the user from the consumer goods list being displayed. Where the input accepting section 403 is implemented by a touch panel, for example, the user touches the consumer good being currently used by the user from the consumer goods list displayed on the display section 402. Where the input accepting section 403 is implemented by a button, for example, the user presses a button so as to select the consumer good being currently used by the user from the consumer goods list being displayed on the display section 402.

Then, the transmitting/receiving section 401 transmits, to the first server device 1701, information regarding a consumer good (consumer good information) accepted by the input accepting section 403 (step S91).

Then, the transmitting/receiving section 201 of the first server device 1701 receives information regarding a consumer good (consumer good information) transmitted by the information appliance 103 (step S92).

Then, the updating section 207 updates the utilization information accumulated in the utilization information accumulating section 205 based on the consumer good information received by the transmitting/receiving section 201 (step S93). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Embodiment 3

3.1 Configuration of Point-of-Use Information Obtaining System

Figure 25:
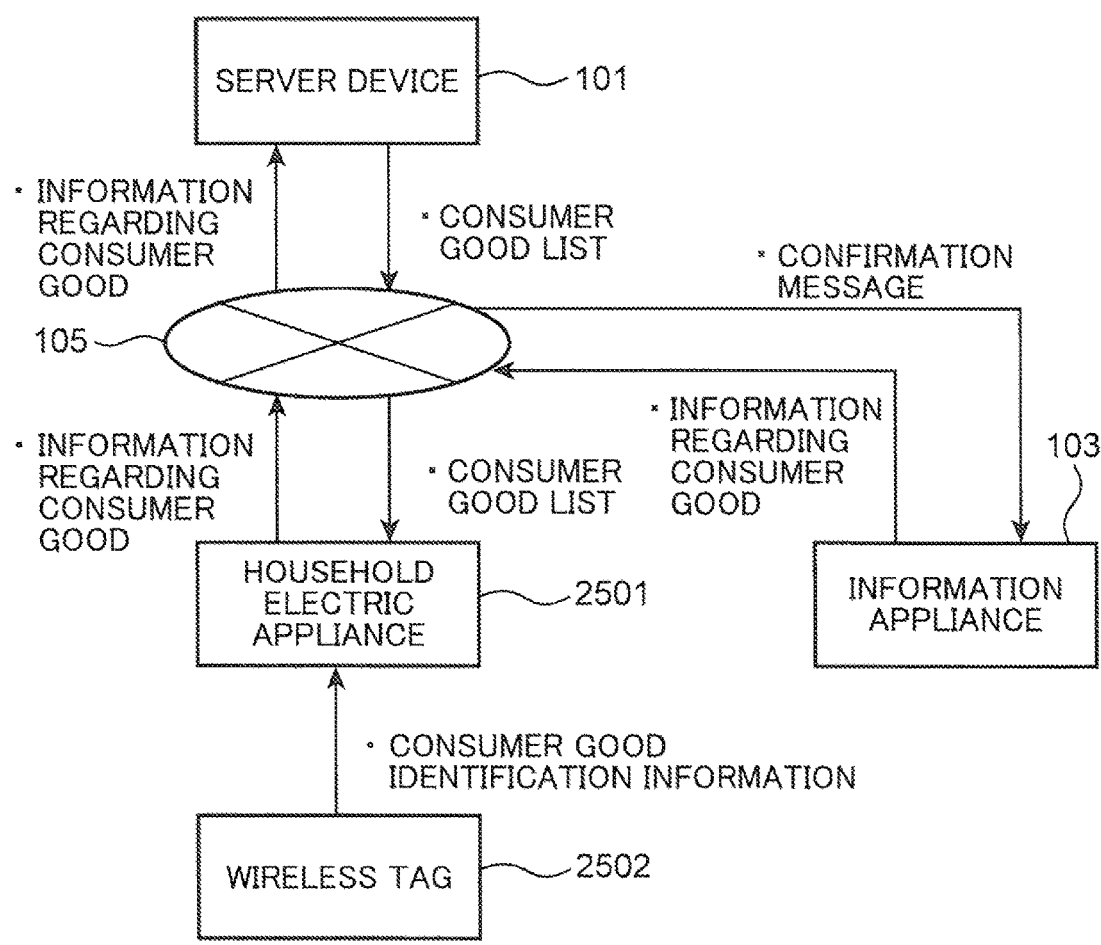
FIG. 25 is a diagram showing a configuration of a point-of-use information obtaining system according to Embodiment 3 of the present invention.

FIG. 25 is a diagram showing a configuration of a point-of-use information obtaining system according to Embodiment 3 of the present invention. The point-of-use information obtaining system according to Embodiment 3 of the present invention includes the server device 101, a household electric appliance 2501, the information appliance 103 and a wireless tag 2502, as shown in FIG. 25.

The server device 101 stores a consumer goods list representing a list of consumer goods, and the server device 101 transmits a consumer goods list in response to a request from the household electric appliance 2501 and transmits a confirmation message for confirming the consumer good being currently used to the information appliance 103. In addition, the server device 101 receives, from the household electric appliance 2501, and accumulates information regarding the consumer good being currently used by the household electric appliance 2501.

The wireless tag 2502 is provided on a consumer good. For example, the wireless tag 2502 is attached to the package of the consumer good. The wireless tag 2502 transmits, to the household electric appliance 2501 which is a reader, information for identifying the consumer good to which it is attached.

The household electric appliance 2501 detects information regarding a consumer good (e.g., a product ID, or the like) from the wireless tag 2502 existing in the vicinity thereof, and transmits the detected information regarding a consumer good to the server device 101. The household electric appliance 2501 receives the detected information regarding a consumer good (e.g., a product image, or the like) from the server device 101, presents the received information regarding a consumer good to the user, accepts a user confirmation (user input) indicating whether or not the presented information regarding the consumer good is correct, and transmits an accepted user input to the server device 101.

The information appliance 103 receives a confirmation message from the server device 101, presents the received confirmation message to the user, and accepts an input of information regarding a consumer good by the user. The information appliance 103 transmits the accepted information regarding a consumer good to the server device 101.

3.2 Configuration of Household Electric Appliance 2501

Next, a detailed configuration of the household electric appliance 2501 will be described.

Figure 26:
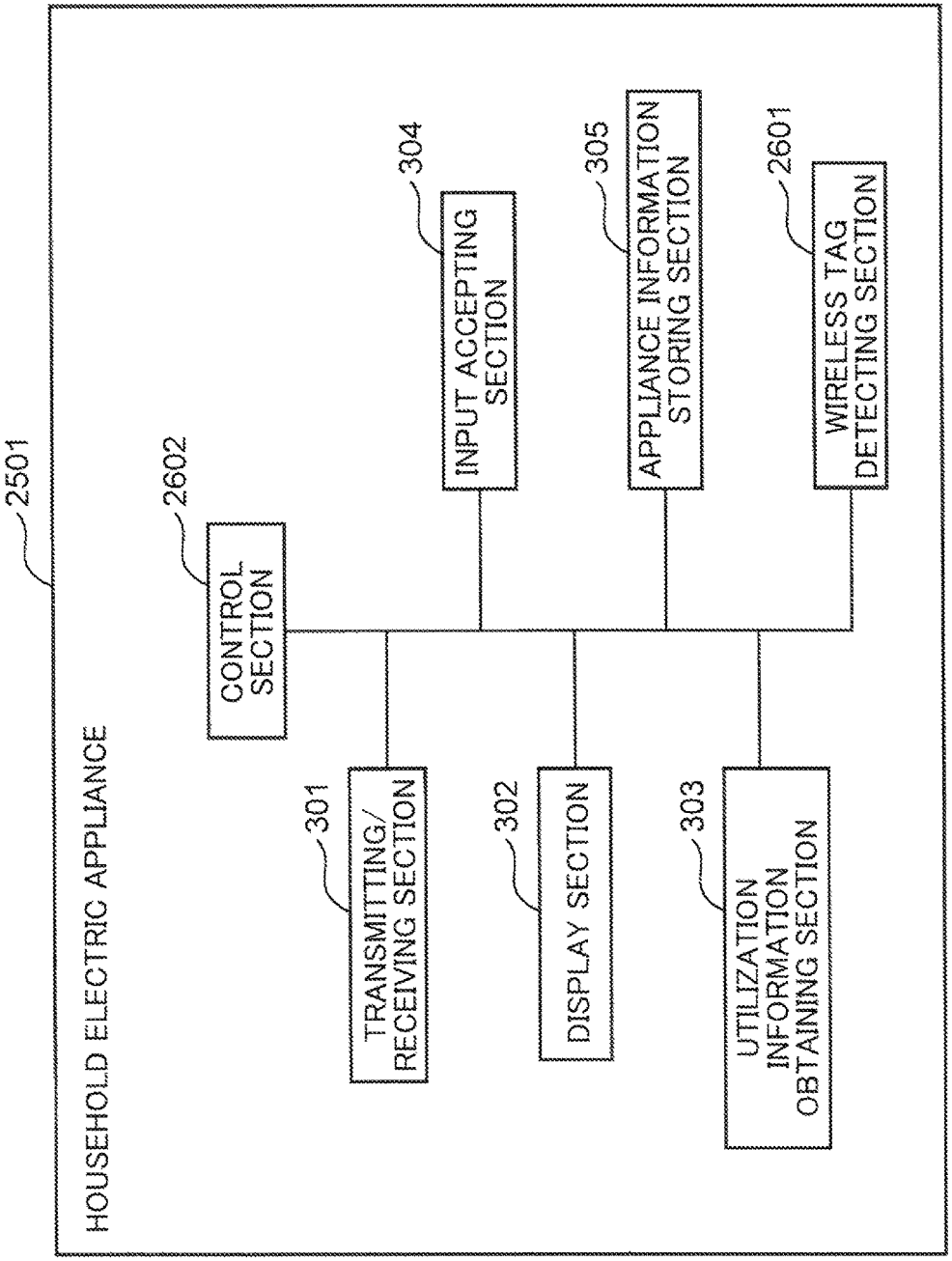
FIG. 26 is a diagram showing a configuration of a household electric appliance according to Embodiment 3 of the present invention.

FIG. 26 is a diagram showing a configuration of a household electric appliance according to Embodiment 3 of the present invention. As shown in FIG. 26, the household electric appliance 2501 includes the transmitting/receiving section 301, the display section 302, the utilization information obtaining section 303, the input accepting section 304, the appliance information storing section 305, a wireless tag detecting section 2601 and a control section 2602.

The household electric appliance 2501 is implemented by a microprocessor, a RAM, a ROM, a hard disk, and the like, which are not specifically shown in the figure. The RAM, the ROM or the hard disk stores computer programs, and the functions of the household electric appliance 2501 are implemented by the microprocessor operating in accordance with the computer programs.

Note that the functional blocks of the household electric appliance 2501, such as the transmitting/receiving section 301, the display section 302, the utilization information obtaining section 303, the input accepting section 304, the appliance information storing section 305, the wireless tag detecting section 2601 and the control section 2602, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 301 to Appliance Information Storing Section 305

The configurations of the transmitting/receiving section 301, the display section 302, the utilization information obtaining section 303, the input accepting section 304 and the appliance information storing section 305 are similar to those of Embodiment 1 and will not be described below.

(2) Wireless Tag Detecting Section 2601

The wireless tag detecting section 2601 detects the wireless tag 2502 existing in the vicinity thereof, and reads out information embedded in the wireless tag 2502 (e.g., information for identifying the consumer good, such as the product ID). The communication scheme of the wireless tag may be a commonly-employed communication scheme, and will not be described herein. The detected (read-out) information for identifying the consumer good, such as the product ID, is transmitted to the server device 101 by the transmitting/receiving section 301.

(3) Control Section 2602

The control section 2602 implements the functions of the household electric appliance 2501 by managing and controlling the transmitting/receiving section 301, the display section 302, the utilization information obtaining section 303, the input accepting section 304, the appliance information storing section 305 and the wireless tag detecting section 2601 described above.

3.3 Configuration of Server Device 101 and Information Appliance 103

The configurations of the server device 101 and the information appliance 103 of Embodiment 3 are similar to those of Embodiment 1 and will not be described below.

3.4 Operation by which Server Device Obtains Utilization Information from Household Electric Appliance An example of an operation by which the server device 101 obtains the utilization information from the household electric appliance 2501 will be described with reference to FIG. 27.

Figure 27:
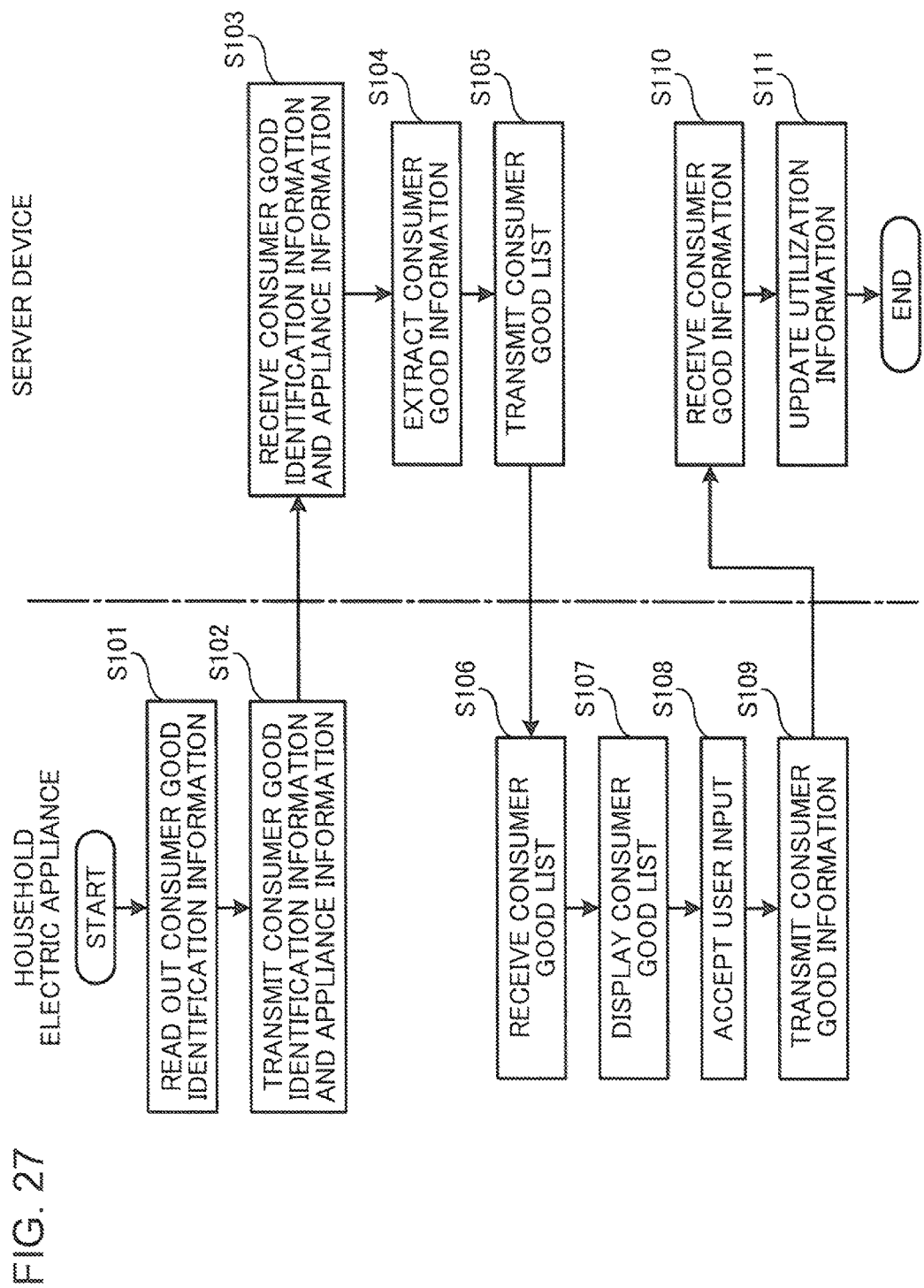
FIG. 27 is a flow chart showing an example of an operation by which the server device obtains utilization information from a household electric appliance for the first time according to Embodiment 3 of the present invention.

FIG. 27 is a flow chart showing an example of an operation by which the server device obtains utilization information from a household electric appliance for the first time according to Embodiment 3 of the present invention. Note that in Embodiment 3 of the present invention, the operation by which the server device 101, which has utilization information already stored therein, obtains utilization information from the household electric appliance 2501 is similar to that shown in FIGS. 16 and 17 of Embodiment 1 and will not be described below.

First, the wireless tag detecting section 2601 of the household electric appliance 2501 detects the wireless tag 2502 existing within a predetermined detection range, and reads out information for identifying the consumer good (consumer goods identification information) from the detected wireless tag 2502 (step S101). Note that the consumer goods identification information includes the product ID, for example. Where a plurality of wireless tags are existing in the vicinity of the household electric appliance 2501, the wireless tag detecting section 2601 reads out the consumer goods identification information from each of the plurality of wireless tags.

Then, the transmitting/receiving section 301 transmits, to the server device 101, the consumer goods identification information read out by the wireless tag detecting section 2601, and the appliance information stored in the appliance information storing section 305 (step S102).

Then, the transmitting/receiving section 201 of the server device 101 receives the consumer goods identification information and the appliance information transmitted by the household electric appliance 2501 (step S103).

Then, the transmitting/receiving section 201 extracts, from the consumer good information storing section 202, consumer good information associated with the received consumer goods identification information (product ID) (step S104). Note that the consumer good information includes the appliance category, the manufacturer name, the product category, the product ID, the product name and the volume. The consumer good information may also include an image of the consumer good.

Then, the transmitting/receiving section 201 transmits, to the household electric appliance 2501, the extracted consumer good information as a consumer goods list (step S105). Note that where one wireless tag is detected by the household electric appliance 2501, the consumer goods list includes one piece of consumer good information, and where a plurality of wireless tags are detected by the household electric appliance 2501, the consumer goods list includes a plurality of pieces of consumer good information.

Then, the transmitting/receiving section 301 of the household electric appliance 2501 receives the consumer goods list transmitted by the server device 101 (step S106).

Then, the display section 302 displays the consumer goods list received by the transmitting/receiving section 301 (step S107). In this process, the display section 302 does not need to display all of the consumer good information, but may display only some of the consumer good information (e.g., the product name) with which it is possible to identify the consumer good. The display section 302 may also display an image of the consumer good. Thus, the user can more easily select the consumer good being currently used.

Then, the input accepting section 304 accepts a user input (step S108). The input accepting section 304 accepts selection of a consumer good being currently used by the user from the consumer goods list being displayed. Where the input accepting section 304 is implemented by a touch panel, for example, the user touches the consumer good being currently used by the user from the consumer goods list displayed on the display section 302. Where the input accepting section 304 is implemented by a button, for example, the user presses a button so as to select the consumer good being currently used by the user from the consumer goods list being displayed on the display section 302.

Then, the transmitting/receiving section 301 transmits, to the server device 101, information regarding a consumer good (consumer good information) accepted by the input accepting section 304 (step S109).

Then, the transmitting/receiving section 201 of the server device 101 receives information regarding a consumer good (consumer good information) transmitted by the household electric appliance 2501 (step S110).

Then, the updating section 207 updates the utilization information accumulated in the utilization information accumulating section 205 based on the consumer good information received by the transmitting/receiving section 201 (step S111). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Then, the utilization information obtaining section 303 of the household electric appliance 2501 obtains utilization information. Then, the transmitting/receiving section 301 transmits, to the server device 101, the utilization information obtained by the utilization information obtaining section 303. The transmitting/receiving section 201 of the server device 101 receives the utilization information transmitted by the household electric appliance 2501. Then, the updating section 207 calculates the remaining amount of the consumer good based on the utilization information received by the transmitting/receiving section 201. Then, the updating section 207 updates the utilization information accumulated in the utilization information accumulating section 205 based on the utilization information received by the transmitting/receiving section 201 and the remaining amount calculated. This and subsequent operations are similar to operations of step S26 and thereafter of FIG. 16 of Embodiment 1 and will not be described below.

Thus, from wireless tags provided on consumer goods, consumer goods identification information for identifying the consumer goods are read out, and only the consumer goods associated with the read-out consumer goods identification information are presented to the user. Therefore, the user can easily select a consumer good to be used from among the consumer goods the user actually owns.

Embodiment 4

4.1 Configuration of Point-of-Use Information Obtaining System

Figure 28:
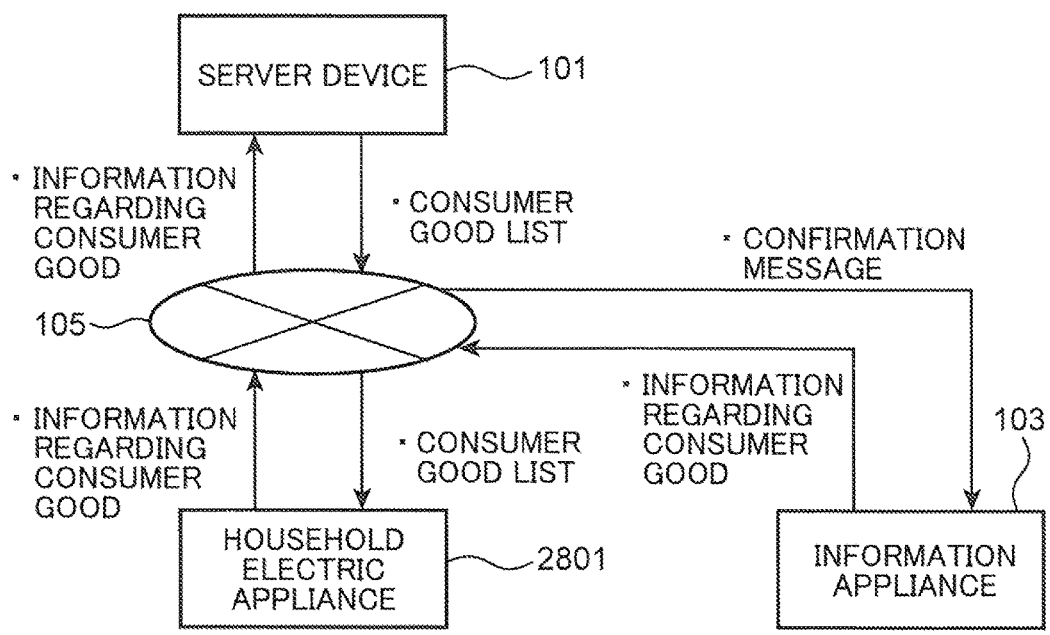
FIG. 28 is a diagram showing a configuration of a point-of-use information obtaining system according to Embodiment 4 of the present invention.

FIG. 28 is a diagram showing a configuration of a point-of-use information obtaining system according to Embodiment 4 of the present invention. The point-of-use information obtaining system according to Embodiment 4 of the present invention includes the server device 101, a household electric appliance 2801 and the information appliance 103, as shown in FIG. 28.

The server device 101 stores a consumer goods list representing a list of consumer goods, and the server device 101 transmits a consumer goods list in response to a request from the household electric appliance 2801 and transmits a confirmation message for confirming the consumer good being currently used to the information appliance 103. In addition, the server device 101 receives, from the household electric appliance 2801, and accumulates information regarding the consumer good being currently used by the household electric appliance 2801.

A barcode is provided on a consumer good. For example, a barcode is printed on or attached to the package of the consumer good. A barcode has recorded therein information for identifying the consumer good on which it is provided. Note that while the present embodiment employs a barcode (one-dimensional code), the present invention is not limited to this and may employ a two-dimensional code. Where a two-dimensional code is employed, it is possible to record more information than a barcode.

From a barcode provided on a consumer good, the household electric appliance 2801 detects information regarding that consumer good (e.g., the product ID, or the like), and transmits the detected information regarding the consumer good to the server device 101. The household electric appliance 2801 receives the detected information regarding the consumer good (e.g., the product image, or the like) from the server device 101, and presents the received information regarding the consumer good to the user. The household electric appliance 2801 accepts a user confirmation (user input) indicating whether or not the presented information regarding the consumer good is correct, and transmits the accepted user input to the server device 101.

The information appliance 103 receives a confirmation message from the server device 101, presents the received confirmation message to the user, and accepts an input of information regarding a consumer good by the user. The information appliance 103 transmits the accepted information regarding a consumer good to the server device 101.

4.2 Configuration of Household Electric Appliance 2801

Next, a detailed configuration of the household electric appliance 2801 will be described.

Figure 29:
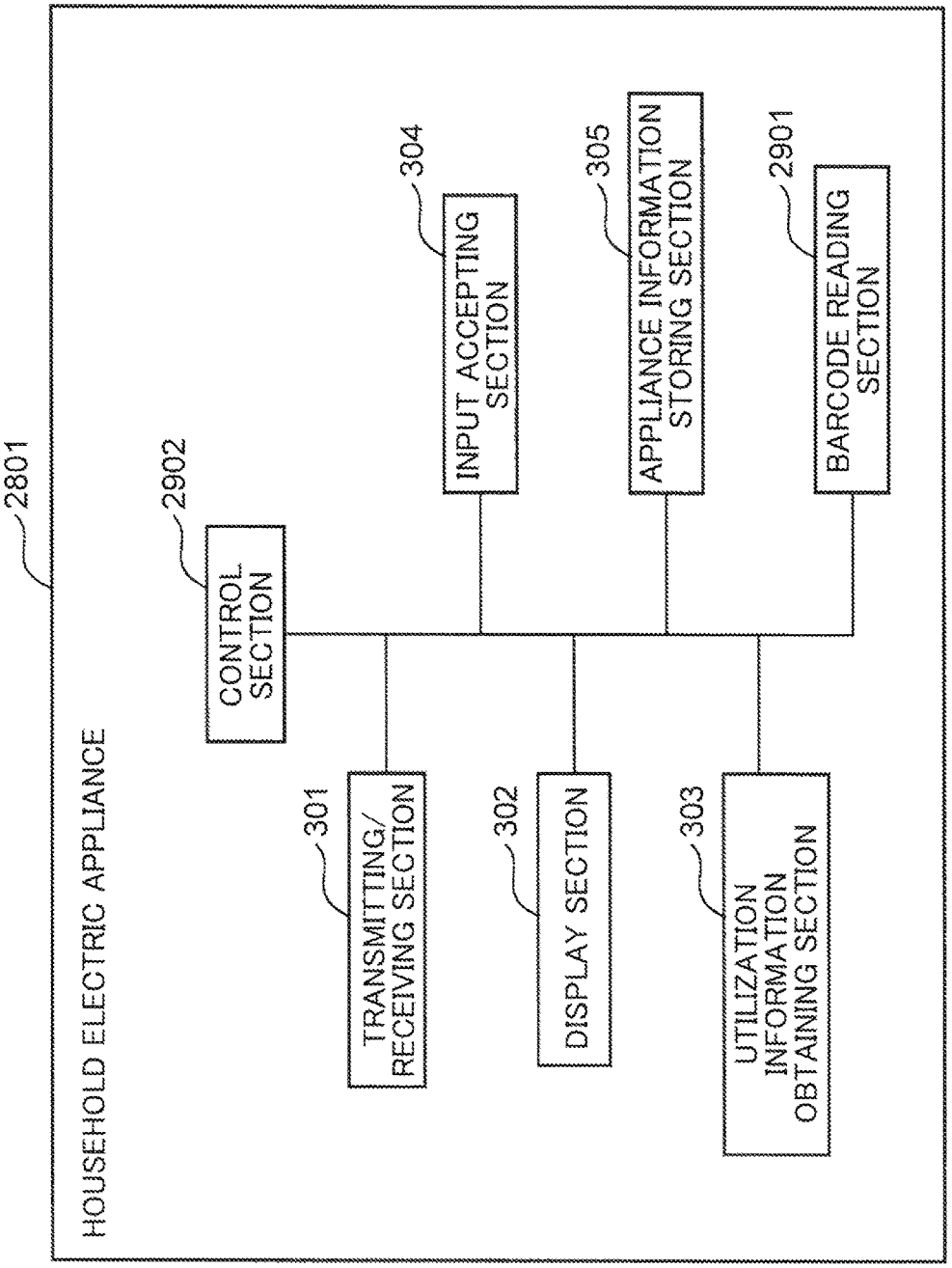
FIG. 29 is a diagram showing a configuration of a household electric appliance according to Embodiment 4 of the present invention.

FIG. 29 is a diagram showing a configuration of a household electric appliance according to Embodiment 4 of the present invention. As shown in FIG. 29, the household electric appliance 2801 includes the transmitting/receiving section 301, the display section 302, the utilization information obtaining section 303, the input accepting section 304, the appliance information storing section 305, a barcode reading section 2901 and a control section 2902.

The household electric appliance 2801 is implemented by a microprocessor, a RAM, a ROM, a hard disk, and the like, which are not specifically shown in the figure. The RAM, the ROM or the hard disk stores computer programs, and the functions of the household electric appliance 2801 are implemented by the microprocessor operating in accordance with the computer programs.

Note that the functional blocks of the household electric appliance 2801, such as the transmitting/receiving section 301, the display section 302, the utilization information obtaining section 303, the input accepting section 304, the appliance information storing section 305, the barcode reading section 2901 and the control section 2902, may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 301 to Appliance Information Storing Section 305

The configurations of the transmitting/receiving section 301, the display section 302, the utilization information obtaining section 303, the input accepting section 304 and the appliance information storing section 305 are similar to those of Embodiment 1 and will not be described below.

(2) Barcode Reading Section 2901

The barcode reading section 2901 reads a barcode provided on a consumer good to obtain information regarding the consumer good (e.g., information for identifying the consumer good, such as the product ID). The barcode reading section 2901 is implemented by a barcode scanner, for example. The barcode reading scheme may be a commonly-employed reading scheme, and will not be described herein. The obtained information for identifying the consumer good, such as the product ID, is transmitted to the server device 101 by the transmitting/receiving section 301.

(3) Control Section 2902

The control section 2902 implements the functions of the household electric appliance 2801 by managing and controlling the transmitting/receiving section 301, the display section 302, the utilization information obtaining section 303, the input accepting section 304, the appliance information storing section 305 and the barcode reading section 2901 described above.

4.3 Configuration of Server Device 101 and Information Appliance 103

The configurations of the server device 101 and the information appliance 103 of Embodiment 4 are similar to those of Embodiment 1 and will not be described below.

4.4 Operation by which Server Device Obtains Utilization Information from Household Electric Appliance An example of an operation by which the server device 101 obtains the utilization information from the household electric appliance 2801 will be described with reference to FIG. 30.

Figure 30:
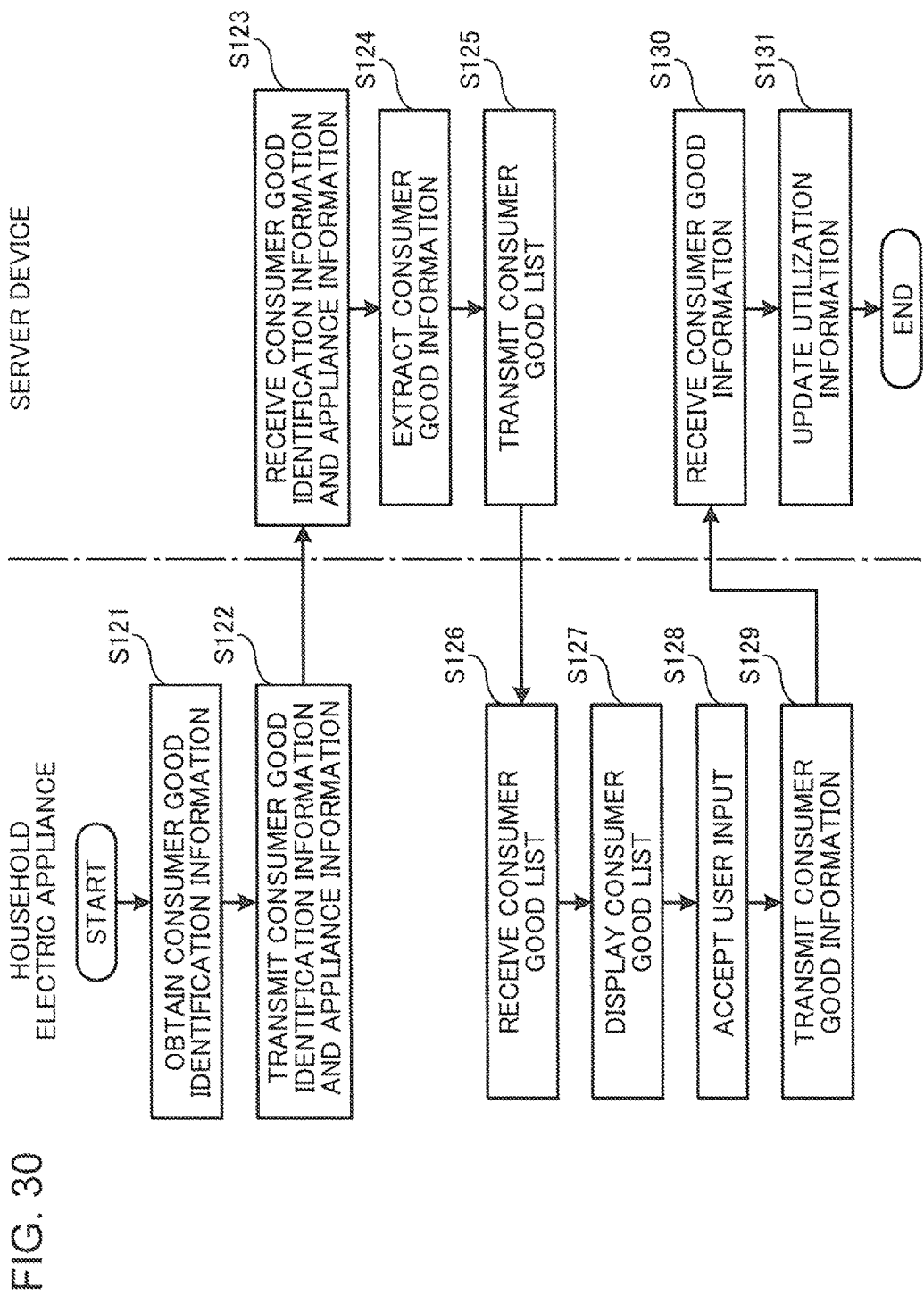
FIG. 30 a flow chart showing an example of an operation by which the server device obtains utilization information from a household electric appliance for the first time according to Embodiment 4 of the present invention.

FIG. 30 is a flow chart showing an example of an operation by which the server device obtains utilization information from a household electric appliance for the first time according to Embodiment 4 of the present invention. Note that in Embodiment 4 of the present invention, the operation by which the server device 101, which has utilization information already stored therein, obtains utilization information from the household electric appliance 2801 is similar to that shown in FIGS. 16 and 17 of Embodiment 1 and will not be described below.

First, the barcode reading section 2901 of the household electric appliance 2801 reads the barcode provided on a consumer good to obtain information for identifying the consumer good (consumer goods identification information) (step S121). Note that the consumer goods identification information includes the product ID, for example. Where a plurality of barcodes provided on a plurality of consumer goods are read, the barcode reading section 2901 obtains a plurality of pieces of consumer goods identification information respectively associated with the plurality of consumer goods.

Then, the transmitting/receiving section 301 transmits, to the server device 101, the consumer goods identification information obtained by the barcode reading section 2901 and the appliance information stored in the appliance information storing section 305 (step S122).

Then, the transmitting/receiving section 201 of the server device 101 receives the consumer goods identification information and the appliance information transmitted by the household electric appliance 2801 (step S123).

Then, the transmitting/receiving section 201 extracts, from the consumer good information storing section 202, consumer good information associated with the received consumer goods identification information (product ID) (step S124). Note that the consumer good information includes the appliance category, the manufacturer name, the product category, the product ID, the product name and the volume. The consumer good information may also include an image of the consumer good.

Then, the transmitting/receiving section 201 transmits, to the household electric appliance 2801, the extracted consumer good information as a consumer goods list (step S125). Note that where one barcode is read by the household electric appliance 2801, the consumer goods list includes one piece of consumer good information, and where a plurality of barcodes are read by the household electric appliance 2801, the consumer goods list includes a plurality of pieces of consumer good information.

Then, the transmitting/receiving section 301 of the household electric appliance 2801 receives the consumer goods list transmitted by the server device 101 (step S126).

Then, the display section 302 displays the consumer goods list received by the transmitting/receiving section 301 (step S127). In this process, the display section 302 does not need to display all of the consumer good information, but may display only some of the consumer good information (e.g., the product name) with which it is possible to identify the consumer good. The display section 302 may also display an image of the consumer good. Thus, the user can more easily select the consumer good being currently used.

Then, the input accepting section 304 accepts a user input (step S128). The input accepting section 304 accepts selection of a consumer good being currently used by the user from the consumer goods list being displayed. Where the input accepting section 304 is implemented by a touch panel, for example, the user touches the consumer good being currently used by the user from the consumer goods list displayed on the display section 302. Where the input accepting section 304 is implemented by a button, for example, the user presses a button so as to select the consumer good being currently used by the user from the consumer goods list being displayed on the display section 302.

Then, the transmitting/receiving section 301 transmits, to the server device 101, information regarding a consumer good (consumer good information) accepted by the input accepting section 304 (step S129).

Then, the transmitting/receiving section 201 of the server device 101 receives information regarding a consumer good (consumer good information) transmitted by the household electric appliance 2801 (step S130).

Then, the updating section 207 updates the utilization information accumulated in the utilization information accumulating section 205 based on the consumer good information received by the transmitting/receiving section 201 (step S131). In this process, utilization information associated with the consumer good identified by the consumer good information received this time is not accumulated in the utilization information accumulating section 205. Therefore, the updating section 207 newly stores, in the utilization information accumulating section 205, utilization information in which the product ID, the product name and the volume included in the consumer good information are associated with the appliance ID. In this process, the updating section 207 uses the date when the consumer good information is received from the household electric appliance 102 as the consumption start date, "0" as the amount of consumption, and "100%" as the estimated remaining amount value, to be included in the utilization information.

Then, the utilization information obtaining section 303 of the household electric appliance 2801 obtains utilization information. Then, the transmitting/receiving section 301 transmits, to the server device 101, the utilization information obtained by the utilization information obtaining section 303. The transmitting/receiving section 201 of the server device 101 receives the utilization information transmitted by the household electric appliance 2801. Then, the updating section 207 calculates the remaining amount of the consumer good based on the utilization information received by the transmitting/receiving section 201. Then, the updating section 207 updates the utilization information accumulated in the utilization information accumulating section 205 based on the utilization information received by the transmitting/receiving section 201 and the remaining amount calculated. This and subsequent operations are similar to operations of step S26 and thereafter of FIG. 16 of Embodiment 1 and will not be described below.

Thus, by reading barcodes provided on consumer goods, consumer goods identification information for identifying the consumer goods are obtained, and only the consumer goods associated with the obtained consumer goods identification information are presented to the user. Therefore, the user can easily select a consumer good to be used from among the consumer goods the user actually owns.

Embodiment 5

5.1 Configuration of Point-of-Use Information Obtaining System

Figure 31:
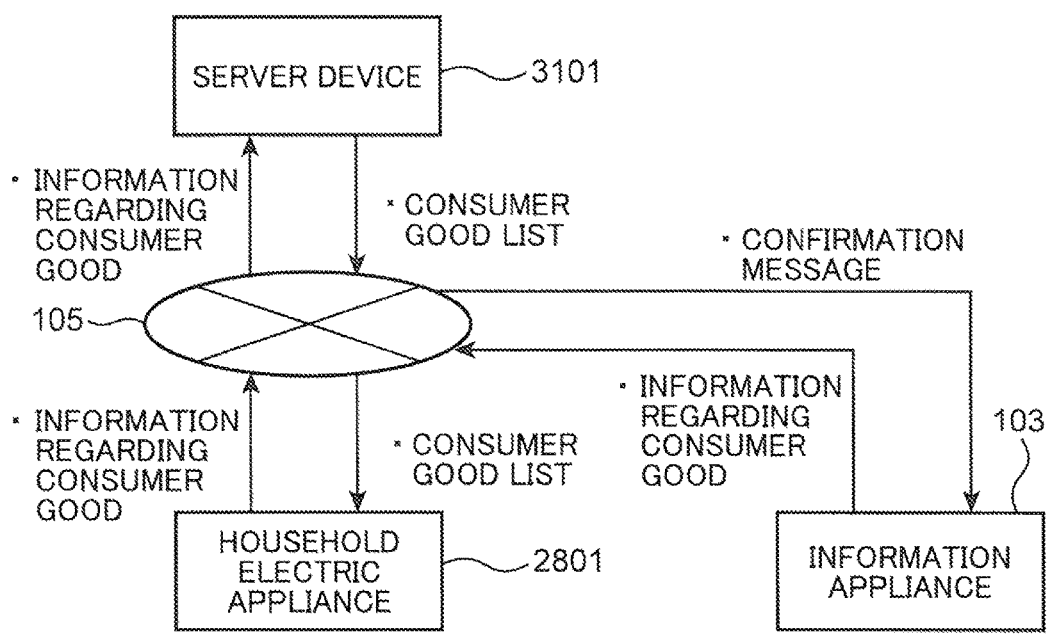
FIG. 31 is a diagram showing a configuration of a point-of-use information obtaining system according to Embodiment 5 of the present invention.

FIG. 31 is a diagram showing a configuration of a point-of-use information obtaining system according to Embodiment 5 of the present invention. The point-of-use information obtaining system according to Embodiment 5 of the present invention includes a server device 3101, the household electric appliance 2801 and the information appliance 103, as shown in FIG. 31.

The server device 3101 stores a consumption list representing a list of consumer goods, and the server device 3101 transmits a consumer goods list in response to a request from the household electric appliance 2801 and transmits a confirmation message for confirming the consumer good being currently used to the information appliance 103. The server device 3101 stores setting information regarding the operation of the household electric appliance 2801, which is set for the household electric appliance 2801 when operating the household electric appliance 2801 using a consumer good, and transmits the setting information of the household electric appliance 2801 in response to a request from the household electric appliance 2801. In addition, the server device 3101 receives, from the household electric appliance 2801, and accumulates information regarding the consumer good being currently used by the household electric appliance 2801.

A barcode is provided on a consumer good. For example, a barcode is printed on or attached to the package of the consumer good. A barcode has recorded therein information for identifying the consumer good on which it is provided.

From a barcode provided on a consumer good, the household electric appliance 2801 detects information regarding that consumer good (e.g., the product ID, or the like), and transmits the detected information regarding the consumer good to the server device 3101. The household electric appliance 2801 receives the detected information regarding the consumer good (e.g., the product image, or the like) from the server device 101, and presents the received information regarding the consumer good to the user. The household electric appliance 2801 accepts a user confirmation (user input) indicating whether or not the presented information regarding the consumer good is correct, and transmits the accepted user input to the server device 3101.

The information appliance 103 receives a confirmation message from the server device 3101, presents the received confirmation message to the user, and accepts an input of information regarding a consumer good by the user. The information appliance 103 transmits the accepted information regarding a consumer good to the server device 3101.

5.2 Configuration of Server Device 3101

Next, a detailed configuration of the server device 3101 will be described will be described.

Figure 32:
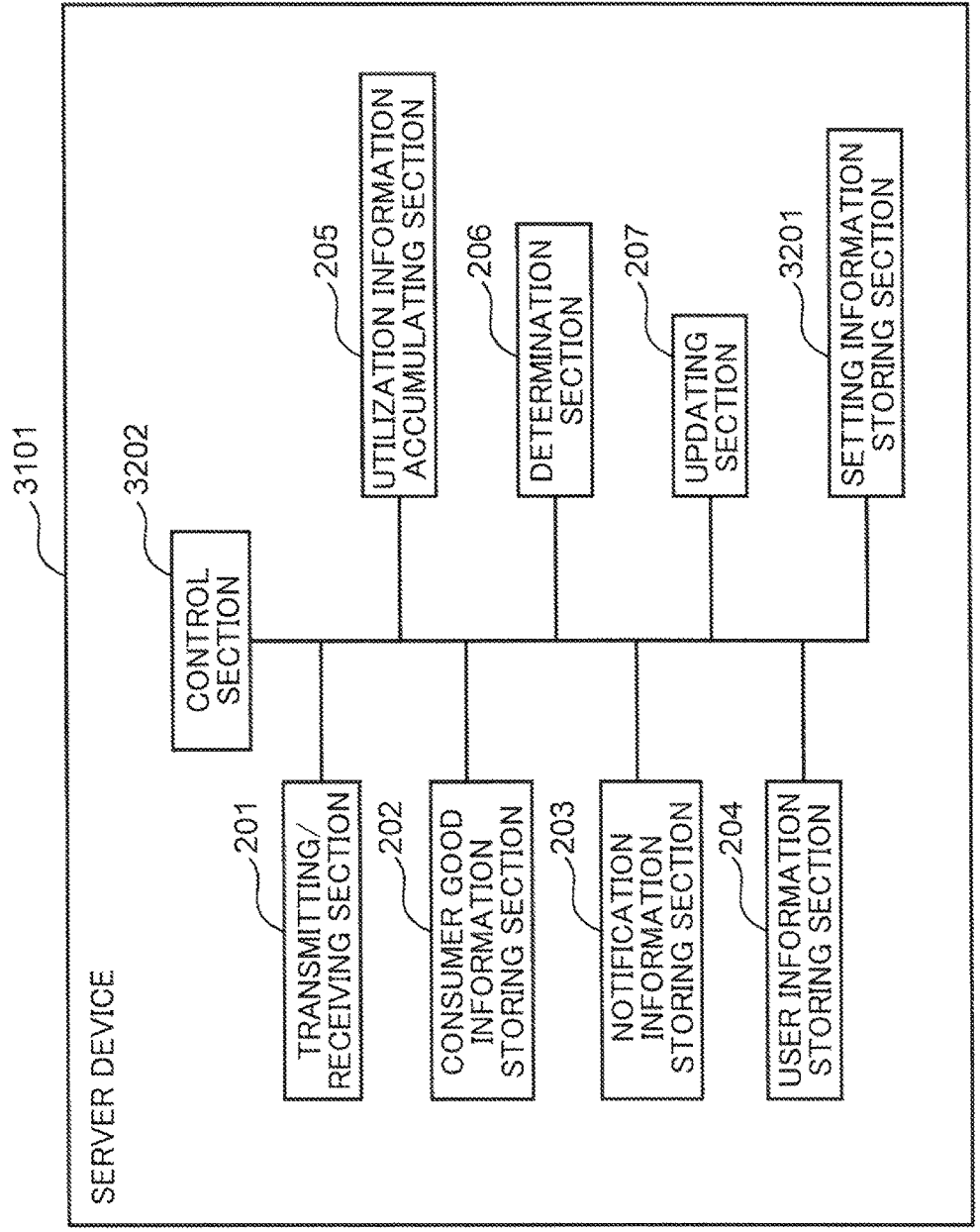
FIG. 32 is a diagram showing a configuration of a server device according to Embodiment 5 of the present invention.

FIG. 32 is a diagram showing a configuration of the server device according to Embodiment 5 of the present invention.

As shown in FIG. 32, the server device 3101 includes the transmitting/receiving section 201, the consumer good information storing section 202, the notification information storing section 203, the user information storing section 204, the utilization information accumulating section 205, the determination section 206, the updating section 207, a setting information storing section 3201 and a control section 3202.

The server device 3101 is implemented by a microprocessor, a RAM, a ROM, a hard disk, and the like, which are not specifically shown in the figure. The RAM, the ROM or the hard disk stores computer programs, and the functions of the server device 3101 are implemented by the microprocessor operating in accordance with the computer programs.

Note that the functional blocks of the server device 3101, such as the transmitting/receiving section 201, the consumer good information storing section 202, the notification information storing section 203, the user information storing section 204, the utilization information accumulating section 205, the determination section 206, the updating section 207, the setting information storing section 3201 and the control section 3202 may be implemented as LSIs which are typically integrated circuits. The functional blocks may be individually provided in single chips, and a single chip may include one or more functional block or a part of a functional block.

Although it is described as an LSI, it may be referred to as an IC, a system LSI, a super LSI or an ultra LSI, depending on the degree of integration.

The method of circuit integration is not limited to LSI, but it may be implemented by a dedicated circuit or a general-purpose processor. One may employ an FPGA which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. For example, a possible example of a circuit integration technique replacing LSI may be an application of biotechnology, etc.

Finally, each functional block may be implemented by software or a combination of LSI and software. The software may be made tamper-resistant.

(1) Transmitting/Receiving Section 201 to Updating Section 207

The configurations of the transmitting/receiving section 201, the consumer good information storing section 202, the notification information storing section 203, the user information storing section 204, the utilization information accumulating section 205, the determination section 206 and the updating section 207 are similar to those of Embodiment 1 and will not be described below.

(2) Setting Information Storing Section 3201

The setting information storing section 3201 stores, for each consumer good, setting information regarding the operation of the household electric appliance, which is set for the household electric appliance. FIG. 33 is a diagram showing an example of setting information according to Embodiment 5. The example of setting information of FIG. 33 includes, associated with one another, the manufacturer name of the manufacturer who manufactured the consumer good, the product ID with which it is possible to identify the consumer good, the product name representing the name of the consumer good, the amount (the number of pieces or the volume) of the consumer good to be used by the household electric appliance, and the setting information of the household electric appliance. The setting information shown in FIG. 33 represents an example where the household electric appliance is a microwave oven, and consumer goods are frozen foods. For example, where two pieces of a frozen food of which the manufacturer name is "Company K", the product ID is "5293", and the product name is "GRU" are to be cooked by the microwave oven, they need to be heated for 1 min and 30 sec at the power of 500 W and 1 min and 20 sec at the power of 600 W.

When the household electric appliance 2801 reads a barcode provided on the consumer good to obtain the consumer goods identification information, the household electric appliance 2801 transmits the obtained consumer goods identification information to the server device 3101.

The transmitting/receiving section 201 of the server device 3101 extracts, from the setting information storing section 3201, setting information associated with the consumer goods identification information (product ID) received from the household electric appliance 2801, and transmits the extracted setting information to the household electric appliance 2801. The household electric appliance 2801 receives the setting information transmitted by the server device 3101, and the household electric appliance 2801 is operated based on the received setting information. This eliminates the need for setting the time on the household electric appliance 2801 (microwave oven).

(3) Control Section 3202

The control section 3202 implements the functions of the server device 3101 by managing and controlling the transmitting/receiving section 201, the consumer good information storing section 202, the notification information storing section 203, the user information storing section 204, the utilization information accumulating section 205, the determination section 206, the updating section 207 and the setting information storing section 3201 described above.

5.3 Configuration of Household Electric Appliance 2801 and Information Appliance 103

The configurations of the household electric appliance 2801 and the information appliance 103 of Embodiment 5 are similar to those of Embodiment 1 and Embodiment 4 and will not be described below.

Note that when consumer good information is received in step S130 of FIG. 30, the server device 3101 may extract setting information stored in the setting information storing section 3201 based on the received consumer good information.

Therefore, in Embodiment 5, when a household electric appliance is operated using a consumer good, setting information, which is set for the household electric appliance, is provided from the server device to the household electric appliance, thereby eliminating the need for the user to perform a setting operation on the household electric appliance, and thus improving the controllability of the household electric appliance.

(Variations)

Variations of the present invention will now be described.

(1) In Embodiments 1 to 5, the server device transmits a consumer goods list to the household electric appliance and a confirmation message to the information appliance, but the present invention is not limited to this configuration. The server device may transmit a consumer goods list to the information appliance and a confirmation message to the household electric appliance. The server device may transmit both a consumer goods list and a confirmation message to the household electric appliance. The server device may also transmit both a consumer goods list and a confirmation message to the information appliance.

That is, the server device may transmit a confirmation message to a household electric appliance that uses the consumer good, another household electric appliance, which is not the household electric appliance that uses the consumer good, or an information appliance.

(2) In Embodiments 1 to 5, the confirmation message transmitted by the server device includes a message presenting discount information such as a coupon or a message presenting a product sample, but the present invention is not limited to this configuration. The server device may transmit household electric appliance control information associated with a consumer good. Note that where the household electric appliance is a washing machine, the household electric appliance control information represents a new washing course, and where the household electric appliance is a microwave oven, it represents a new menu or a new function.

The server device may transmit information notifying of an associated product associated with a consumer good or a consumer good used with another household electric appliance. The server device may transmit information of a new product of a household electric appliance or a consumer good. The server device may transmit information notifying of when to next purchase the consumer good being currently used. The server device may present only the discount information for the consumer good being currently used.

The server device may present discount information for an unused consumer good belonging to the same product category as the consumer good being currently used. In this case, the server device may set a higher discount rate for the unused consumer good, or suggest the availability of a product sample of an unused consumer good belonging to the same product category as the consumer good being currently used. The server device may analyze the user's tastes and preferences based on the utilization status of consumer goods so as to provide information on a recipe or how to use a household electric appliance as recommended based on the analysis results.

Moreover, when the remaining amount of a consumer good is less than or equal to a predetermined set value, the server device may not only notify (or instead of notifying) of when to next purchase the consumer good, but also cooperate with the server device of an electronic commerce (EC) website so as to automatically register the consumer good (in so-called a "shopping cart") as a product to be purchased by the user on the EC website. Alternatively, the server device of an EC website may manage consumer goods of which the remaining amount is small so as to make those consumer goods of which the remaining amount is small more easily purchasable by the user.

(3) In Embodiment 1, the household electric appliance displays a consumer goods list to accept a user input in order to identify the consumer good being currently used, but the present invention is not limited to this configuration. The information appliance may display a consumer goods list and accept a user input. In this case, the information appliance may transmit the consumer good information input by the user directly to the server device, or transmit the consumer good information input by the user to the server device via the household electric appliance. The household electric appliance may display a consumer goods list and accept a user input so as to transmit the consumer good information input by the user to the server device via the information appliance.

(4) In Embodiments 1 to 5, where a consumer goods list is transmitted to a household electric appliance or an information appliance, the server device may include a decision section for deciding whether it is transmitted to the household electric appliance or to the information appliance depending on the number of items displayed. In this case, if the consumer goods list has a number of items displayed that is smaller than a predetermined number, the server device transmits the consumer goods list to the household electric appliance, and if the consumer goods list has a number of items displayed that is greater than or equal to the predetermined number, the server device transmits the consumer goods list to the information appliance. Alternatively, the server device may decide whether or not the household electric appliance is being currently operated, and the server device may transmit the consumer goods list to the household electric appliance if the household electric appliance is being operated, and may transmit the consumer goods list to the information appliance if the household electric appliance is not being operated.

(5) In Embodiments 1 to 5, the timing at which the server device transmits a confirmation message to the household electric appliance or the information appliance may be one of the first timing to the fourth timing to be described below, or may be a timing obtained by combining together two or more of the first timing to the fourth timing to be described below.

The first timing is a timing when the remaining amount, which is controlled based on the interior volume and the amount of consumption of the consumer good (a laundry detergent, a frozen food, or the like), reaches, or becomes below, a predetermined set value.

The second timing is a timing that is determined in advance for each product, for each product category, for each manufacturer, or for each household electric appliance. For example, it may be set in advance for Product A that a confirmation message be transmitted after 30 days from the consumption start date, and it may be set in advance for Product category B that a confirmation message be transmitted after one week from the consumption start date.

The third timing is a timing that is determined based on user information such as the family composition. For example, if the family composition includes 4 people and Product D is normally consumed in one week, the server device transmits a confirmation message after one week from the consumption start date of Product D.

The fourth timing is a timing that is determined based on the cycle in which the consumer good is purchased by the user. For example, where a user purchases one unit of Product E per month, the server device transmits a confirmation message immediately before the purchase timing for Product E.

(6) In Embodiment 2, where the server device provides a consumer goods list based on the sales information and displays it on the household electric appliance, a consumer good of which the purchase date is closer to the current date may be displayed first, or a consumer good of which the purchase frequency (the number of times purchased) is higher may be displayed first. If a consumer good that the user has been using or the user is about to start using is not included in the consumer goods list presented by the server device based on the sales information, the household electric appliance or the information appliance may accept a user input indicating that a consumer good of interest is not included in the consumer goods list, and transmit the accepted user-input information to the server device. In this case, when the user-input information is received, the server device may extract the consumer good information associated with the household electric appliance, and re-transmit the extracted consumer good information as a consumer goods list.

An information appliance such as a smartphone may have sales information stored therein. The information appliance may transmit the sales information directly to the household electric appliance. The information appliance may transmit the sales information to the household electric appliance via the server device. The information appliance may transmit the sales information directly to the server device. The information appliance may transmit the sales information to the server device via the household electric appliance.

(7) In Embodiment 3, where the household electric appliance is a washing machine or a microwave oven, the wireless tag detecting section may search for wireless tags in the vicinity thereof at a timing when the power is turned ON, for example, and detect a consumer good having been used up, a consumer good having been disposed of, or a change in the stock of a consumer good. Where the household electric appliance is a refrigerator, the wireless tag detecting section may search for wireless tags in the vicinity thereof at a timing when the door is opened or at a timing when the door is closed, for example, and detect a consumer good having been used up, a consumer good having been disposed of, or a change in the stock of a consumer good. The server device may store, as a consumption history, the timing at which the consumer good was used up or the period during which the consumer good was being used. The server device may determine the timing at which to transmit a confirmation message depending on the consumption history. The server device may determine the timing at which to transmit a confirmation message based on a combination between the timing determination method of Variation (5) described above and the consumption history.

(8) In Embodiments 1 to 5, the household electric appliance is not limited to washing machines and microwave ovens, but it may be any household electric appliance as long as a consumer good is used therewith, e.g., a refrigerator, a dishwasher, a baking machine, a rice cooker, a coffee maker, a vacuum cleaner, a toilet (including a warm water cleansing toilet seat), an electric toothbrush, or a shaver. The consumer good may be, for example, a detergent, a frozen food, flour, rice, coffee beans, paper bags, toilet paper, toothpaste, or shaving cream. Moreover, the information appliance may be any appliance as long as it includes a display section (display), e.g., a mobile telephone, a smartphone, a tablet device, a TV, a personal computer, a facsimile machine, or a door monitor.

(9) In Embodiments 1 to 5, when the household electric appliance or the information appliance displays a consumer goods list and accepts a user input, it may accept an input by the user of the remaining amount of the consumer good. In this case, the household electric appliance or the information appliance may accept a user input including, for example, 'half-used', '⅓ used', '20% used', 'used 5 times', or 'unused'.

(10) In Embodiment 5, the household electric appliance reads a barcode to identify the consumer good, and the server device extracts, from a database (setting information storing section), setting information for the household electric appliance associated with the consumer good. In addition, the household electric appliance may accept an input by the user of the amount of consumption of the consumer good to be used, and transmit the accepted amount of consumption to the server device. The amount of consumption of a consumer good is, for example, the number of pieces or the volume of a frozen food to be cooked by a microwave oven. The server device may determine the setting information for the household electric appliance based on the amount of consumption input by the user and the consumer good identified by reading a barcode. Instead of identifying the consumer good by reading a barcode, the household electric appliance may identify the consumer good from a wireless tag, a user input, or the user's purchase information (purchase history).

(11) The operation of reading a barcode or detecting a wireless tag in Embodiments 3 to 5 may be performed by the household electric appliance, by the information appliance, or by a different appliance other than the information appliance or the household electric appliance with which the consumer good is used. The appliances may transmit consumer goods identification information obtained by reading a barcode or consumer goods identification information read out from a wireless tag directly to the server device or to the server device via another appliance.

That is, an information appliance different from the household electric appliance may obtain information for identifying the consumer good by reading a barcode. The server device may receive information for identifying the consumer good obtained by the information appliance, directly from the information appliance. The server device may receive information for identifying the consumer good obtained by the information appliance, via the household electric appliance. In this process, the information appliance transmits, to the server device, information (appliance ID) for identifying the household electric appliance with which the consumer good is used, together with the information for identifying the consumer good.

An information appliance different from the household electric appliance may read out information for identifying the consumer good from a wireless tag. The server device may receive information for identifying the consumer good read out by the information appliance, directly from the information appliance. The server device may receive information for identifying the consumer good read out by the information appliance, via the household electric appliance. In this process, the information appliance transmits, to the server device, information (appliance ID) for identifying the household electric appliance with which the consumer good is used, together with the information for identifying the consumer good.

Figure 34:
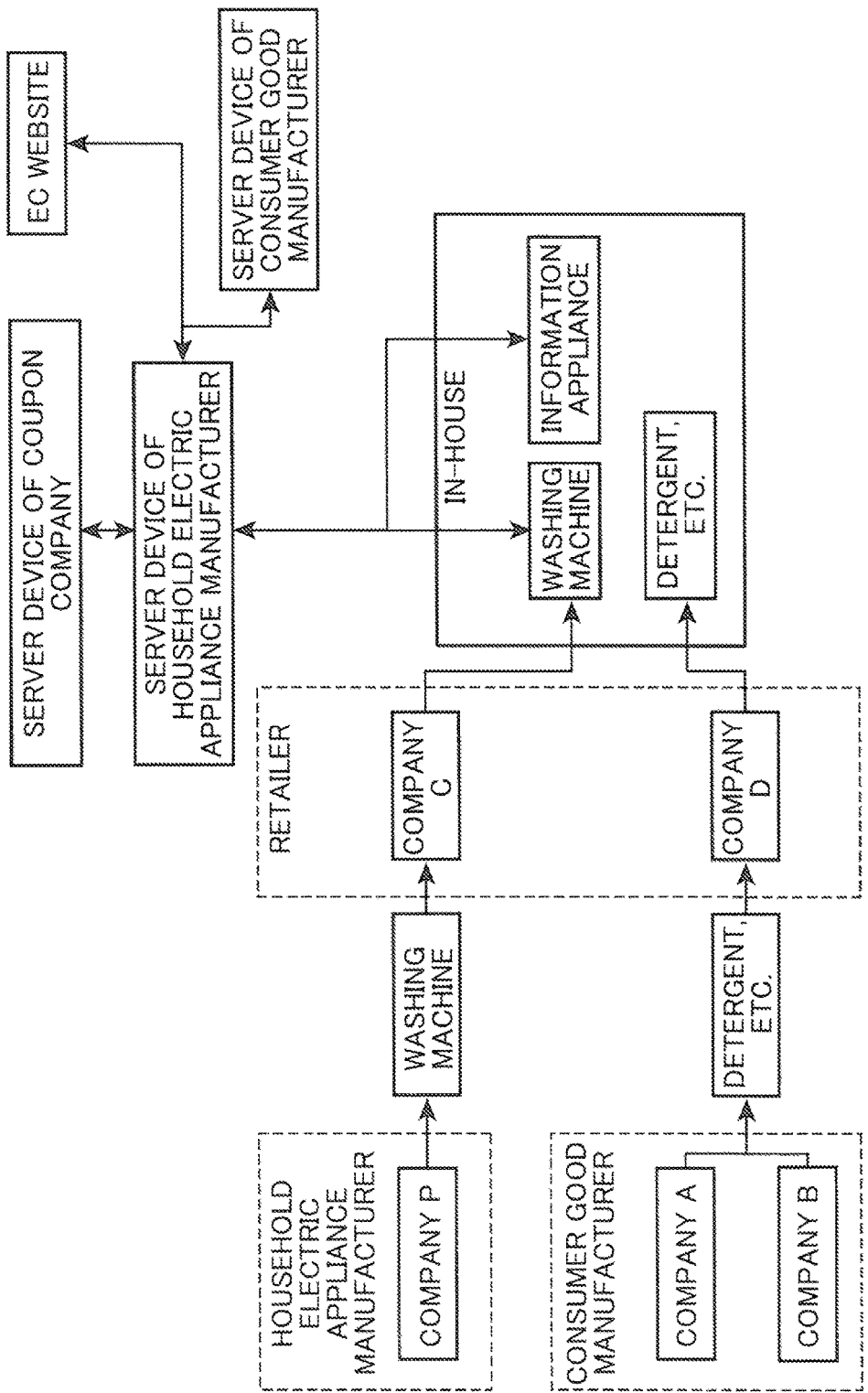
FIG. 34 is a diagram schematically showing a configuration of a point-of-use information obtaining system in which a household electric appliance manufacturer and a consumer good manufacturer cooperate with each other so as to provide a coupon or a product sample.

(12) FIG. 34 is a diagram schematically showing a configuration of a point-of-use information obtaining system in which a household electric appliance manufacturer and a consumer good manufacturer cooperate with each other so as to provide a coupon or a product sample. Note that in the example shown in FIG. 34, the household electric appliance is a washing machine, and the consumer good is a detergent. Preferably, in the point-of-use information obtaining system, the household electric appliance manufacturer and the consumer good manufacturer cooperate with each other to minimize the user's burden and provide a coupon or a product sample, thereby continuously obtaining the utilization information.

A method by which the consumer good being used can be easily input may be selecting form a consumer goods list obtained via the server device, obtaining an input by a barcode (obtaining directly from the household electric appliance or via the information appliance), obtaining an input by a wireless tag (obtaining directly from the household electric appliance or via the information appliance), obtaining an input in cooperation with an EC website (utilizing purchase information by displaying a list of consumer goods purchased in the past), or obtaining an input in cooperation with point-of-sales information (POS information) (obtaining sales information from a retailer).

Moreover, as a method of issuing a coupon or giving points, the server device may issue a coupon (displaying a coupon on an LCD screen) when a washing machine is operated, or may automatically transfer a coupon to an information appliance such as a personal computer or a smartphone (e.g., transmission via email, or transfer via near field communication (NFC)). If the same consumer good has been used many times, the server device may transmit a coupon of that consumer good or a coupon of another product competing with that consumer good (e.g., transmission via email, or transfer via NFC). The server device may present, to the user, the provision of a product sample of a newly-released consumer good or the provision of a product sample of a product competing with the consumer good being currently used. When a new consumer good is released, the server device may transmit a coupon for the new product (e.g., transmission via email, or transfer via NFC), or may present, to the user, the provision of a product sample of the new product.

Moreover, as a method for cooperating with an EC website, the server device may transmit a recommended consumer good to a household electric appliance or an information appliance (e.g., transmission via email, or transfer via NFC) if the same consumer good has been used many times. If the same consumer good has been used many times, the server device may automatically input that consumer good in the 'Recommended' section of the EC website frequently used by the user, or may arrange so that the user can immediately purchase that consumer good when visiting the EC website.

Figure 35:
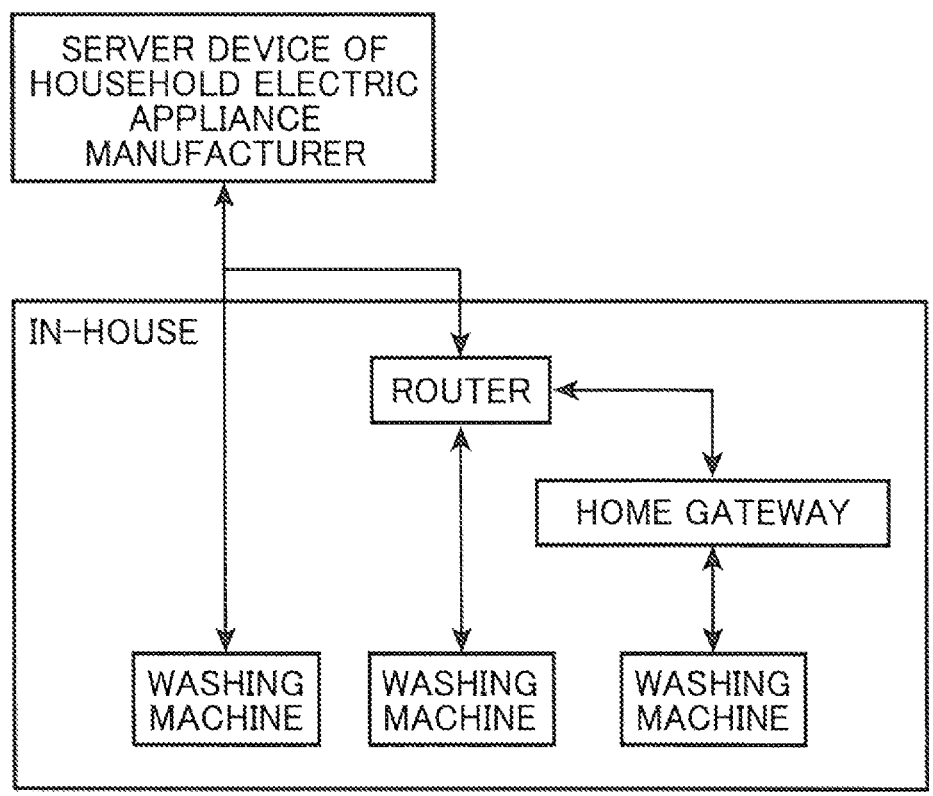
FIG. 35 is a diagram illustrating a method for connecting together a household electric appliance and a server device.

(13) FIG. 35 is a diagram illustrating a method for connecting together a household electric appliance and a server device. Note that in the example of FIG. 35, the household electric appliance is a washing machine. As shown in FIG. 35, the household electric appliance may connect directly to the server device by using a mobile telephone network, or the like, may connect to the server device via an in-home wireless router (router), or may connect to the server device via an in-home home gateway and wireless router (router).

The point-of-use information (utilization information) may be input by using a large screen of the household electric appliance (washing machine), may be input by using a small screen of the household electric appliance (washing machine) (including cases where the input is made by using a wireless tag or by using a barcode), or may be input by using a combination of a screen of the household electric appliance (washing machine) and an information appliance (including cases where the input is made by using a wireless tag, by using a barcode, by using NFC transfer, or by transferring to the washing machine via the server device).

Figure 36:
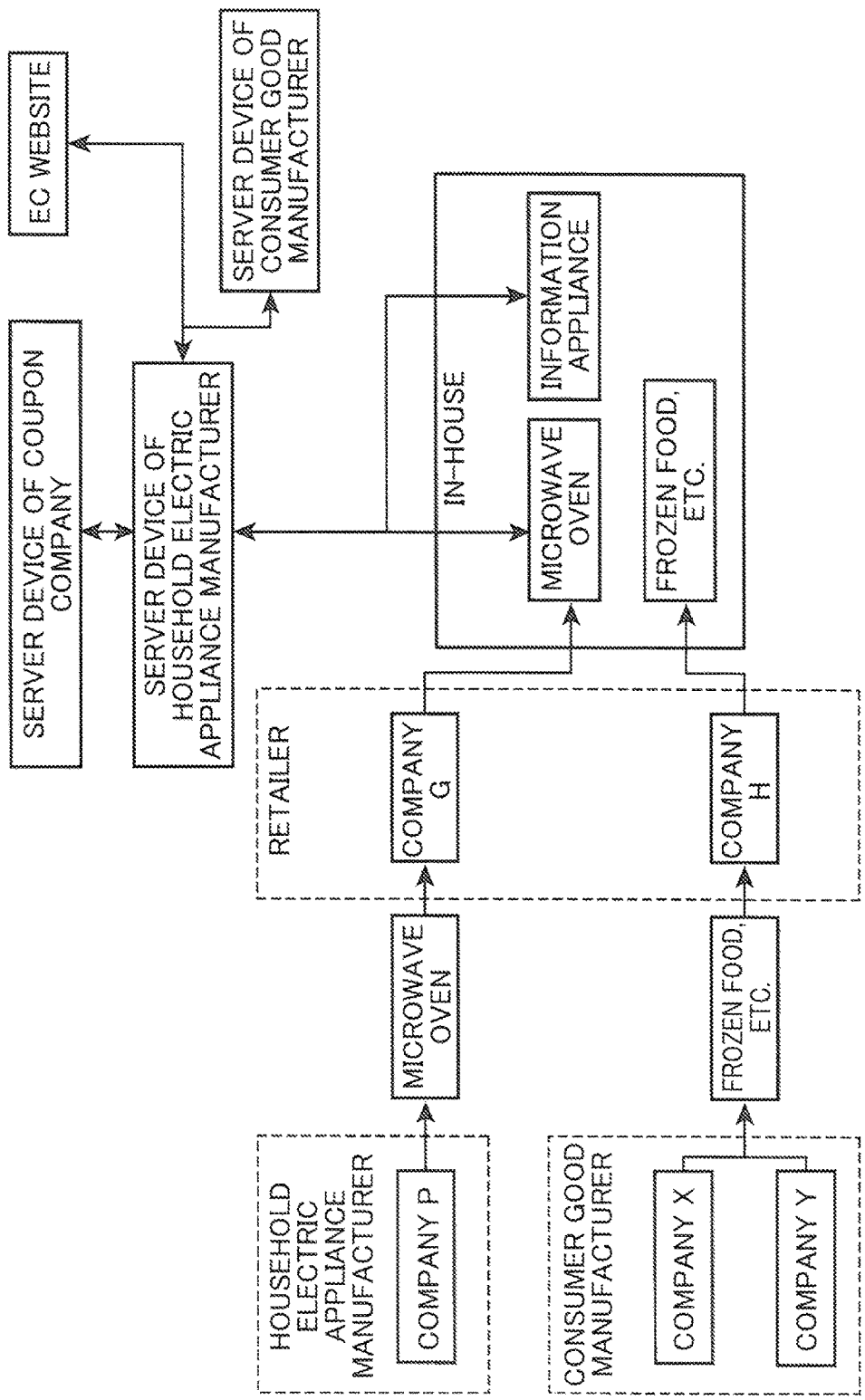
FIG. 36 is a diagram schematically showing a configuration of a point-of-use information obtaining system in which a household electric appliance manufacturer and a consumer good manufacturer cooperate with each other so as to provide a coupon or a product sample.

(14) FIG. 36 is a diagram schematically showing a configuration of a point-of-use information obtaining system in which a household electric appliance manufacturer and a consumer good manufacturer cooperate with each other so as to provide a coupon or a product sample. Note that in the example shown in FIG. 36, the household electric appliance is a microwave oven, and the consumer good is a frozen food. Preferably, in the point-of-use information obtaining system, the household electric appliance manufacturer and the consumer good manufacturer cooperate with each other to minimize the user's burden and provide a coupon or a product sample, thereby continuously obtaining the utilization information.

A method by which the consumer good being used can be easily input may be selecting form a consumer goods list obtained via the server device, obtaining an input by a barcode (obtaining directly from the household electric appliance or via the information appliance), obtaining an input by a wireless tag (obtaining directly from the household electric appliance or via the information appliance), obtaining an input in cooperation with an EC website (utilizing purchase information by displaying a list of consumer goods purchased in the past), or obtaining an input in cooperation with point-of-sales information (POS information) (obtaining sales information from a retailer).

Moreover, as a method of issuing a coupon or giving points, the server device may issue a coupon (displaying a coupon on an LCD screen) when a microwave oven is operated, or may automatically transfer a coupon to an information appliance such as a personal computer or a smartphone (e.g., transmission via email, or transfer via NFC). If the same consumer good has been used many times, the server device may transmit a coupon of that consumer good or a coupon of another product competing with that consumer good (e.g., transmission via email, or transfer via NFC). The server device may present, to the user, the provision of a product sample of a newly-released consumer good or the provision of a product sample of a product competing with the consumer good being currently used. When a new consumer good is released, the server device may transmit a coupon for the new product (e.g., transmission via email, or transfer via NFC), or may present, to the user, the provision of a product sample of the new product.

Moreover, as a method for cooperating with an EC website, the server device may transmit a recommended consumer good to a household electric appliance or an information appliance (e.g., transmission via email, or transfer via NFC) if the same consumer good has been used many times. If the same consumer good has been used many times, the server device may automatically input that consumer good in the 'Recommended' section of the EC website frequently used by the user, or may arrange so that the user can immediately purchase that consumer good when visiting the EC website.

Figure 37:
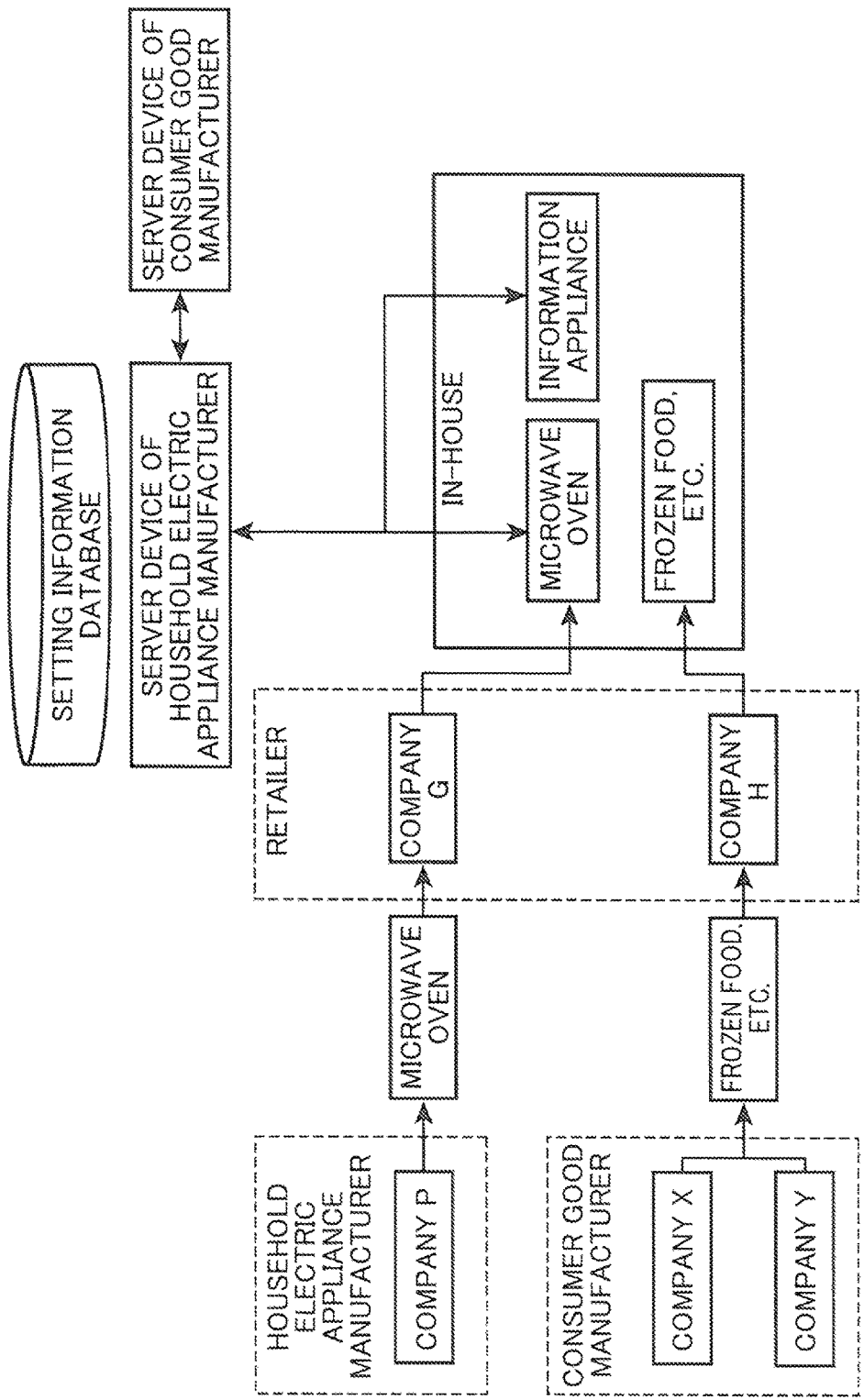
FIG. 37 is a diagram schematically showing a configuration of a point-of-use information obtaining system in which a household electric appliance manufacturer and a consumer good manufacturer cooperate with each other so as to provide setting information for a household electric appliance.

(15) FIG. 37 is a diagram schematically showing a configuration of a point-of-use information obtaining system in which a household electric appliance manufacturer and a consumer good manufacturer cooperate with each other so as to provide setting information for a household electric appliance. Note that in the example shown in FIG. 37, the household electric appliance is a microwave oven, and the consumer good is a frozen food. As shown in FIG. 37, the server device stores, in a setting information database, setting information (parameters such as the wattage or the irradiation time) for household electric appliances (a microwave oven in this case). Now, the setting information is provided by the manufacturer of the consumer good (a frozen food in this case), or provided by the user voluntarily making an input.

The microwave oven may include a barcode reader, and may obtain setting information by making an inquiry to the setting information database of the server device using barcode information read by the barcode reader. The microwave oven may include an NFC function, and may obtain barcode information read by an information appliance such as a smartphone by using the NFC function so as to obtain setting information by making an inquiry to the setting information database of the server device using the obtained barcode information.

The information appliance such as a smartphone may include a barcode reader, and may obtain setting information by making an inquiry to the setting information database of the server device using the barcode information read by the barcode reader, and the microwave oven may include an NFC function, and may obtain the setting information, which has been obtained by the information appliance, from the information appliance by using the NFC function.

The microwave oven may include an infrared (IR) communication function, and may obtain barcode information read by the information appliance such as a smartphone by using the IR communication function so as to obtain setting information by making an inquiry to the setting information database of the server device using the obtained barcode information.

The information appliance such as a smartphone may include a barcode reader, and may obtain setting information by making an inquiry to the setting information database of the server device using the barcode information read by the barcode reader, and the microwave oven may include an IR communication function, and may obtain setting information, which has been obtained by the information appliance, from the information appliance using the IR communication function.

(16) In the embodiments described above, a single device has a plurality of functions (components), but the present invention is not limited to this configuration. A plurality of functions (components) may be distributed among a plurality of devices, and effects or functions similar to those of the present embodiment may be implemented by combination thereof.

(17) Some or all of the components of devices described above may be implemented by IC cards or single-unit modules that can be inserted/removed into/from the devices. An IC card or a module is a computer system implemented by a microprocessor, a ROM, a RAM, etc. An IC card or a module may include a super multi-function LSI described above. The IC card or module achieves its function as the microprocessor operates in accordance with computer programs. The IC card or module may be tamper-resistant.

(18) The present invention may be any of the methods described above. The present invention may also be a computer program that implements these methods by using a computer, or a digital signal of a computer program.

The present invention may also be a computer-readable storage medium storing a computer program or a digital signal. The computer-readable storage medium may be, for example, a flexible disk, a hard disk, a CD-ROM, an MO, a DVD, a DVD-ROM, a DVD-RAM, a Blu-ray (registered trademark) Disc (BD), a semiconductor memory, etc. The present invention may be a digital signal stored in these storage media.

The present invention may be a computer program or a digital signal being transferred via a network such as a telecommunication network, a wireless communication network, a wired communication network and the Internet, or data broadcasting, etc.

The present invention my be a computer system including a microprocessor and a memory, wherein the memory may store the computer program, and the microprocessor may operate in accordance with computer programs.

A computer program or a digital signal may be carried out by another independent computer system by recording it on a computer-readable storage medium and transferring it to the independent computer system. A computer program or a digital signal may be carried out by another independent computer system by transferring it to the independent computer system via a network, or the like.

(19) Embodiments 1 to 5 described above and Variations (1) to (18) described above may be combined together.

Note that the specific embodiments described above primarily include an invention configured as follows.

An information obtaining method according to one aspect of the present invention includes: receiving information regarding a consumer good which has been determined as a consumer good actually used by a user with a household electric appliance; storing, in a first memory section, a consumption status of the consumer good which has been determined as a consumer good actually used by the user, based on the received information regarding the consumer good; receiving, from the household electric appliance, an identifier for identifying the household electric appliance and an operation status of the household electric appliance; estimating the consumption status of the consumer good using the received operation status; updating the consumption status of the consumer good stored in the first memory section based on the estimated consumption status of the consumer good; deciding whether or not to transmit a confirmation message for confirming the consumer good being used with the household electric appliance, based on the updated consumption status of the consumer good; and transmitting the confirmation message when it is decided that the confirmation message is to be transmitted.

With this configuration, information regarding a consumer good which has been determined as a consumer good actually used by the user with a household electric appliance is received, and based on the received information regarding a consumer good, the consumption status of the consumer good which has been determined as a consumer good actually used by the user is stored in the first memory section. An identifier for identifying the household electric appliance and an operation status of the household electric appliance are received from the household electric appliance. The consumption status of the consumer good is estimated using the received operation status. The consumption status of the consumer good stored in the first memory section is updated based on the estimated consumption status of the consumer good. It is decided whether or not to transmit a confirmation message for confirming the consumer good being used with the household electric appliance, based on the updated consumption status of the consumer good. Then, the confirmation message is transmitted when it is decided that the confirmation message is to be transmitted.

Thus, the consumption status of a consumer good is estimated by using the received operation status; a confirmation message is transmitted at a timing when a decision is made based on the estimated consumption status of the consumer good; and information regarding a consumer good which has been determined as a consumer good actually used by the user is received as a response to the confirmation message. Therefore, it is possible to appropriately identify a consumer good which the user uses with a household electric appliance.

In the information obtaining method described above, it is preferred that a quantity of the consumer good at a start of consumption is determined in advance.

With this configuration, since the quantity of the consumer good at the start of consumption is determined in advance, it is possible to easily manage the amount of consumption and the remaining amount of the consumer good.

In the information obtaining method described above, it is preferred that the first memory section stores a remaining amount of the consumer good, and the method further includes: estimating, as the consumption status, the remaining amount of the consumer good using the received operation status; updating the remaining amount of the consumer good stored in the first memory section, based on the estimated remaining amount of the consumer good; deciding whether or not the updated remaining amount of the consumer good is less than or equal to a predetermined value; and transmitting a confirmation message for confirming the consumer good being used when it is decided that the updated remaining amount of the consumer good is less than or equal to the predetermined value.

With this configuration, the remaining amount of the consumer good is estimated as the consumption status using the received operation status, and the remaining amount of the consumer good stored in the first memory section is updated based on the estimated remaining amount of the consumer good. It is decided whether or not the updated remaining amount of the consumer good is less than or equal to a predetermined value, and when it is decided that the updated remaining amount of the consumer good is less than or equal to the predetermined value, a confirmation message for confirming the consumer good being used is transmitted.

Thus, the remaining amount of the consumer good is estimated, and a confirmation message for confirming the consumer good being used is transmitted if the remaining amount of the consumer good is less than or equal to a predetermined value. Therefore, it is possible to identify a consumer good to be used next when the consumer good is running out.

In the information obtaining method described above, it is preferred that the method further includes: storing the information regarding a consumer good in the second memory section in advance while the information is associated with a type of the household electric appliance; receiving, from the household electric appliance, a request for the information regarding a consumer good and an identifier for identifying the household electric appliance; extracting, from the second memory section, information regarding a consumer good which can be used with the household electric appliance associated with the identifier; and transmitting the extracted information regarding the consumer good.

With this configuration, information regarding a consumer good is stored in advance in the second memory section while the information is associated with a type of the household electric appliance. A request for the information regarding a consumer good and an identifier for identifying the household electric appliance are received from the household electric appliance. The information regarding a consumer good which can be used with the household electric appliance associated with the identifier is extracted from the second memory section, and the extracted information regarding a consumer good is transmitted.

Thus, information regarding a consumer good which can be used with the household electric appliance is transmitted, and information regarding a consumer good which has been determined as a consumer good actually used by the user is received. Therefore, it is possible to appropriately identify a consumer good which the user uses with a household electric appliance.

In the information obtaining method described above, it is preferred that the second memory section stores information regarding a plurality of consumer goods, and the method further includes: extracting, from the second memory section, information regarding a plurality of consumer goods which can be used with the household electric appliance associated with the identifier; transmitting the extracted information regarding the plurality of consumer goods as a consumer goods list; and receiving the information regarding the consumer good which has been determined as a consumer good actually used by the user, from among the consumer goods list.

With this configuration, information regarding a plurality of consumer goods are stored in the second memory section; the information regarding a plurality of consumer goods which can be used with the household electric appliance associated with the identifier are extracted from the second memory section; and the extracted information regarding the plurality of consumer goods are transmitted as a consumer goods list. Then, the information regarding the consumer good which has been determined as a consumer good actually used by the user, from among the consumer goods list.

Thus, since information regarding a plurality of consumer goods are transmitted as a consumer goods list, the user can easily select a consumer good to be actually used from among the consumer goods list.

In the information obtaining method described above, it is preferred that the method further includes: selecting a consumer good which has been sold to the user based on sales information in which information for identifying the consumer good which has been sold to the user is associated with a type of a household electric appliance with which the consumer good is used; and extracting the information regarding the selected consumer good from the second memory section.

With this configuration, a consumer good which has been sold to the user is selected based on sales information in which information for identifying the consumer good which has been sold to the user is associated with a type of a household electric appliance with which the consumer good is used; and the information regarding the selected consumer good is extracted from the second memory section.

Thus, since only information regarding consumer goods which the user has actually purchased are extracted and transmitted, the user can easily identify a consumer good to be used.

In the information obtaining method described above, it is preferred that the method further includes: obtaining information for identifying the consumer good by reading a barcode provided on the consumer good; receiving the obtained information for identifying the consumer good; and extracting, from the second memory section, the information regarding the consumer good on which the barcode is provided, based on the received information regarding the consumer good.

With this configuration, information for identifying the consumer good is obtained by reading a barcode provided on the consumer good. The obtained information for identifying the consumer good is received, and the information regarding the consumer good on which the barcode is provided is extracted from the second memory section based on the received information regarding the consumer good.

Thus, information for identifying the consumer good is obtained by reading a barcode provided on the consumer good, and only consumer goods associated with obtained information for identifying consumer goods are presented to the user. Therefore, the user can easily select a consumer good to be used from among the consumer goods the user actually owns.

In the information obtaining method described above, it is preferred that the method further includes: obtaining information for identifying the consumer good by reading the barcode by means of an information appliance different from the household electric appliance; and receiving the information for identifying the consumer good, which has been obtained by the information appliance, directly from the information appliance, or receiving the information for identifying the consumer good, which has been obtained by the information appliance, via the household electric appliance.

With this configuration, information for identifying the consumer good is obtained by reading the barcode by means of an information appliance different from the household electric appliance. The information for identifying the consumer good, which has been obtained by the information appliance, is received directly from the information appliance. Alternatively, the information for identifying the consumer good, which has been obtained by the information appliance, is received via the household electric appliance.

Thus, even if a household electric appliance does not have a function of reading a barcode, information for identifying a consumer good can be obtained by means of an information appliance different from the household electric appliance.

In the information obtaining method described above, it is preferred that the method further includes: reading out information for identifying the consumer good from a wireless tag provided on the consumer good; receiving the information for identifying the consumer good read out from the wireless tag; and extracting, from the second memory section, the information regarding the consumer good on which the wireless tag is provided, based on the received information for identifying the consumer good.

With this configuration, information for identifying the consumer good is read out from a wireless tag provided on the consumer good, and the information for identifying the consumer good read out from the wireless tag is received. The information regarding the consumer good on which the wireless tag is provided is extracted from the second memory section based on the received information for identifying the consumer good.

Thus, information for identifying a consumer good is read out from a wireless tag provided on the consumer good, and only consumer goods associated with the read-out information for identifying the consumer good are presented to the user. Therefore, the user can easily select a consumer good to be used from among the consumer goods the user actually owns.

In the information obtaining method described above, it is preferred that the method further includes: reading out information for identifying the consumer good from the wireless tag by means of an information appliance different from the household electric appliance; and receiving the information for identifying the consumer good, which has been read out by the information appliance, directly from the information appliance, or receiving the information for identifying the consumer good, which has been read out by the information appliance, via the household electric appliance.

With this configuration, information for identifying the consumer good is read out from the wireless tag by means of an information appliance different from the household electric appliance. The information for identifying the consumer good, which has been read out by the information appliance, is received directly from the information appliance. Alternatively, the information for identifying the consumer good, which has been read out by the information appliance, is received via the household electric appliance.

Thus, even if a household electric appliance does not have a function of detecting a wireless tag, information for identifying a consumer good can be obtained by means of an information appliance different from the household electric appliance.

In the information obtaining method described above, it is preferred that the first memory section stores an amount of consumption of the consumer good, and the method further includes: receiving the amount of consumption of the consumer good which is measured by the household electric appliance; and updating the consumption status of the consumer good stored in the first memory section, based on the received amount of consumption of the consumer good.

With this configuration, the amount of consumption of the consumer good which is measured by the household electric appliance is received, and the consumption status of the consumer good stored in the first memory section is updated based on the received amount of consumption of the consumer good. Therefore, it is possible to accurately manage the amount of consumption of the consumer good.

In the information obtaining method described above, it is preferred that the operation status includes setting information regarding an operation of the household electric appliance which is set by the user for the household electric appliance when operating the household electric appliance, and the method further includes: calculating the amount of consumption of the consumer good from the setting information by using a parameter determined in advance according to the operation.

With this configuration, the operation status includes setting information regarding an operation of the household electric appliance which is set by the user for the household electric appliance when operating the household electric appliance. Then, the amount of consumption of the consumer good is calculated from the setting information by using a parameter determined in advance according to the operation.

Thus, the amount of consumption of the consumer good is calculated from setting information regarding an operation of a household electric appliance which is set by the user for the household electric appliance when operating the household electric appliance by using a parameter determined in advance according to the operation of the household electric appliance. Therefore, there is no need for a sensor for measuring the amount of consumption of the consumer good, and the user does not need to input the amount of consumption of the consumer good, making it possible to calculate the amount of consumption of the consumer good only by obtaining the setting information of the household electric appliance.

In the information obtaining method described above, it is preferred that the method further includes: storing, in a third memory section, setting information regarding an operation of the household electric appliance which is set for the household electric appliance when operating the household electric appliance using the consumer good; extracting the setting information stored in the third memory section based on the received information regarding a consumer good; and transmitting the extracted setting information to the household electric appliance.

With this configuration, setting information regarding an operation of the household electric appliance which is set for the household electric appliance when operating the household electric appliance using the consumer good is stored in a third memory section. The setting information stored in the third memory section is extracted based on the received information regarding a consumer good, and the extracted setting information is transmitted to the household electric appliance.

Thus, since setting information of a household electric appliance depending on a consumer good to be used is transmitted to the household electric appliance, the user can operate the household electric appliance using the consumer good without having to input the setting information.

In the information obtaining method described above, it is preferred that the confirmation message is transmitted to the household electric appliance with which the consumer good is used, another household electric appliance different from the household electric appliance with which the consumer good is used, or an information appliance.

With this configuration, the confirmation message is notified to the user by means of the household electric appliance with which the consumer good is used, another household electric appliance different from the household electric appliance with which the consumer good is used, or an information appliance.

An information obtaining system according to another aspect of the present invention is an information obtaining system including a server device and a household electric appliance communicatively connected to the server device, the server device including: a first receiving section for receiving information regarding a consumer good which has been determined as a consumer good actually used by a user; a first memory section for storing a consumption status of a consumer good; a memory control section for storing, in the first memory section, a consumption status of the consumer good which has been determined as a consumer good actually used by the user, based on the received information regarding the consumer good; a second receiving section for receiving, from the household electric appliance, an identifier for identifying the household electric appliance and an operation status of the household electric appliance; an estimating section for estimating the consumption status of the consumer good using the received operation status; an updating section for updating the consumption status of the consumer good stored in the first memory section based on the estimated consumption status of the consumer good; a decision section for deciding whether or not to transmit a confirmation message for confirming the consumer good being used, based on the updated consumption status of the consumer good; and a transmitting section for transmitting the confirmation message when it is decided that the confirmation message is to be transmitted, the household electric appliance including: a first transmitting section for transmitting, to the server device, a request for the information regarding a consumer good and an identifier for identifying the household electric appliance; a first receiving section for receiving the information regarding a consumer good transmitted by the server device; a second transmitting section for transmitting, to the server device, the information regarding a consumer good which has been determined as a consumer good actually used by the user; and a third transmitting section for transmitting, to the server device, the identifier for identifying the household electric appliance and the operation status of the household electric appliance.

With this configuration, a first receiving section of a server device receives information regarding a consumer good which has been determined as a consumer good actually used by a user. A first memory section stores a consumption status of a consumer good. A memory control section stores, in the first memory section, a consumption status of the consumer good which has been determined as a consumer good actually used by the user, based on the received information regarding the consumer good. A second receiving section receives, from the household electric appliance, an identifier for identifying the household electric appliance and an operation status of the household electric appliance. An estimating section estimates the consumption status of the consumer good using the received operation status. An updating section updates the consumption status of the consumer good stored in the first memory section based on the estimated consumption status of the consumer good. A decision section decides whether or not to transmit a confirmation message for confirming the consumer good being used, based on the updated consumption status of the consumer good. A transmitting section transmits the confirmation message when it is decided that the confirmation message is to be transmitted. A first transmitting section of the household electric appliance transmits, to the server device, a request for the information regarding a consumer good and an identifier for identifying the household electric appliance. A first receiving section receives the information regarding a consumer good transmitted by the server device. A second transmitting section transmits, to the server device, the information regarding a consumer good which has been determined as a consumer good actually used by the user. A third transmitting section transmits, to the server device, the identifier for identifying the household electric appliance and the operation status of the household electric appliance.

Thus, the consumption status of a consumer good is estimated by using the received operation status; a confirmation message is transmitted at a timing when a decision is made based on the estimated consumption status of the consumer good; and information regarding a consumer good which has been determined as a consumer good actually used by the user is received as a response to the confirmation message. Therefore, it is possible to appropriately identify a consumer good which the user uses with a household electric appliance.

An information appliance according to another aspect of the present invention an information appliance communicatively connected to a server device, the information appliance including: a receiving section for receiving a confirmation message for confirming a consumer good being used, the confirmation message having been decided by the server device to be transmitted based on a consumption status of a consumer good to be used with a household electric appliance, the consumption status having been estimated by using an operation status of the household electric appliance; a display section for displaying the received confirmation message; an accepting section for accepting, from a user, an input of response information for the confirmation message; and a transmitting section for transmitting, to the server device, the response information accepted by the accepting section.

With this configuration, a receiving section of the information appliance receives a confirmation message for confirming a consumer good being used, the confirmation message having been decided by the server device to be transmitted based on a consumption status of a consumer good to be used with a household electric appliance, the consumption status having been estimated by using an operation status of the household electric appliance. A display section displays the received confirmation message. An accepting section for accepting, from a user, an input of response information for the confirmation message. A transmitting section transmits, to the server device, the response information accepted by the accepting section.

Thus, the consumption status of the consumer good is estimated by using the received operation status, and the stored consumption status of the consumer good is updated based on the estimated consumption status consumer good. Therefore, it is possible to easily manage the consumption status of consumer goods without the user having to input the consumption status of the consumer goods.

Note that the particular embodiments and examples set forth in the Description of Embodiments section are merely to elucidate the technical details of the present invention, and the present invention should not be narrowly interpreted to be limited to such specific examples, but various changes can be made thereto without departing from the spirit of the present invention and the scope of the claims.

INDUSTRIAL APPLICABILITY

The information obtaining method, the information obtaining system and the information appliance of the present invention make it possible to appropriately identify a consumer good which a user uses with a household electric appliance, and they are applicable as an information obtaining method, an information obtaining system and an information appliance for obtaining information at the point in time when the user uses the household electric appliance.

The invention claimed is:
1. An information obtaining method comprising:
receiving information regarding a consumer good which has been determined as a consumer good actually used by a user with a household electric appliance;
storing, in a first memory section, a remaining amount of the consumer good which has been determined as a consumer good actually used by the user, based on the received information regarding the consumer good;
receiving, from the household electric appliance, an appliance identifier for identifying the household electric appliance and an operation status of the household electric appliance;
estimating the remaining amount of the consumer good using the received operation status;
updating the remaining amount of the consumer good stored in the first memory section based on the estimated remaining amount of the consumer good;
deciding whether or not the updated remaining amount of the consumer good is less than or equal to a predetermined amount;
creating a confirmation message for accepting, from the user, an input indicating whether or not the consumer good being actually used with the household electric appliance coincides with the consumer good stored in the first memory section, when the updated remaining amount of the consumer good is decided to be less than the predetermined amount;
transmitting the created confirmation message to the household electric appliance, the household electric appliance including a display for the displaying the created confirmation message;
storing the information regarding a consumer good in a second memory section in advance while the information is associated with a type of household electric appliance;
receiving sales information in which information for identifying a consumer good which has been purchased by the user is associated with a type of the household electric appliance with which the consumer good is used;

storing the received sales information in a third memory section;

receiving, from the household electric appliance, a request for the information regarding the consumer good and the appliance identifier for identifying the household electric appliance;

identifying the user who uses the household electric appliance associated with the received appliance identifier, the user being identified using user information in which a user identifier identifying the user is associated with the appliance identifier identifying the household electric appliance, the user information being stored in advance in a fourth memory section;

selecting a consumer good related to the household electric appliance associated with the received appliance identifier from among consumer goods which have been purchased by the identified user in the sales information stored in the third memory;

extracting, from the second memory section, information regarding the selected consumer good from among consumer goods which can be used with the household electric appliance associated with the received appliance identifier; and transmitting, to the household electronic appliance, the extracted information regarding the selected consumer good.

2. The information obtaining method according to claim 1, wherein a quantity of the consumer good at a start of consumption is determined in advance.

3. The information obtaining method according to claim 1, wherein the second memory section stores information regarding a plurality of consumer goods, and the method further comprises:

extracting, from the second memory section, information regarding a plurality of consumer goods which can be used with the household electric appliance associated with the received appliance identifier;

transmitting the extracted information regarding the plurality of consumer goods as a consumer goods list; and receiving the information regarding the consumer good which has been determined as a consumer good actually used by the user, from among the consumer goods list.

4. The information obtaining method according to claim 1, the method further comprising:

obtaining information for identifying the consumer good by reading a barcode provided on the consumer good;

receiving the obtained information for identifying the consumer good; and extracting, from the second memory section, the information regarding the consumer good on which the barcode is provided, based on the received information regarding the consumer good.

5. The information obtaining method according to claim 4, the method further comprising:

obtaining information for identifying the consumer good by reading the barcode by means of an information appliance different from the household electric appliance; and receiving the information for identifying the consumer good, which has been obtained by the information appliance, directly from the information appliance, or receiving the information for identifying the consumer good, which has been obtained by the information appliance, via the household electric appliance.

6. The information obtaining method according to claim 1, the method further comprising:

reading out information for identifying the consumer good from a wireless tag provided on the consumer good;

receiving the information for identifying the consumer good read out from the wireless tag; and extracting, from the second memory section, the information regarding the consumer good on which the wireless tag is provided, based on the received information for identifying the consumer good.

7. The information obtaining method according to claim 6, the method further comprising:

reading out information for identifying the consumer good from the wireless tag by means of an information appliance different from the household electric appliance; and receiving the information for identifying the consumer good, which has been read out by the information appliance, directly from the information appliance, or receiving the information for identifying the consumer good, which has been read out by the information appliance, via the household electric appliance.

8. The information obtaining method according to claim 1, wherein the first memory section stores an amount of consumption of the consumer good, and the method further comprises:

receiving the amount of consumption of the consumer good which is measured by the household electric appliance; and updating the remaining amount of the consumer good stored in the first memory section, based on the received amount of consumption of the consumer good.

9. The information obtaining method according to claim 1, wherein the operation status includes setting information regarding an operation of the household electric appliance which is set by the user for the household electric appliance when operating the household electric appliance, and the method further comprises:

calculating the amount of consumption of the consumer good from the setting information by using a parameter determined in advance according to the operation.

10. The information obtaining method according to claim 1, the method further comprising:

storing, in a third memory section, setting information regarding an operation of the household electric appliance which is set for the household electric appliance when operating the household electric appliance using the consumer good;

extracting the setting information stored in the third memory section based on the received information regarding a consumer good; and transmitting the extracted setting information to the household electric appliance.

11. The information obtaining method according to claim 1, wherein the confirmation message is transmitted to the household electric appliance with which the consumer good is used, another household electric appliance different from the household electric appliance with which the consumer good is used, or an information appliance.

12. An information obtaining system comprising:
a server device; and
a household electric appliance communicatively connected to the server device, wherein the server device includes:

a first receiving section for receiving information regarding a consumer good which has been determined as a consumer good actually used by a user;

a first memory section for storing a remaining amount of a consumer good;

a memory control section for storing, in the first memory section, a remaining amount of the consumer good which has been determined as a consumer good actually used by the user, based on the received information regarding the consumer good;

a second receiving section for receiving, from the household electric appliance, an appliance identifier for identifying the household electric appliance and an operation status of the household electric appliance;

an estimating section for estimating the remaining amount of the consumer good using the received operation status;

an updating section for updating the remaining amount of the consumer good stored in the first memory section based on the estimated remaining amount of the consumer good;

a decision section for deciding whether or not the updated remaining amount of the consumer good is less than or equal to a predetermined amount;

a creating section for creating a confirmation message for accepting, from the user, an input indicating whether or not the consumer good being actually used with the household electric appliance coincides with the consumer good stored in the first memory section, when the decision section decides that the updated remaining amount of the consumer good is less than the predetermined amount; and a first transmitting section for transmitting, to the household electric appliance, the created confirmation message;

a second memory section for storing the information regarding a consumer good in a second memory section while the information is associated with a type of household electric appliance;

a third receiving section for receiving sales information in which information for identifying a consumer good which has been purchased by the user is associated with a type of the household electric appliance with which the consumer good is used;

a third memory section for storing the received sales information;

a fourth receiving section for receiving, from the household electric appliance, a request for the information regarding the consumer good and the appliance identifier for identifying the household electric appliance;

a fourth memory section for storing user information in which stored a user identifier identifying the user is associated with the appliance identifier identifying the household electric appliance;

a selecting section for (i) identifying the user who uses the household electric appliance associated with the received appliance identifier, the user being identified using the user information stored in the fourth memory section, and (ii) selecting a consumer good related to the household electric appliance associated with the received appliance identifier from among consumer goods which have been purchased by the identified user in the sales information stored in the third memory;

an extracting section for extracting, from the second memory section, information regarding the selected consumer good from among consumer goods which can be used with the household electric appliance associated with the received appliance identifier; and a second transmitting section for transmitting, to the household electric appliance, the extracted information regarding the selected consumer good, and wherein the household electric appliance includes:

a first transmitting section for transmitting, to the server device, a request for the information regarding a consumer good and an identifier for identifying the household electric appliance;

a first receiving section for receiving the information regarding a consumer good transmitted by the server device;

a second transmitting section for transmitting, to the server device, the information regarding a consumer good which has been determined as a consumer good actually used by the user;

a third transmitting section for transmitting, to the server device, the identifier for identifying the household electric appliance and the operation status of the household electric appliance, a second receiving section for receiving the confirmation message transmitted by the server device; and a display for displaying the received confirmation message.

13. The information obtaining method according to claim 1, the method further comprising when the updated remaining amount of the consumer good is decided to be less than the predetermined amount, cooperating with a server device or an electronic commerce website to automatically register the consumer good as a product to be purchased by the user.

* * * * *